(12) United States Patent
Nakamura et al.

(10) Patent No.: US 6,801,654 B2
(45) Date of Patent: Oct. 5, 2004

(54) PICTURE PROCESSING APPARATUS, METHOD AND RECORDING MEDIUM FOR A NATURAL EXPANSION DRAWING

(75) Inventors: Kyoko Nakamura, Tokyo (JP); Mitsuharu Ohki, Tokyo (JP)

(73) Assignee: Sony Corporation, Tokyo (JP)

( * ) Notice: Subject to any disclaimer, the term of this patent is extended or adjusted under 35 U.S.C. 154(b) by 668 days.

(21) Appl. No.: 09/756,335

(22) Filed: Jan. 8, 2001

(65) Prior Publication Data

US 2001/0051001 A1 Dec. 13, 2001

(30) Foreign Application Priority Data

Jan. 14, 2000 (JP) .................................... P2000-005564

(51) Int. Cl.$^7$ ................................................ G06K 9/00
(52) U.S. Cl. ..................... 382/154; 382/284; 382/295; 345/427; 345/629; 345/672
(58) Field of Search ............................... 382/154, 294, 382/295, 284; 345/619, 427, 629, 672

(56) References Cited

U.S. PATENT DOCUMENTS

| | | | | |
|---|---|---|---|---|
| 5,680,150 A | * | 10/1997 | Shimizu et al. | 345/634 |
| 6,124,859 A | * | 9/2000 | Horii et al. | 345/427 |
| 6,434,277 B1 | * | 8/2002 | Yamada et al. | 382/285 |
| 6,469,710 B1 | * | 10/2002 | Shum et al. | 345/619 |
| 6,529,206 B1 | * | 3/2003 | Ohki et al. | 345/619 |

* cited by examiner

Primary Examiner—Bhavesh M. Mehta
Assistant Examiner—John Strege
(74) Attorney, Agent, or Firm—Bell, Boyd & Lloyd LLC

(57) ABSTRACT

The present invention provides a picture-processing apparatus and method for finding a point A ($x_p$, $y_p$) on a projection drawing showing a first surface as a point corresponding to a point a ($-1/2$, $y_e$) on the left side of a square shape forming an expansion drawing of the first surface and a point B ($x_p'$, $y_p'$) on the projection drawing as a point corresponding to a point b ($1/2$, $y_e$) on the right side of a square shape forming an expansion drawing of a second surface adjacent to the first surface on the basis of a predetermined transformation relation. On the expansion drawings, the point a coincides with the point b. The transformation relation is corrected by finding average coordinates (($x_p+x_p'$)/2, ($y_p+y_p'$)/2) as the coordinates of a new point C located on the projection drawing and designated as a point corresponding to the point a ($-1/2$, $y_e$), and using a pair of the point C and the point a ($-1/2$, $y_e$) as a base for a new transformation relation. As a result, a natural expansion drawing found by using the new transformation relation can be obtained, allowing editing work to be done with ease.

8 Claims, 44 Drawing Sheets

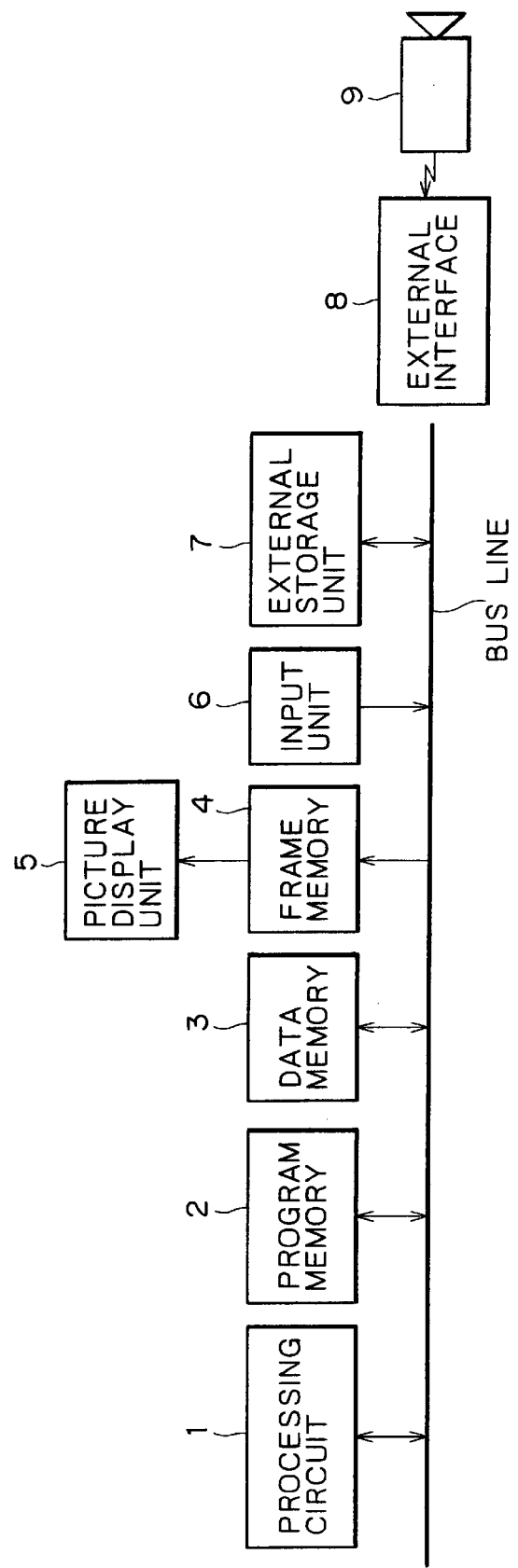

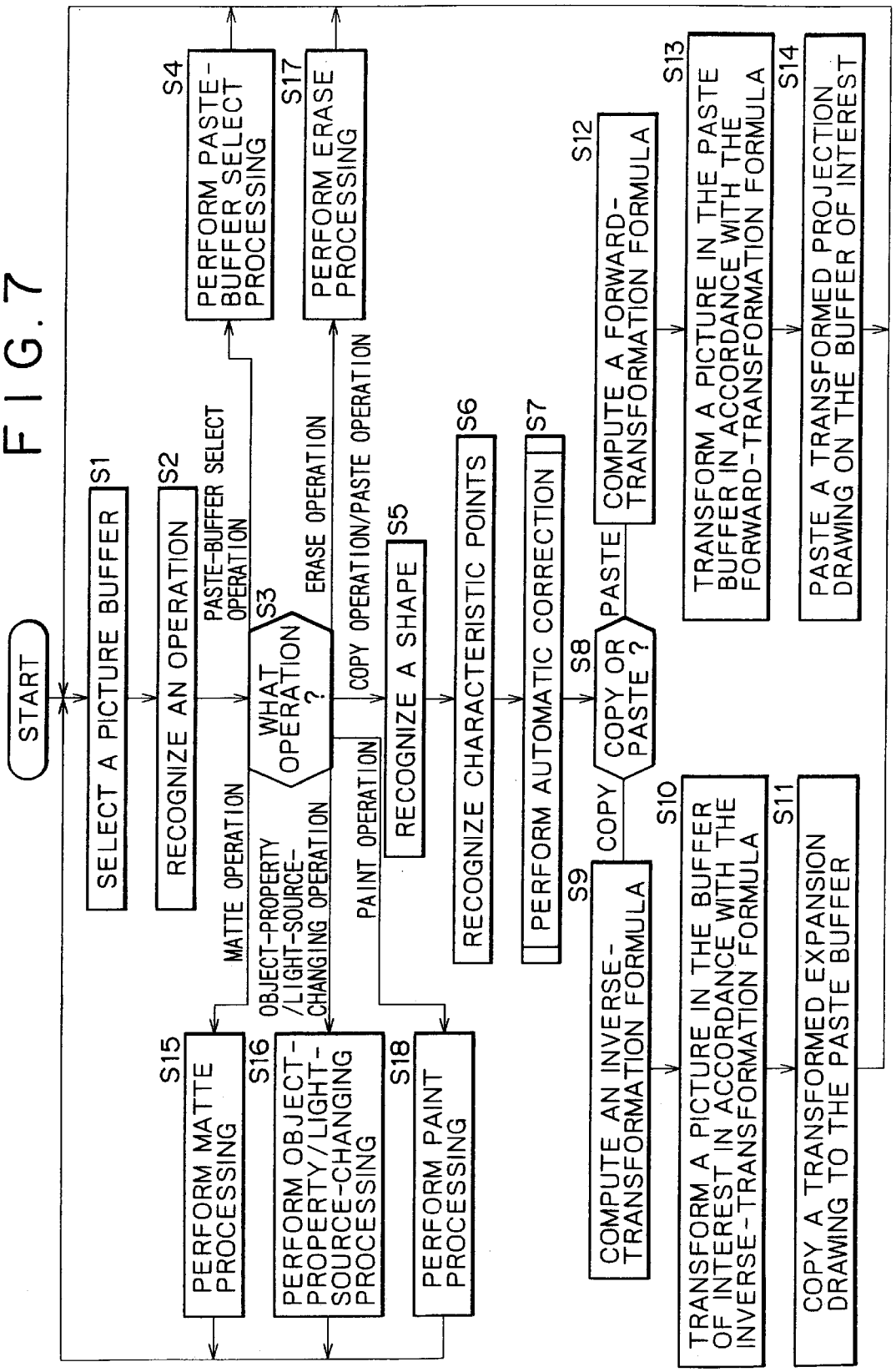

PASTE BUFFER AFTER A COPY OPERATION

BUFFER OF INTEREST

COPY OPERATION

PASTE OPERATION

PASTE BUFFER

BUFFER OF INTEREST
(BEFORE A PASTE OPERATION)

BUFFER OF INTEREST
(AFTER THE PASTE OPERATION)

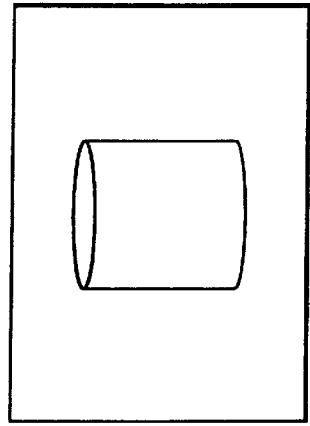
FIG.11A
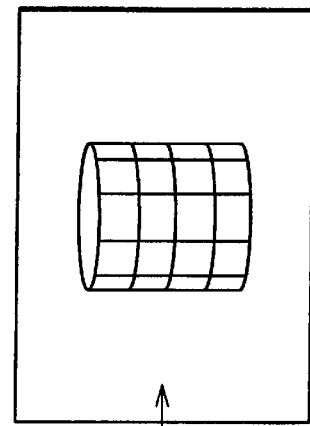
FIG.11C
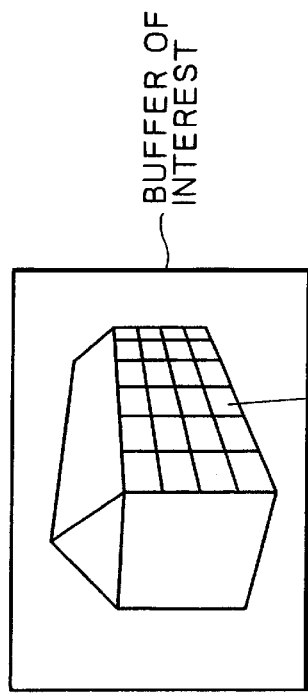
FIG.11B PASTE BUFFER
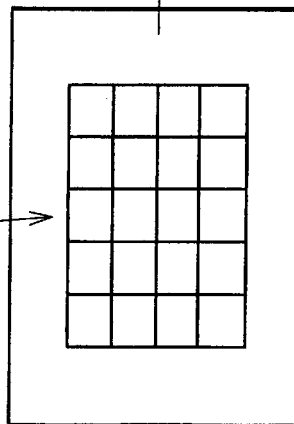
FIG.11D TEXTURE COPYING
BUFFER OF INTEREST (BEFORE A PASTE OPERATION)
BUFFER OF INTEREST (AFTER THE PASTE OPERATION)
BUFFER OF INTEREST
COPY OPERATION
PASTE OPERATION

THE USER SPECIFIES VERTEXES

SPECIFICATION OF POINTS

F I G. 13
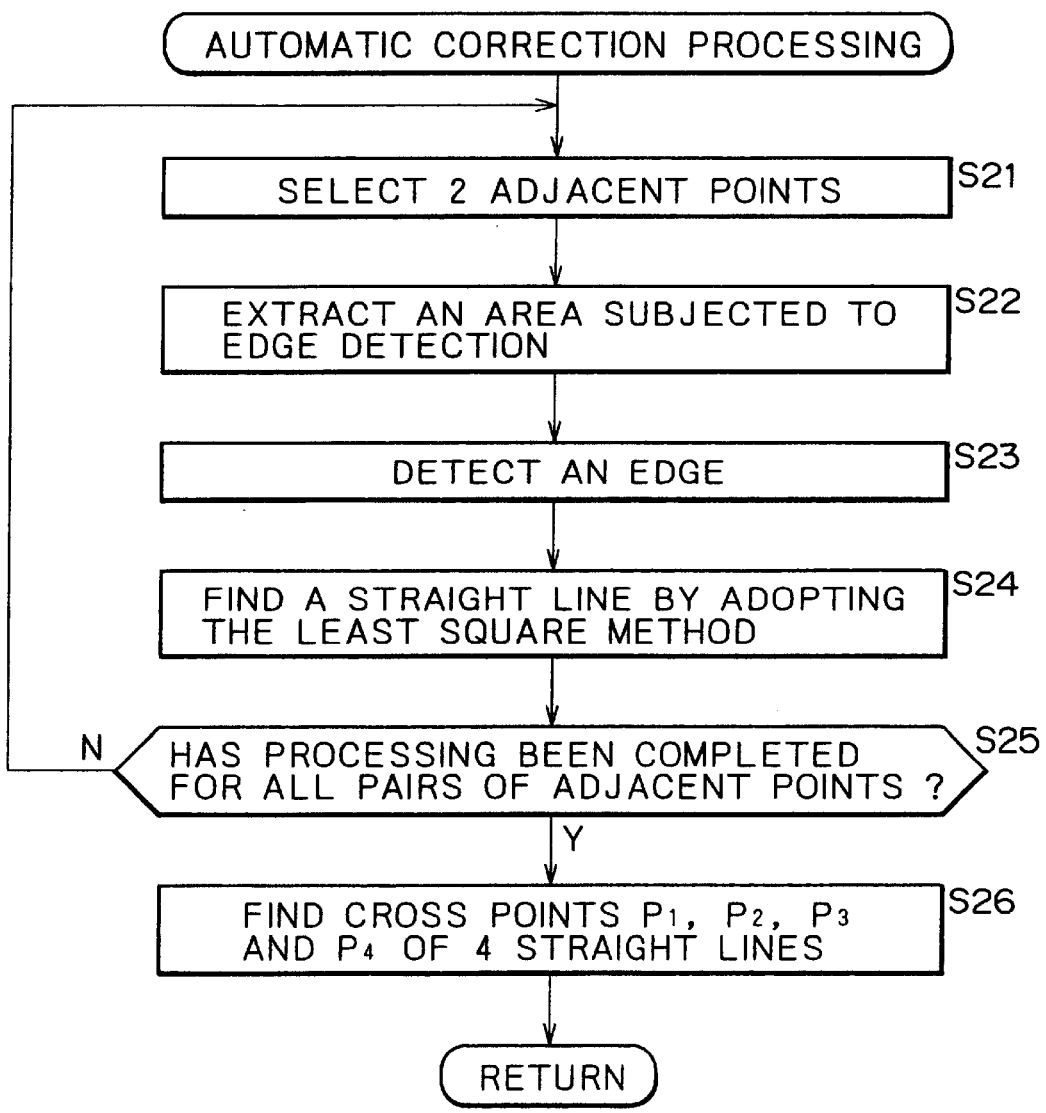

BUFFER WINDOW

CONTOUR LINE

BUFFER OF INTEREST

PROJECTION DRAWING

F I G. 17
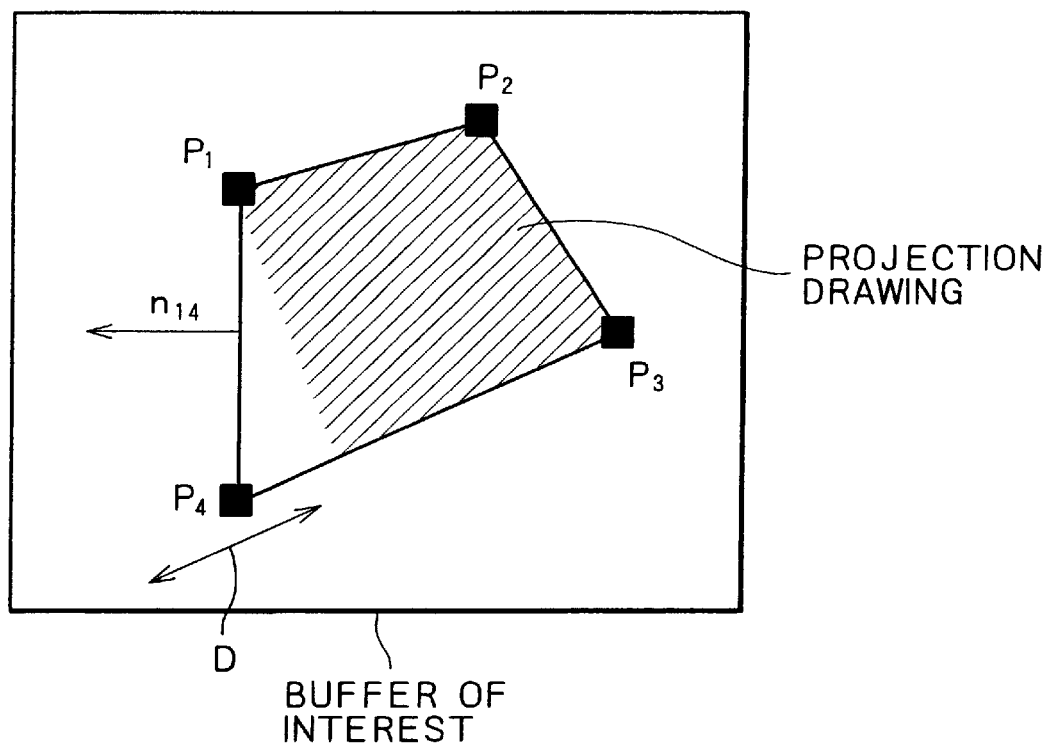
PROJECTION DRAWING
BUFFER OF INTEREST

DATA IN THE BUFFER OF INTEREST

PASTE OPERATION USING NO MATTE

GENERATED MATTE (MATTE PICTURE)

AREA WITH 1.0 PIXELS

AREA WITH 0 PIXELS

MATTE OPERATION

PASTE OPERATION USING A MATTE

DETAILS OF THE OBJECT-PROPERTY PROCESSING

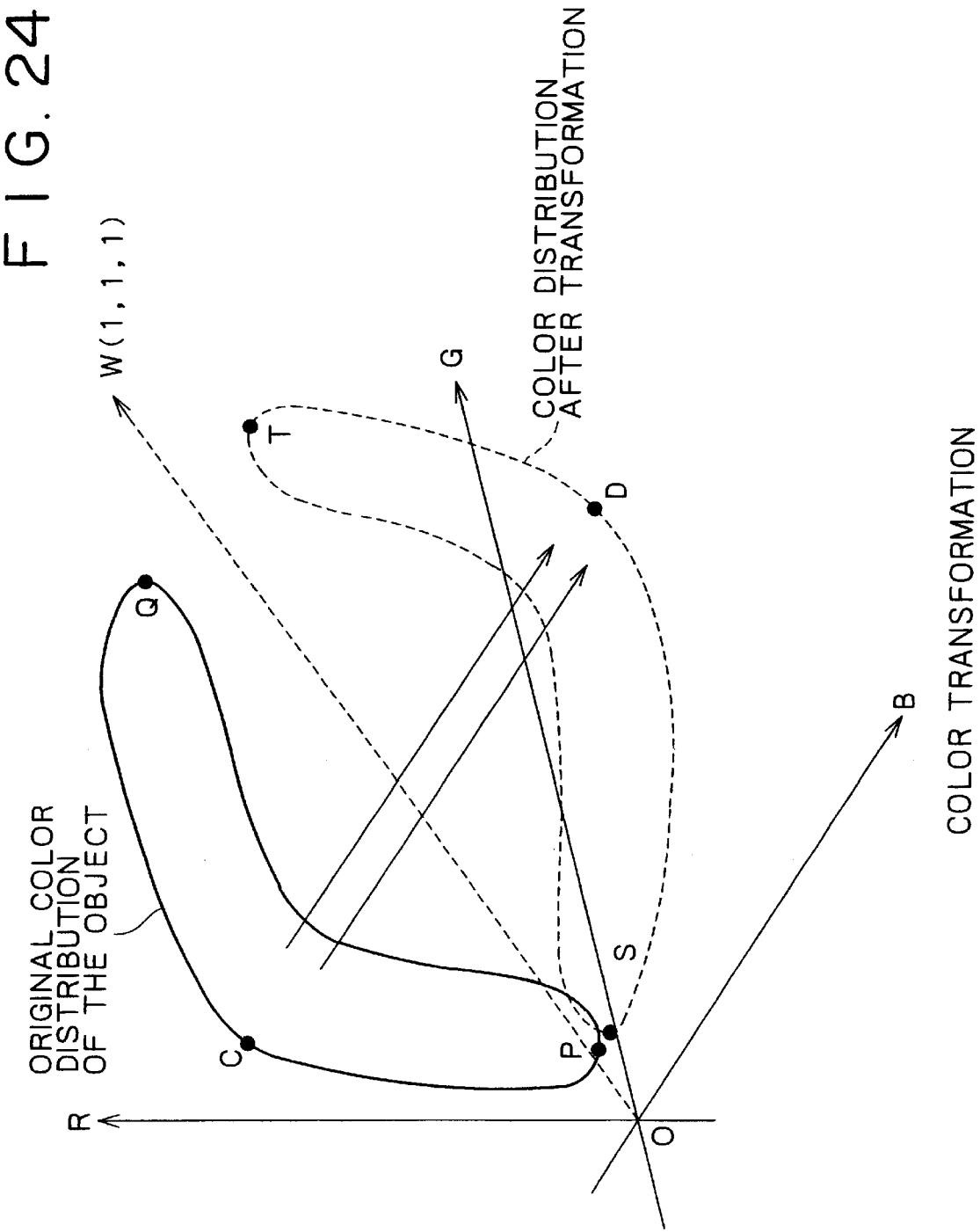

THE COMPONENT REFLECTED BY THE MIRROR SURFACE IS SUBJECTED TO NONLINEAR TRANSFORMATION TO GIVE AN EFFECT OF BRIGHTENING ONLY A PORTION

THERE ARE MANY SCATTERING-REFLECTION COMPONENTS, BRIGHTENING THE ENTIRE LIGHT-SOURCE SIDE

CHANGING THE OBJECT PROPERTY

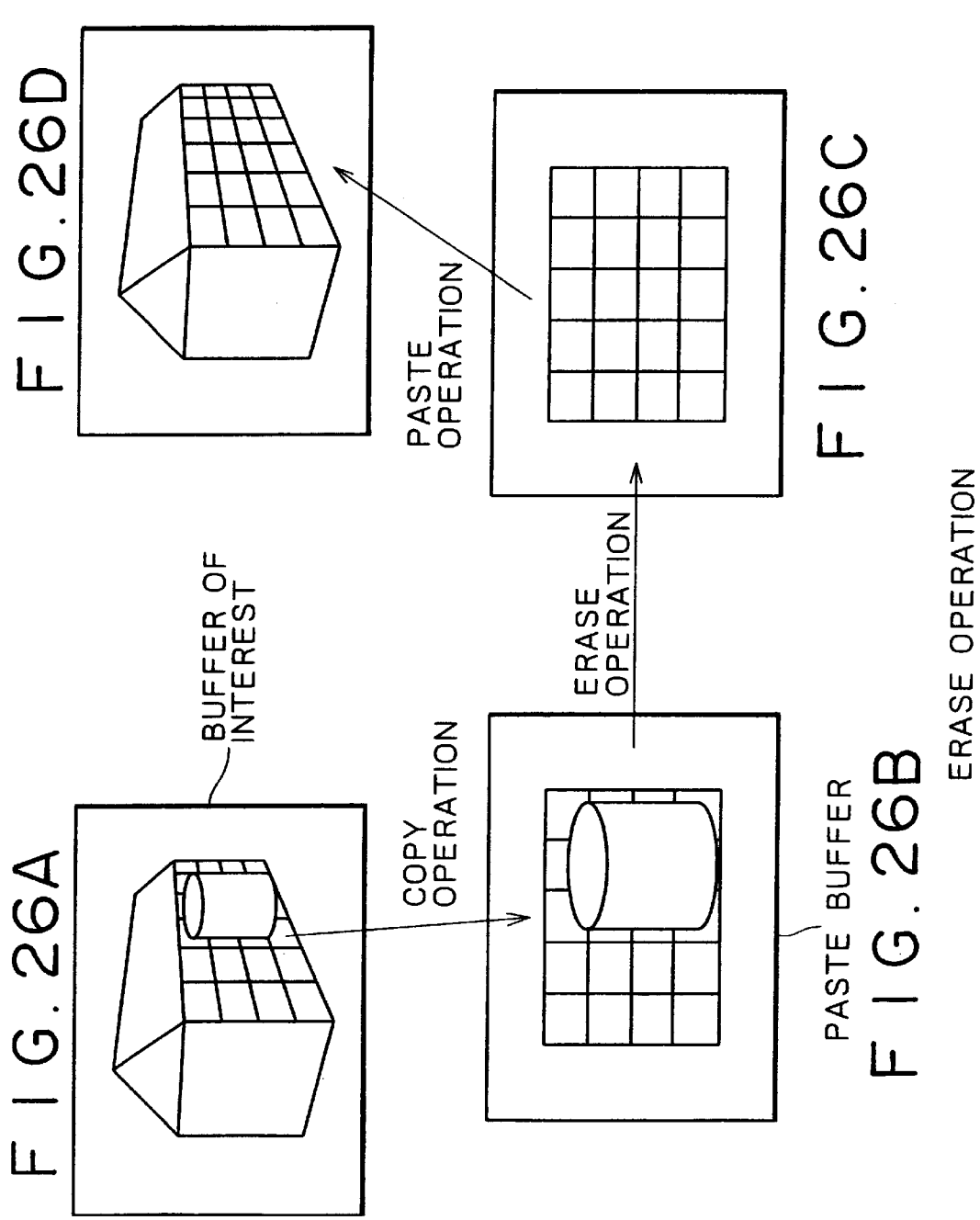

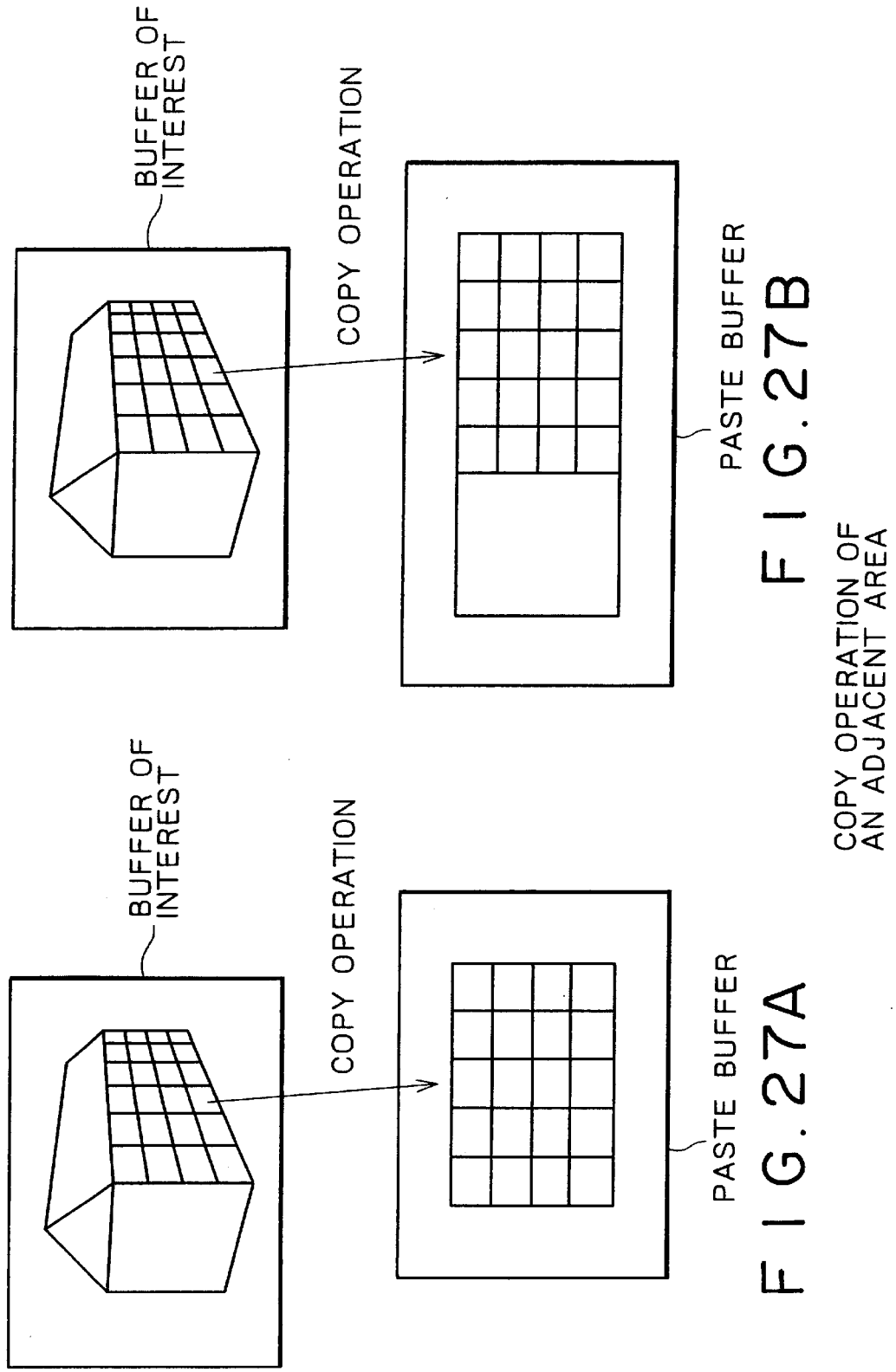

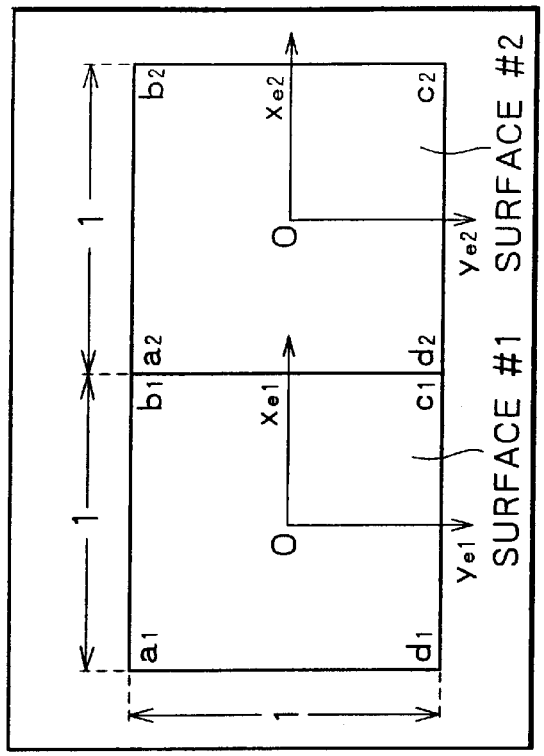
F I G. 30B
EXPANSION DRAWING
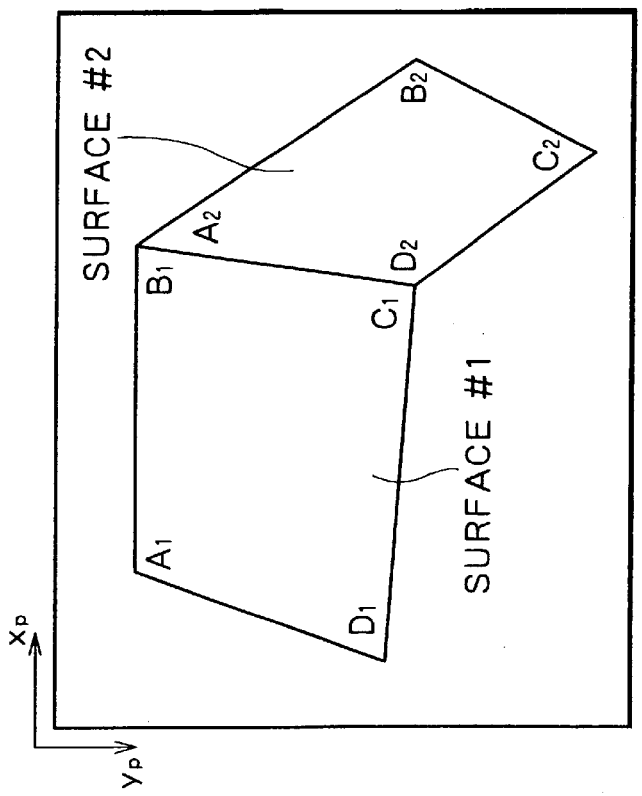
F I G. 30A
PROJECTION DRAWING

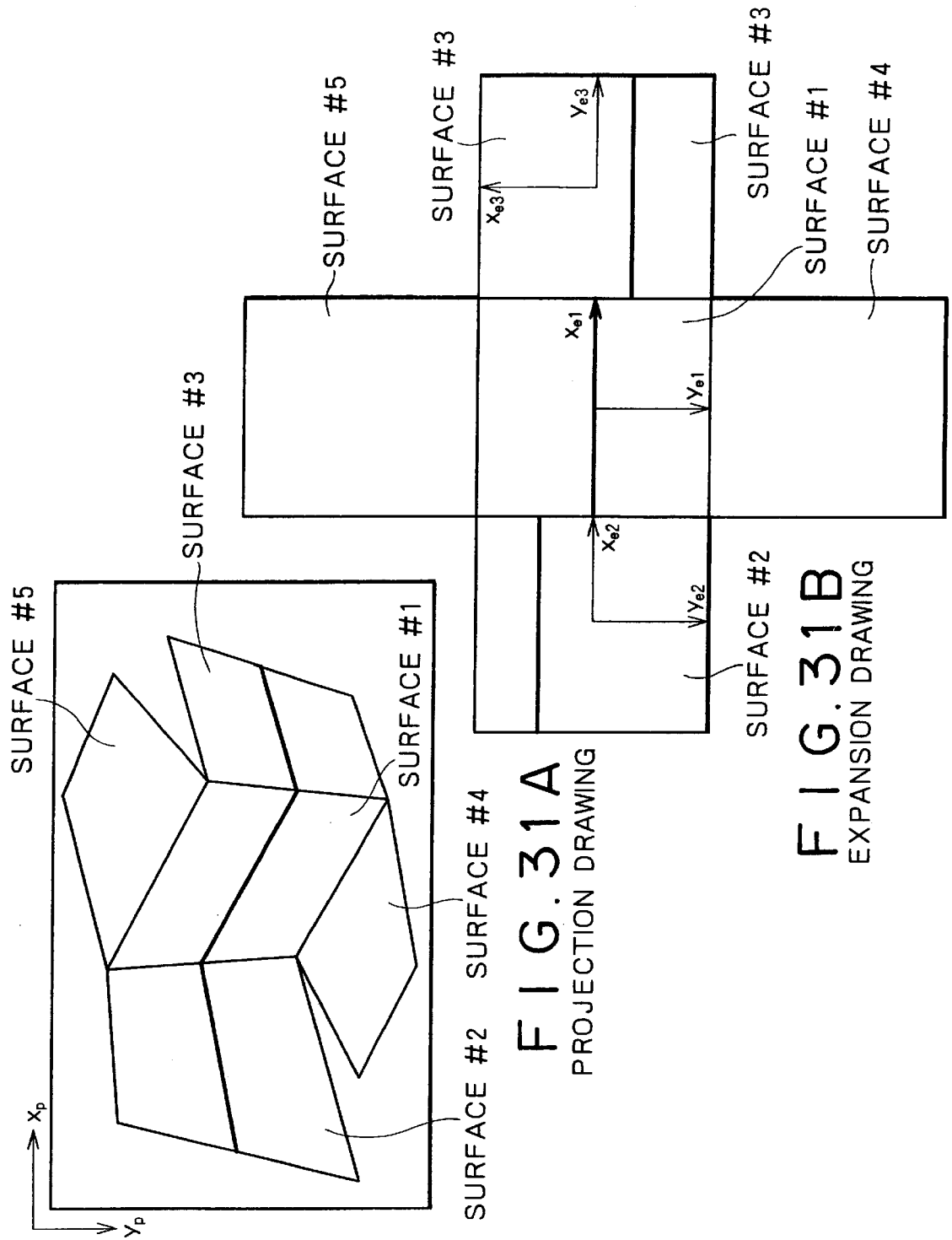

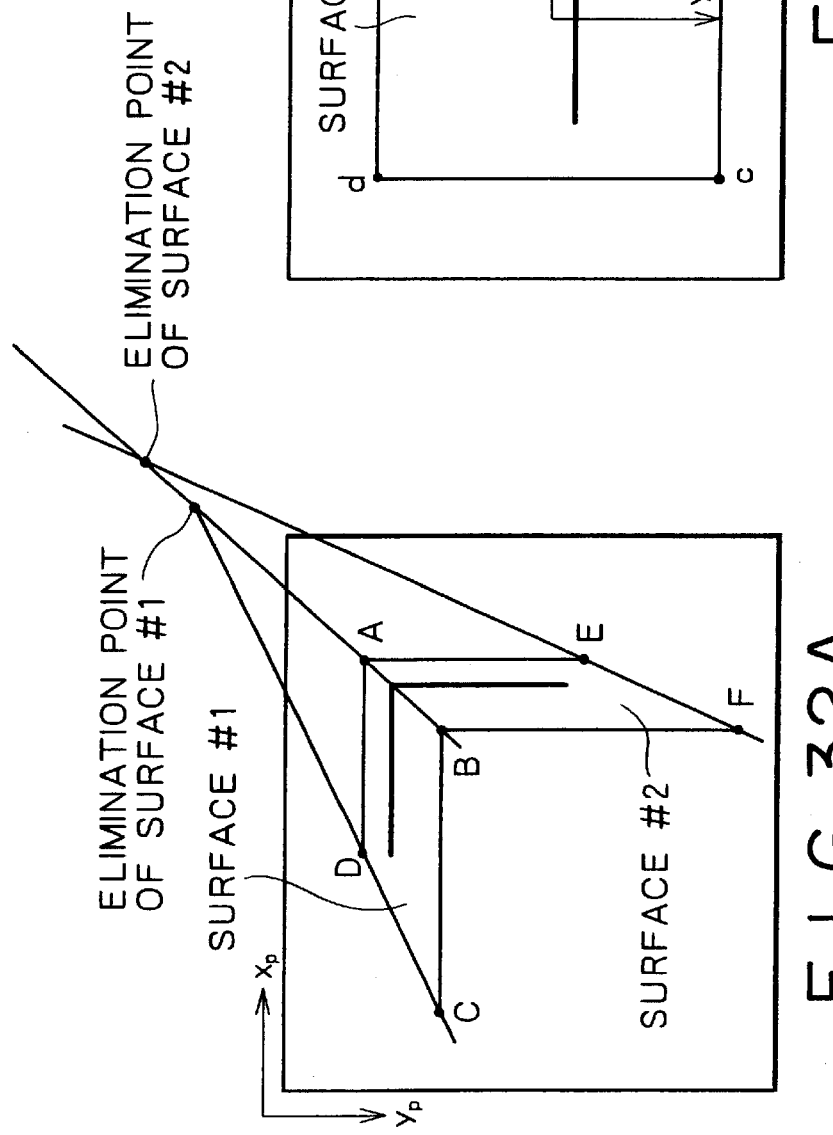
FIG. 32B EXPANSION DRAWING
FIG. 32A PROJECTION DRAWING

EXPANSION DRAWING

PROJECTION DRAWING

EXPANSION DRAWING

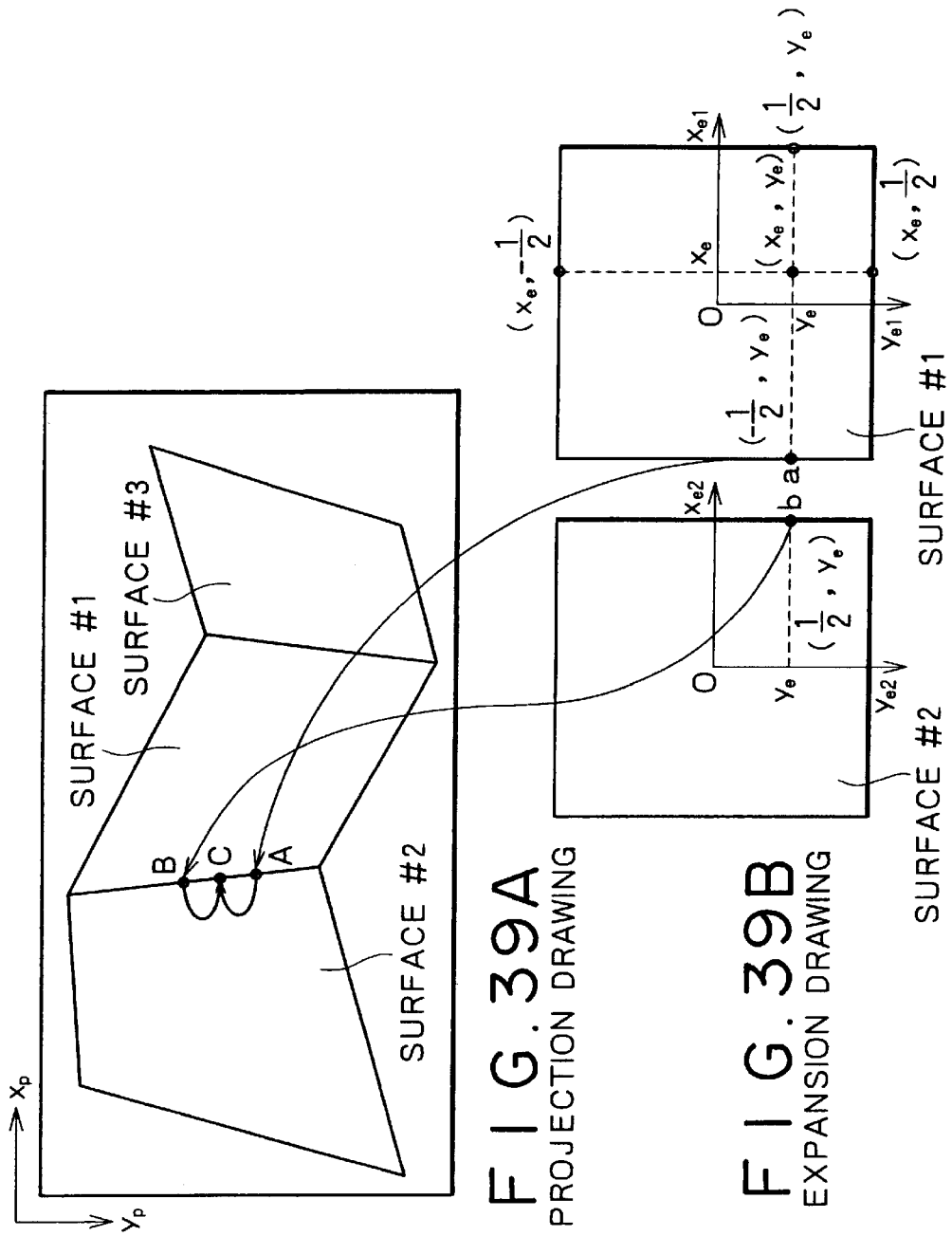
F I G. 39A
PROJECTION DRAWING
F I G. 39B
EXPANSION DRAWING

PROJECTION DRAWING

EXPANSION DRAWING

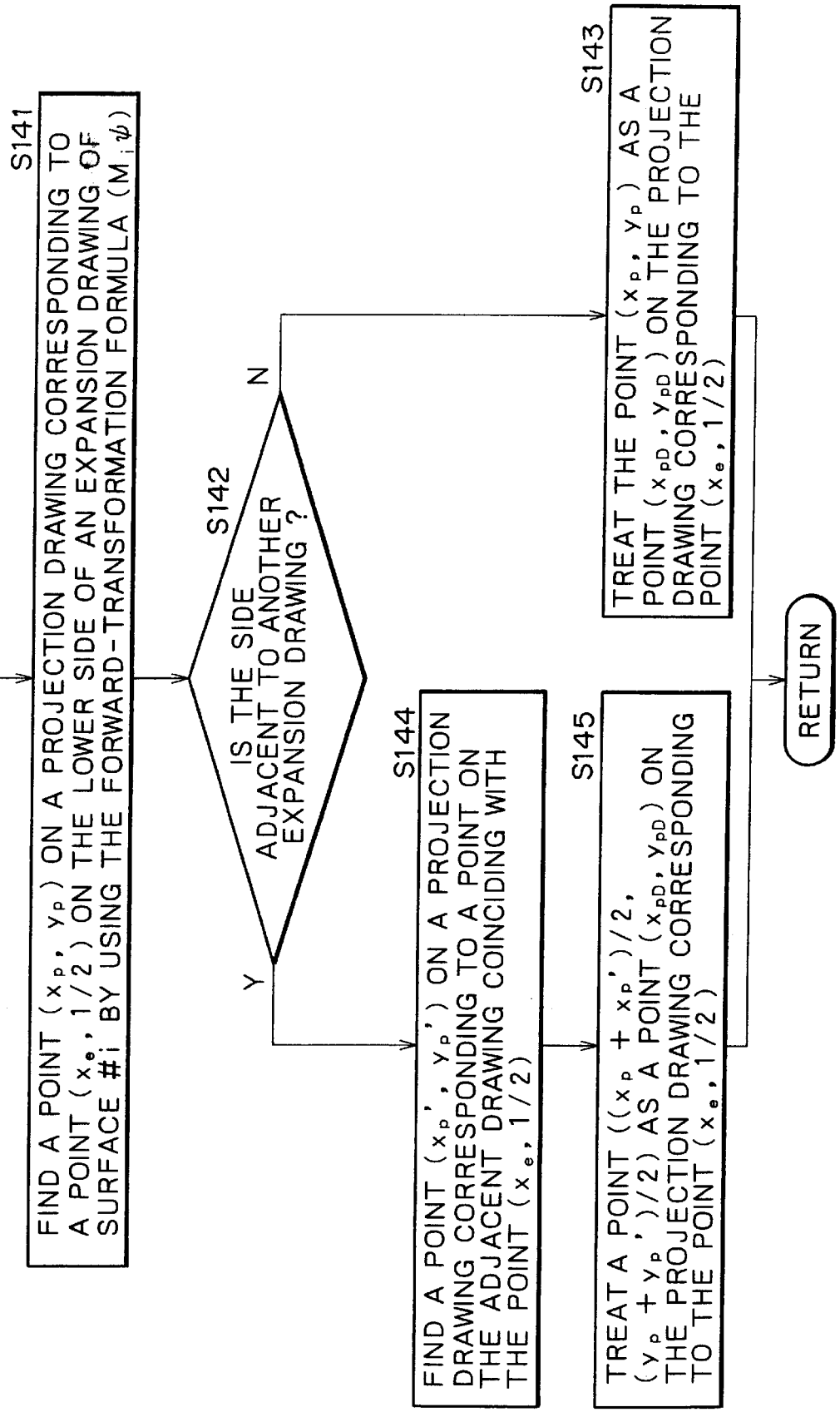

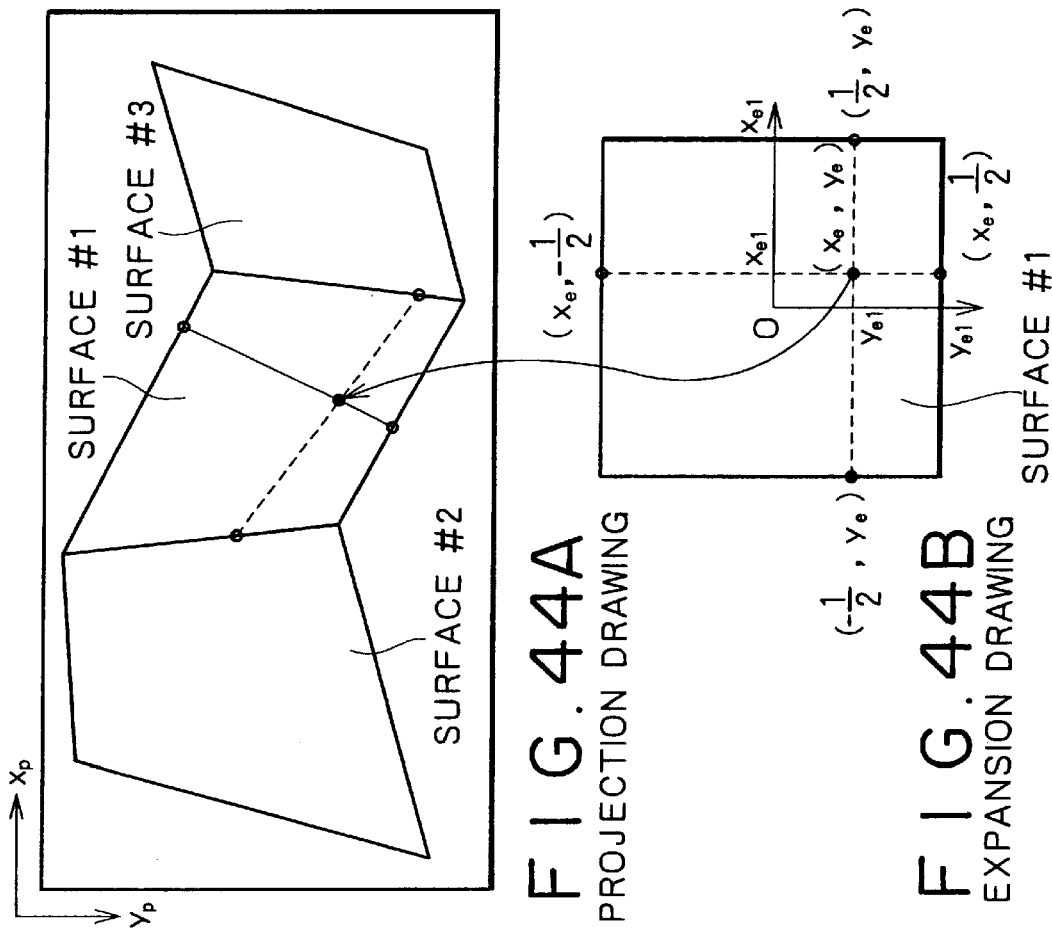
FIG. 44A PROJECTION DRAWING
FIG. 44B EXPANSION DRAWING

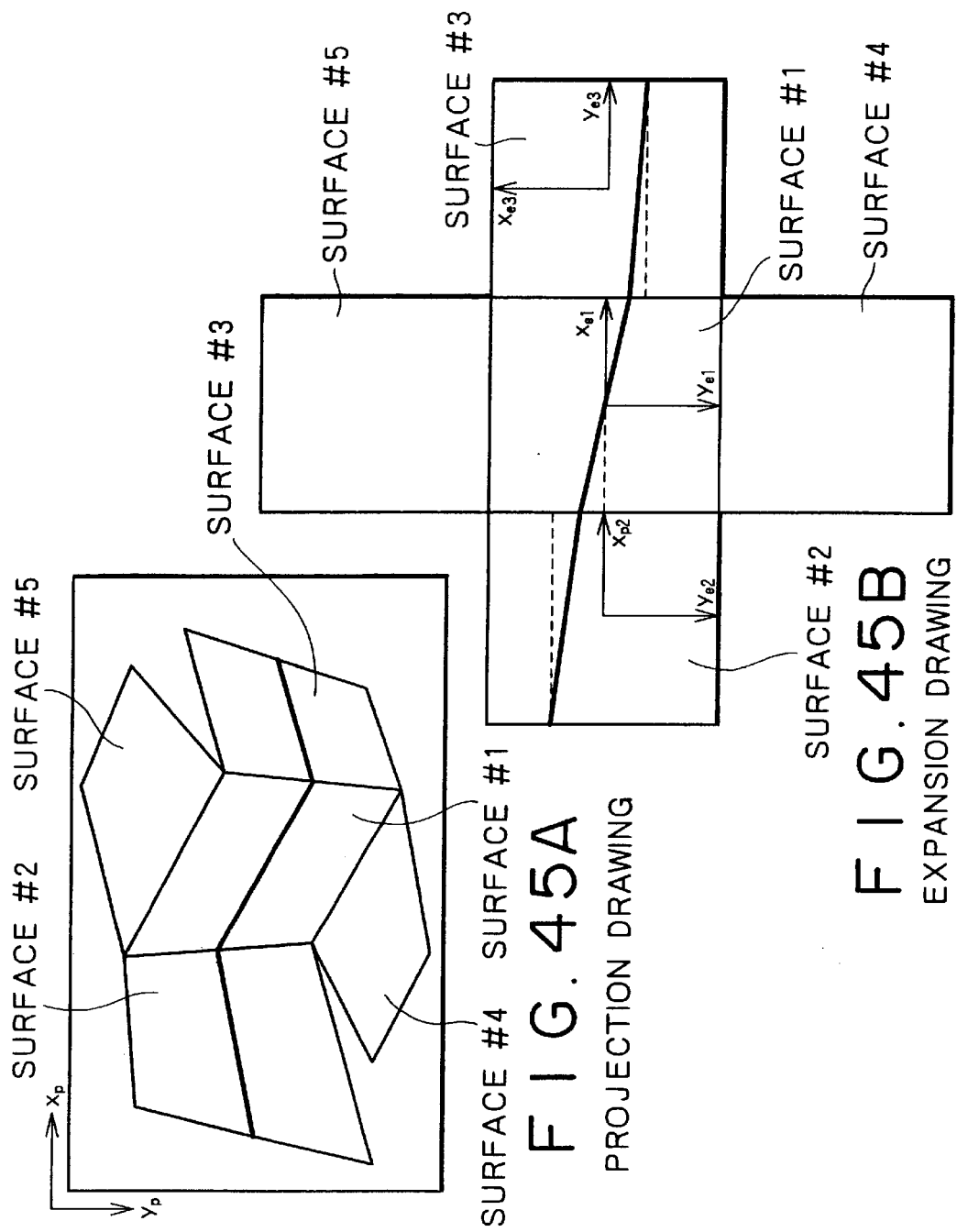
FIG. 45A PROJECTION DRAWING
FIG. 45B EXPANSION DRAWING

PICTURE PROCESSING APPARATUS, METHOD AND RECORDING MEDIUM FOR A NATURAL EXPANSION DRAWING

BACKGROUND OF THE INVENTION

The present invention relates to a picture-processing apparatus, a picture-processing method adopted in the apparatus and a recording medium for storing a computer program prescribing the method. More particularly, the present invention relates to a picture-processing apparatus as well as a picture-processing method adopted in the apparatus that can be used for easily carrying out processing such as 3-dimensional editing on a 3-dimensional object shown as a 2-dimensional picture, and relates to a recording medium for storing a computer program prescribing the method.

As a conventional technology, there is known a picture-processing technology called 2D (2-dimensional) painting whereby a designer and/or the like uses a computer for carrying out work similar to drawing a picture on a piece of paper by using a drawing pen or an air brush. The work to draw a picture on a piece of paper using an air brush is referred to as a picture-drawing technique by splashing a powdered coloring material.

With the conventional 2D painting, however, a picture representing a displayed 3-dimensional object is treated as a picture on a 2-dimensional plane. Thus, when a character is drawn over the picture or a drawing is added to the 2-dimensional picture without considering orientations and other attributes in the 3-dimensional space of the 3-dimensional original object displayed as the 2-dimensional picture, an unnatural picture is resulted in.

To put it in detail, a 3-dimensional model representing a house drawn as a 2-dimensional picture shown in FIG. 1A is taken as an example. Assume that characters are added to walls of the house without taking orientations of the walls into consideration as shown in FIG. 1B. In this case, the added characters do not appear to have been drawn on the walls. In addition, an attempt is made to add a cubic room to a wall of the house without taking the orientation of the wall into consideration as shown in FIG. 1C. In this case, by merely drawing a cubic room, a natural result cannot be obtained.

A cylinder drawn as a 2-dimensional picture shown in FIG. 2A is taken as another example. Assume that characters are added to the side surface of the cylinder without taking the orientation of the side surface into consideration as shown in FIG. 2B. In this case, the added characters do not appear to have been indeed drawn on the side surface.

Thus, when doing 2D-painting work to add a string of characters or a figure to a 2-dimensional picture representing a 3-dimensional object, it is necessary to draw the characters or the figure by changing the shape of the characters or the figure to match the orientations of the 3-dimensional object in order to prevent an unnatural drawing from being resulted in. In order to carry out operations to draw such a drawing, however, a skill is required to a certain degree.

SUMMARY OF THE INVENTION

It is thus an object of the invention addressing the problem described above to provide a picture-processing apparatus and a picture-processing method that can be used for easily carrying out 3-dimensional editing work on a 3-dimensional object shown as a 2-dimensional picture.

A picture-processing apparatus provided by the present invention is characterized in that the apparatus comprises a computation means for computing a transformation formula prescribing an inter-drawing relation between a projection drawing of a surface composing a 3-dimensional object displayed on a 2-dimensional picture and an expansion drawing of the surface and a correction means for correcting the inter-drawing relation prescribed by the transformation formula and outputting a new inter-drawing relation as a result of correction.

The picture-processing apparatus described above may be further provided with a projection-drawing-transforming means for transforming a projection drawing of each of a plurality of surfaces composing a 3-dimensional object into an expansion drawing of the surface and a connection means for creating a joint drawing by joining expansion drawings of the surfaces in accordance with connection relations each associated with one of the surfaces.

The correction means is capable of correcting an inter-drawing relation so that each point on a side common to a first surface of an expansion drawing and a second surface adjacent to the first surface corresponds to the same point on a projection drawing.

The correction means is also capable of correcting an inter-drawing relation so that a point on a side common to a first surface of an expansion drawing and a second surface adjacent to the first surface corresponds to a point located on a projection drawing and represented by an average value of a first point and a second point where the first point is a point located on the projection drawing and obtained as a result of transformation of the point on the common side based on a transformation formula for the first surface whereas the second point is a point located on the projection drawing and obtained as a result of transformation of the point on the common side based on a transformation formula for the second surface.

The picture-processing apparatus described above may be further provided with a processing means for processing a joint drawing and an expansion-drawing-transforming means for transforming an expansion drawing of each of a plurality of surfaces composing a joint drawing completing processing carried out by the processing means into a projection drawing of the surface on the basis of the new inter-drawing relation.

The computation means is also capable of computing a transformation formula for a surface of a 3-dimensional object from information on the shape of a surface and a characteristic point on a projection drawing of the surface.

The computation means is also capable of computing a function $M\psi$ or the inverse function thereof as a transformation formula where notation $\psi$ denotes a function of mapping an expansion drawing onto a surface of a 3-dimensional object in a 3-dimensional space and notation M denotes a function of projecting the 3-dimensional object on a screen as a 2-dimensional picture.

A picture-processing method provided by the present invention is characterized in that the method comprises the steps of computing a transformation formula prescribing an inter-drawing relation between a projection drawing of a surface composing a 3-dimensional object displayed on a 2-dimensional picture and an expansion drawing of the surface and correcting the inter-drawing relation prescribed by the transformation formula and outputting a new inter-drawing relation as a result of correction.

A recording medium provided by the present invention is characterized in that the medium is used for recording a program comprising the steps of computing a transformation formula prescribing an inter-drawing relation between a projection drawing of a surface composing a 3-dimensional object displayed on a 2-dimensional picture and an expansion drawing of the surface and correcting the inter-drawing relation prescribed by the transformation formula and outputting a new inter-drawing relation as a result of correction.

BRIEF DESCRIPTION OF THE DRAWINGS

FIG. 3 is a block diagram showing a typical hardware configuration of an embodiment implementing a picture-processing apparatus to which the present invention is applied;

FIG. 7 shows a flowchart used as a reference in a description of processing carried out by the picture-processing apparatus shown in FIG. 4;

FIGS. 11A to 11D are a plurality of explanatory diagrams used as a reference in a description of an operation to copy a texture by a combination of copy processing and paste processing;

FIG. 13 shows a flowchart used as a reference in a description of details of processing carried out at a step S7 of the flowchart shown in FIG. 7;

FIG. 17 is an explanatory diagram used as a reference in a description of a technique of correcting characteristic points;

FIG. 24 is an explanatory diagram used as a reference in a description of details of processing carried out at a step S53 of the flowchart shown in FIG. 23;

FIGS. 26A, 26B, 26C and 26D are a plurality of explanatory diagrams used as a reference in a description of erase processing;

FIGS. 27A and 27B are a plurality of explanatory diagrams used as a reference in a description of copy processing carried out on a plurality of surfaces;

FIGS. 30A and 30B are a plurality of other explanatory diagrams used as a reference in a description of copy processing carried out on a plurality of surfaces;

FIGS. 31A and 31B are a plurality of explanatory diagrams used as a reference in a description of a problem caused by an effect of distorted-line aberration or the like;

FIGS. 32A and 32B are a plurality of explanatory diagrams used as a reference in a description of a case in which points of elimination do not coincide with each other due to an effect of distorted-line aberration or the like;

FIGS. 39A and 39B are a plurality of diagrams showing details of processing carried out at a step S101 of the flowchart shown in FIG. 37;

FIG. 43 shows a flowchart used as a reference in a description of details of processing carried out at a step S104 of the flowchart shown in FIG. 37;

FIGS. 44A and 44B are a plurality of diagrams showing details of processing carried out at a step S105 of the flowchart shown in FIG. 37; and FIGS. 45A and 45B are a plurality of diagrams showing an expansion drawing obtained as a result of copy processing represented by the flowchart shown in FIG. 36.

DETAILED DESCRIPTION OF PREFERRED EMBODIMENTS

Figure 1A:
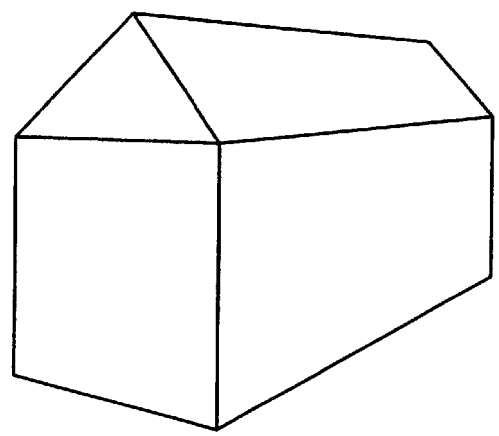
FIGS. 1A to 1C are a plurality of diagrams each showing a result of drawing by means of the conventional paint tool.
Figure 1B:
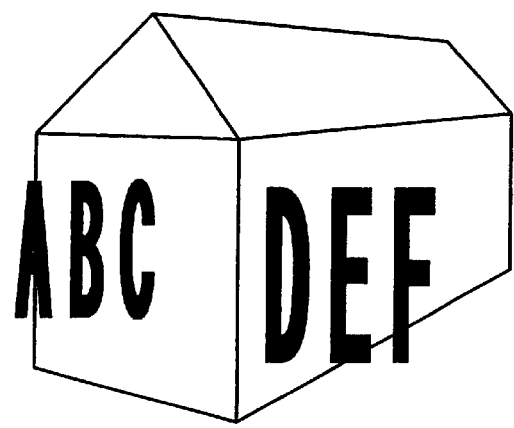
Figure 1C:
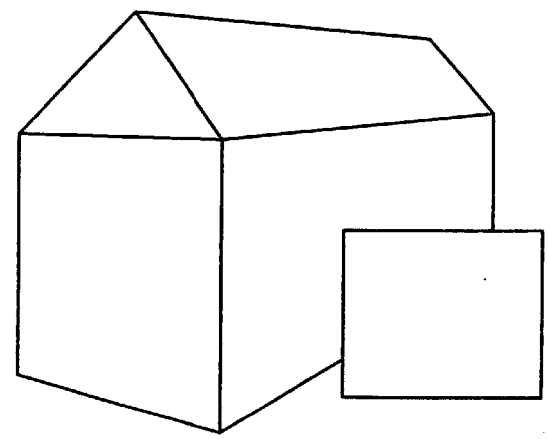
Figure 2A:
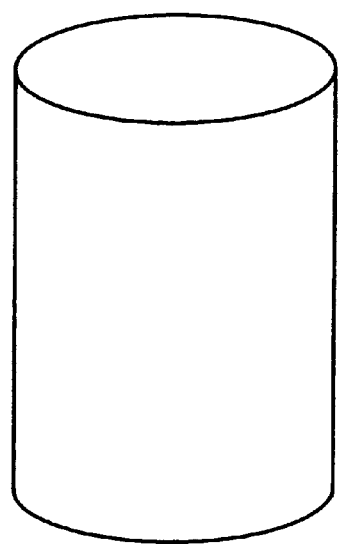
FIGS. 2A and 2B are a plurality of diagrams each showing another result of drawing by means of the conventional paint tool.
Figure 2B:
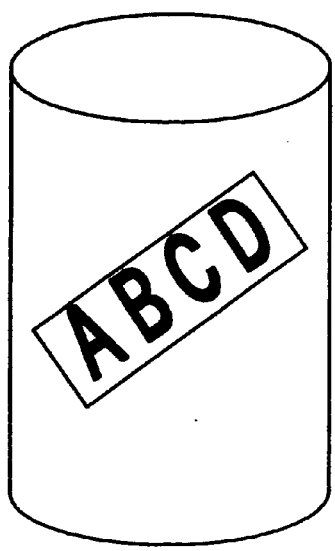

FIG. 3 is a block diagram showing a typical hardware configuration of an embodiment implementing a picture-processing apparatus to which the present invention is applied. Based on a computer, the picture-processing apparatus can be used for easily processing such as 3-dimensional editing work carried out on a 2-dimensional picture.

To put it in detail, the picture-processing apparatus employs a processing circuit 1, which is implemented typically by a CPU (Central Processing Unit). The processing circuit 1 executes application programs stored in (or loaded into) a program memory 2 under control of an OS (Operating System) also stored in (or loaded into) the program memory 2 in order to carry out various kinds of processing on a 2-dimensional picture to be described later. Implemented typically by a RAM (Random-Access Memory), the program memory 2 is used for temporarily storing an OS and an application program loaded from an external storage unit 7. Also implemented typically by a RAM, a data memory 3 is used for temporarily storing data used in processing carried out by the processing circuit 1. Also implemented typically by a RAM, a frame memory 4 is used for storing picture data to be displayed on a picture display unit 5. Implemented typically by a CRT (Cathode Ray Tube) or a liquid-crystal display device, the picture display unit 5 displays picture data stored in the frame memory 4 typically on a multi-window screen. Implemented typically by a combination of a mouse, a pen and a tablet in conjunction with a keyboard, an input unit 6 is operated by the user for, among others, entering a necessary command and necessary data as well as specifying a location on the screen of the picture display unit 5. Implemented typically by a hard disc, a floppy disc, a CD-ROM (Compact-Disc ROM) and a magnetic-optical disc, the external storage unit 7 is used for storing the OS and the application programs. The external storage unit 7 is also used for storing data required in the processing carried out by the processing circuit 1 and digital data representing a 2-dimensional picture serving as an object of the processing. An external interface 8 functions as an interface for inputting data supplied by an external source. Examples of such data are a 2-dimensional picture taken by a camera 9 and data received from a communication line not shown in the figure.

It should be noted that the processing circuit 1, the program memory 2, the data memory 3, the frame memory 4, the input unit 6, the external storage unit 7 and the external interface 8 are connected to each other by a bus. Programs and data are transferred among the processing circuit 1, the program memory 2, the data memory 3, the frame memory 4, the input unit 6, the external storage unit 7 and the external interface 8 through the bus.

When the power supply of the picture-processing apparatus with the configuration described above is turned on, the OS is loaded from the external storage unit 7 to the program memory 2 to be executed by the processing circuit 1. When the user operates the input unit 6 to load an application program, the application program is also loaded from the external storage unit 7 to the program memory 2 to be executed by the processing circuit 1 as well under control of the OS. The application program is executed to carry out typically various kinds of processing on a 2-dimensional picture taken by the camera 9 and loaded into the external storage unit 7 by way of the external interface 8.

Figure 4:
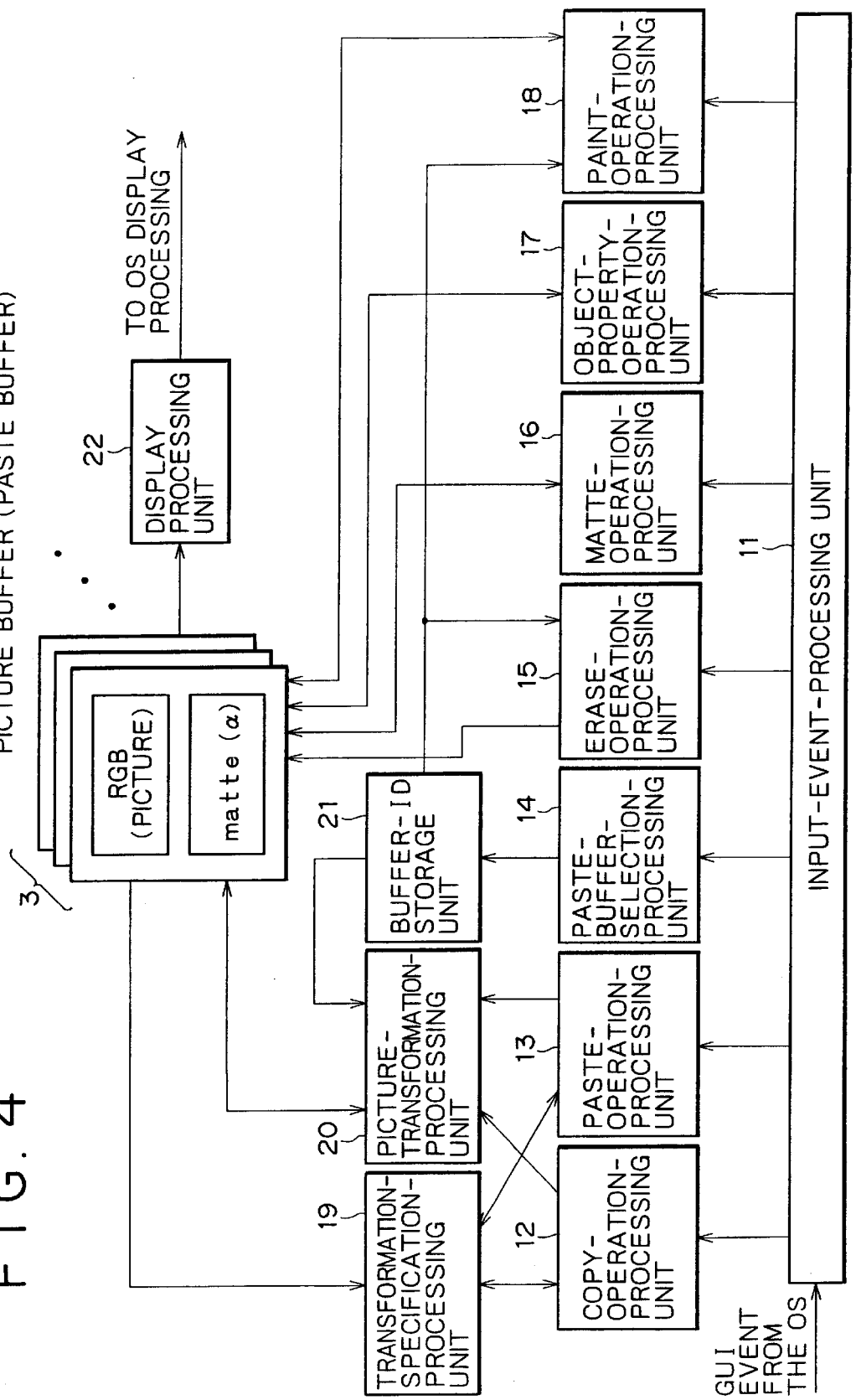
FIG. 4 is a block diagram showing a typical functional configuration of the picture-processing apparatus shown in FIG. 3.

FIG. 4 is a block diagram showing a typical functional configuration of the picture-processing apparatus shown in FIG. 3. The functional configuration is implemented by execution of application programs by the processing circuit 1.

An input-event-processing unit 11 receives a GUI event supplied by the OS. The input-event-processing unit 11 analyzes the GUI event, and activates a copy-operation-processing unit 12, a paste-operation-processing unit 13, a paste-buffer-selection-processing unit 14, an erase-operation-processing unit 15, a matte-operation-processing unit 16, an object-property-operation-processing unit 17 and a paint-operation-processing unit 18 to carry out processing in accordance with a result of analysis.

Examples of the GUI event are a movement of a mouse cursor, an operation to click a mouse, that is, an operation to press the mouse down or up and selection of a menu item on a GUI screen or an operation of a button on the screen. A GUI event is defined in a window system such as X Window.

The copy-operation-processing unit 12 carries out copy processing to store or copy a picture to a paste buffer to be described later. The paste-operation-processing unit 13 carries out paste processing to stick or paste a picture stored in the paste buffer on a 2-dimensional picture stored in a picture buffer also to be described later. The paste-buffer-selection-processing unit 14 carries out paste-buffer-selection processing of selecting one of picture buffers to be used as a paste buffer and storing the ID (identification) of the selected picture buffer in a buffer-ID storage unit 21.

An area in the data memory 3 is allocated as a plurality of picture buffers. The picture buffers are each used for storing pixel values of a picture displayed typically on a screen unit. An ID is assigned to each of the picture buffers so that each picture buffer can be identified. A particular picture buffer, the ID of which is stored in the buffer-ID storage unit 21, is referred to as a paste buffer. It should be noted that a picture buffer can be used for storing not only pixel values of a 2-dimensional picture such as RGB values, but also a matte of a object displayed on the 2-dimensional picture. The matte will be described later.

The erase-operation-processing unit 15 carries out erase processing to delete a portion of a picture stored in the paste buffer. The matte-operation-processing unit 16 carries out matte processing to generate a matte for a 3-dimensional object displayed as a 2-dimensional picture stored in a picture buffer. The object-property-operation-processing unit 17 carries out material-property processing to change the so-called material properties such as the color and the material sensitivity of a 3-dimensional object displayed as a 2-dimensional picture stored in a picture buffer and light-source-changing processing to change a light source, that is, to change the degree of illumination on a 3-dimensional object displayed as a 2-dimensional picture stored in a picture buffer. The paint-operation-processing unit 18 carries out 2D-paint processing on a picture stored in the paste buffer.

In accordance with requests made by the copy-operation-processing unit 12 and the paste-operation-processing unit 13, a transformation-specification processing unit 19 corrects the position of a characteristic point on a 2-dimensional picture stored in a picture buffer specified by the user by operating the input unit 6, and feeds the characteristic point with its position corrected back to the copy-operation-processing unit 12 and the paste-operation-processing unit 13. Also in accordance with requests made by the copy-operation-processing unit 12 and the paste-operation-processing unit 13, a picture-transformation-processing unit 20 transforms a picture stored in a picture buffer or the paste buffer. The buffer-ID storage unit 21 is used for storing the ID of a picture buffer selected by the paste-buffer-selection-processing unit 14 as the paste buffer. It should be noted that the buffer ID stored in the buffer-ID storage unit 21 is supplied to the erase-operation-processing unit 15, the paint-operation-processing unit 18 and the picture-transformation-processing unit 20, hence allowing the erase-operation-processing unit 15, the paint-operation-processing unit 18 and the picture-transformation-processing unit 20 to recognize a picture buffer used as the paste buffer.

A display-processing unit 22 carries out processing necessary for an operation to display a 2-dimensional picture stored in a picture buffer on the picture display unit 5. It should be noted that picture data output by the display-processing unit 22 is fed to display processing carried out by the OS. In the display processing, the picture data is stored into the frame memory 4 to be displayed on the picture display unit 5.

It is also worth noting that the functions of the unit blocks shown in FIG. 4 except the data memory 3 and the buffer-ID storage unit 21 are invoked by the processing circuit 1 during execution of an application program. A routine corresponding to a unit block is typically implemented as a software module.

Figure 5A:
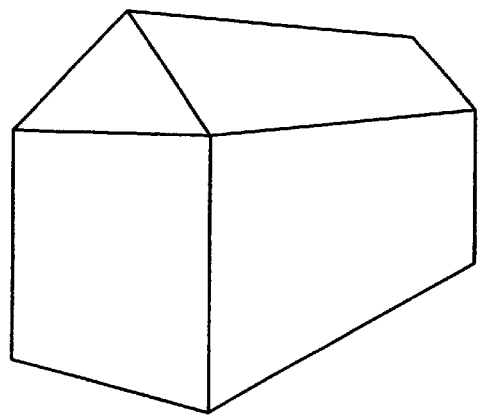
FIGS. 5A to 5C are a plurality of diagrams showing results of processing of a 2-dimensional picture carried out by the picture-processing apparatus shown in FIG. 4.
Figure 5B:
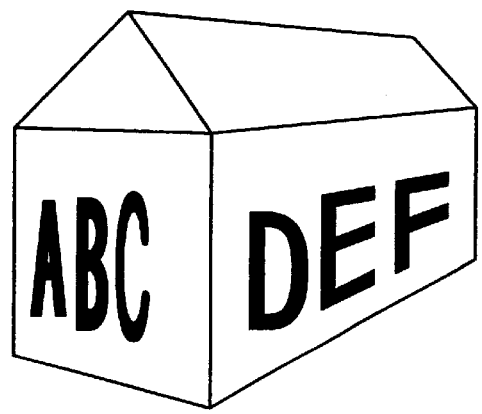
Figure 5C:
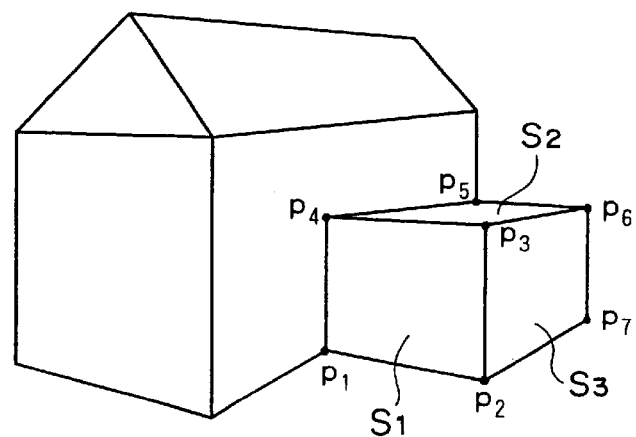
Figure 6A:
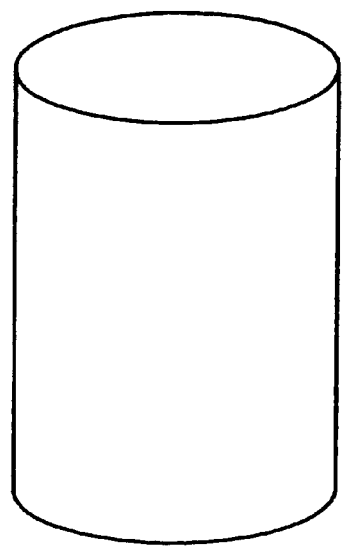
FIGS. 6A and 6B are a plurality of diagrams showing results of processing of another 2-dimensional picture carried out by the picture-processing apparatus shown in FIG. 4.
Figure 6B:
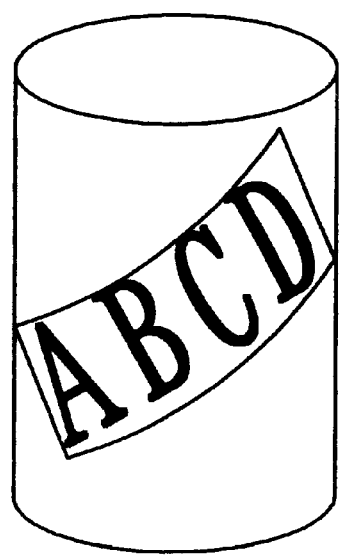

With the picture-processing apparatus having the configuration described above, a 2-dimensional picture representing a 3-dimensional object serving as a model of a house like one shown in FIG. 5A is stored in a picture buffer and, when characters are added to walls of the house, a 2-dimensional picture appearing as if each of the characters were really drawn on the walls as shown in FIG. 5B is obtained even if the characters are drawn without taking the orientations of the walls into consideration. In addition, when a cubic room is added to a wall of the house, a 2-dimensional picture appearing as if the room were really appended to the wall as shown in FIG. 5C is obtained even if the room is drawn without taking the orientation of the wall into consideration. FIG. 6A is a diagram showing a 2-dimensional picture of a cylinder stored in a picture buffer. Also in this case, when characters are added to the side surface of the cylinder, a 2-dimensional picture appearing as if each of the characters were really drawn on the side surface as shown in FIG. 6B is obtained even if the characters are drawn without taking the orientation of the side surface into consideration.

That is to say, by carrying out a 3-dimensional operation to add characters and/or the like to a 2-dimensional picture obtained as a result of photographing a 3-dimensional object without the characters and/or the like by means of the camera 9, it is possible to obtain a 2-dimensional picture with ease as if the 2-dimensional picture were obtained as a result of photographing a 3-dimensional object including the characters and/or the like without really photographing the 3-dimensional object including the characters and/or the like.

Next, processing carried out by the picture-processing apparatus shown in FIG. 4 is explained by referring to a flowchart shown in FIG. 7.

Figure 8:
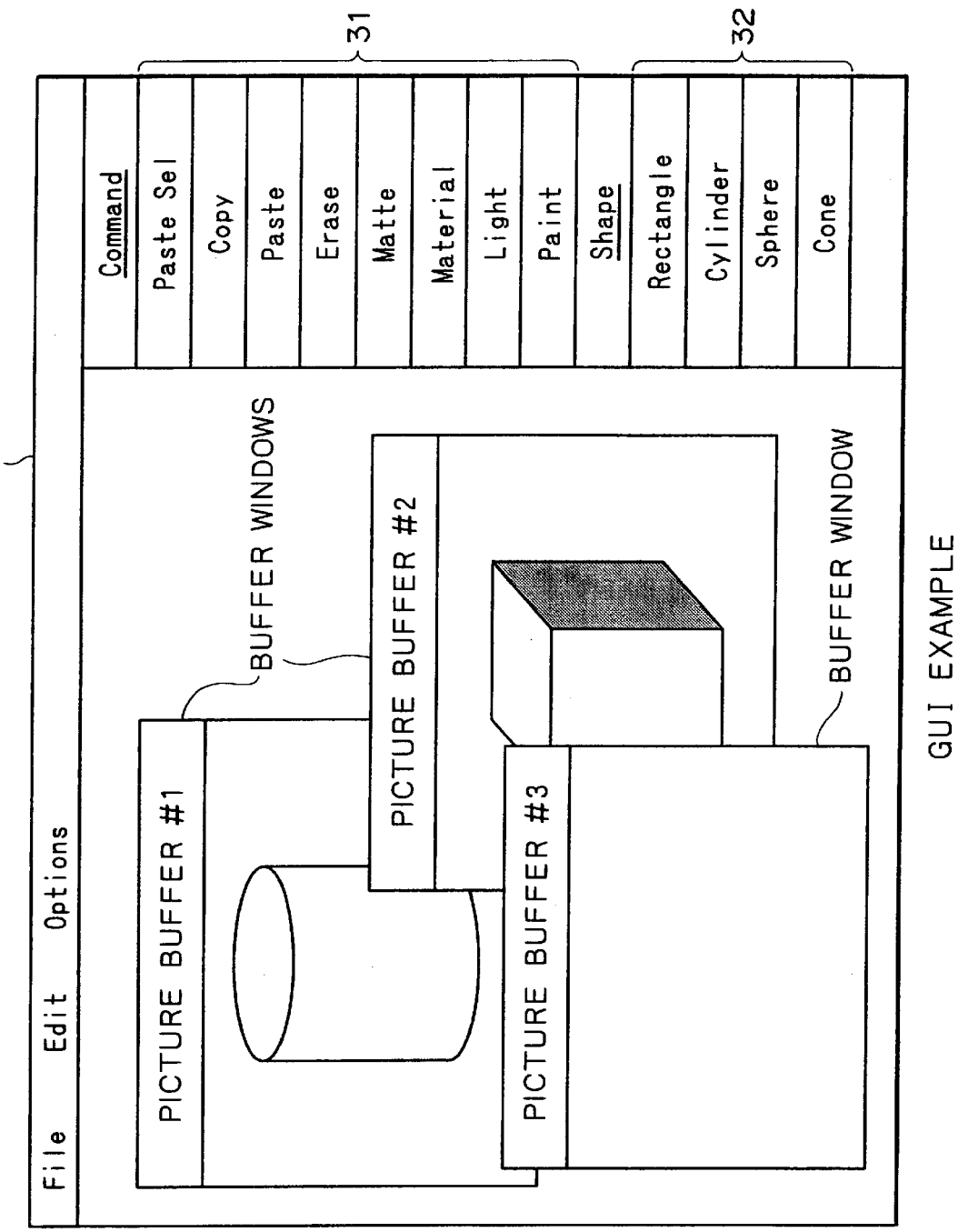
FIG. 8 is a diagram showing a main window, which is displayed when the picture-processing apparatus shown in FIG. 4 is activated.

When the processing circuit 1 shown in FIG. 3 executes an application program, a main window like one shown in FIG. 8 is displayed on the picture display unit 5. On the right side of the main window, command buttons 31 and shape buttons 32 are displayed. On the left side of the buttons 31 and 32, there appears a window for displaying a 2-dimensional picture stored in a picture buffer. The window is referred to hereafter as a buffer window.

The user operates a command button 31 to enter a command as follows. To be more specific, in the embodiment shown in FIG. 8, a Paste Sel. command button 31 is operated to carry out the paste-buffer selection processing and a Copy command button 31 is operated to perform copy processing. A Paste command button 31 is operated to carry out paste processing and an Erase command button 31 is carried out to perform erase processing. A Matte command button 31 is operated to carry out matte processing and a Material command button 31 is operated to perform object-property processing. A Light command button 31 is operated to carry out light-source-changing processing and a Paint command button 31 is operated to perform paint processing.

On the other hand, the user operates a shape button 32 to enter information on the shape of a surface of a 3-dimensional object being processed. To be more specific, in the embodiment shown in FIG. 8, a Rectangle button 32 is operated to indicate that the shape of a surface is rectangular and a Cylinder button 32 is operated to specify that the shape of a surface is cylindrical. A Sphere button 32 is operated to indicate that the shape of a surface is spherical and a Cone button 32 is operated to specify that the shape of a surface is conical.

In addition, in the embodiment shown in FIG. 8, 3 buffer windows appear on the screen to display data stored in picture buffers #1, #2 and #3 among a plurality of picture buffers. Typically, the suffix #j of picture buffer #j represents the buffer ID assigned to picture buffer #j. It should be noted that, typically, data stored in a picture buffer of interest is displayed as a front-most buffer window among a plurality of buffer windows. A front-most buffer window is a window currently activated. A picture buffer of interest will be described more later.

Operations of the main window are basically a uniform user-interface operation in which a picture buffer to be processed is selected and then processing to be carried out for the selected picture buffer is specified. Thus, first of all, the user specifies one of the buffer windows appearing on the main window by carrying out an operation to click the mouse of the input unit 6. In this way, a picture buffer associated with the specified buffer window is selected as an object to be processed.

That is to say, when the user clicks one of the buffer windows, at a step S1 of the flowchart shown in FIG. 7, the input-event-processing unit 11 selects a picture buffer, data stored in which is displayed on the clicked buffer window, as a buffer of interest.

Later on, the user clicks one of the command buttons 31. At that time, at the next step S2, the input-event-processing unit 11 recognizes which of the command buttons has been clicked. Then, the flow of processing goes on to a step S3 to form a judgment as to what kind of processing or what operation has been requested from a result of recognition at the step S2. If the result of the judgment formed at the step S3 indicates that the paste-buffer-selection processing has been requested, that is, if the user has operated or clicked the Paste Sel. command button 31, the flow of processing goes on to a step S4 at which the input-event-processing unit 11 activates the paste-buffer-selection-processing unit 14 to carry out the requested paste-buffer-selection processing. In this case, the paste-buffer-selection-processing unit 14 stores the ID of the buffer of interest selected at the step S1, in the buffer-ID storage unit 21, overwriting an ID stored therein so far. As a result, the picture buffer presently selected as the buffer of interest serves as the paste buffer, and the flow of processing goes back to step S1.

If the result of the judgment formed at the step S3 indicates that the copy or paste processing has been requested, that is, if the user has operated or clicked the Copy or Paste command button 31, the flow of processing goes on to a step S5 to enter a state of waiting for a shape button 32 to be operated. Copy processing is processing to generate an expansion drawing and store the expansion drawing in the paste buffer. An expansion drawing of a surface of a 3-dimensional object represented by a 2-dimensional picture stored in the buffer of interest is a drawing obtained as a result of expansion of the surface on a 2-dimensional plane. Paste processing is processing to generate a projection drawing and paste the projection drawing on a 2-dimensional picture stored in the buffer of interest. A projection drawing of a 3-dimensional object is a drawing obtained as a result of projection of the object on a screen. In paste processing, a projection drawing is obtained in the buffer of interest as a result of pasting a picture on a 2-dimensional plane stored in the paste buffer on a surface of a 3-dimensional object. In both the copy processing and the paste processing, a surface of a 3-dimensional object is an object of processing. Thus, after operating the Copy or Paste command button 31, the user enters information on the shape of the surface of the 3-dimensional object to be processed in the copy processing or the paste processing by operating a shape button 32.

As a shape button 32 is operated at the step S5, information on a shape, that is, the shape of a surface of a 3-dimensional object to be processed in the copy processing or the paste processing is recognized. Then, the flow of processing goes on to a step S6 to enter a state of waiting for characteristic points to be entered. To put it in detail, in copy processing, it is necessary to indicate a portion or a surface of a 3-dimensional object represented by a 2-dimensional picture stored in the buffer of interest by specifying some points on the portion or the surface, an expansion drawing of which is to be generated. In addition, in paste processing, a projection drawing of a picture stored in the paste buffer is pasted typically on a surface of a 3-dimensional object represented by a 2-dimensional picture stored in the buffer of interest. It is thus necessary to indicate the surface by specifying some characteristic points on the surface. In either processing, after operating the Copy or Paste command button 31, the user enters information on the shape of the surface of the 3-dimensional object to be processed in the copy processing or the paste processing by operating a shape button 32. Subsequently, the user operates the input unit 6 in order to specify some characteristic points on the surface of the 3-dimensional object serving as a processing object represented by the 2-dimensional picture stored in the buffer of interest.

At the next step S6, the coordinates of the characteristic points in the 2-dimensional picture specified as described above are recognized.

In the case described above, characteristic points are specified after information on the shape of a 3-dimensional object is specified. It should be noted, however, that characteristic points can also be specified first before information on the shape of a 3-dimensional object is specified. In addition, the pieces of processing at the steps S5 and S6 are carried out by the copy-operation-processing unit 12 if copy processing is specified, or by the paste-operation-processing unit 13 if paste processing is specified.

At the step S6, the copy-operation-processing unit 12 or the paste-operation-processing unit 13 supplies the recognized characteristic points specified by the user to the transformation-specification-processing unit 19. After receiving the characteristic points, at the next step S7, the transformation-specification-processing unit 19 corrects the positions of the characteristic points and then supplies the corrected characteristic points back to the copy-operation-processing unit 12 or the paste-operation-processing unit 13 from which the points were received.

At the next step S8, the input-event-processing unit 11 forms a judgment as to whether the Copy or Paste button 31 was operated. If the outcome of the judgment indicates that the Copy button 31 was operated, the copy-operation-processing unit 12 carries out copy processing. To put it in detail, the flow of processing goes on from the step S8 to a step S9 at which the copy-operation-processing unit 12 computes a transformation formula based on the information on a shape and the characteristic points. The transformation formula is referred to hereafter as an inverse-transformation formula supplied to the picture-transformation-processing unit 20. At the next step S10, the picture-transformation-processing unit 20 uses the inverse-transformation formula for transforming a surface of a 3-dimensional object represented by a 2-dimensional picture (a surface specified by the characteristic points) stored in the buffer of interest into an expansion drawing. At the next step S11, the picture-transformation-processing unit 20 copies the expansion drawing to the paste buffer, overwriting data existing in the paste buffer, which is a picture buffer with the ID thereof stored in the buffer-ID storage unit 21 as described earlier. The flow of processing then goes back to the step S1.

Figure 9B:
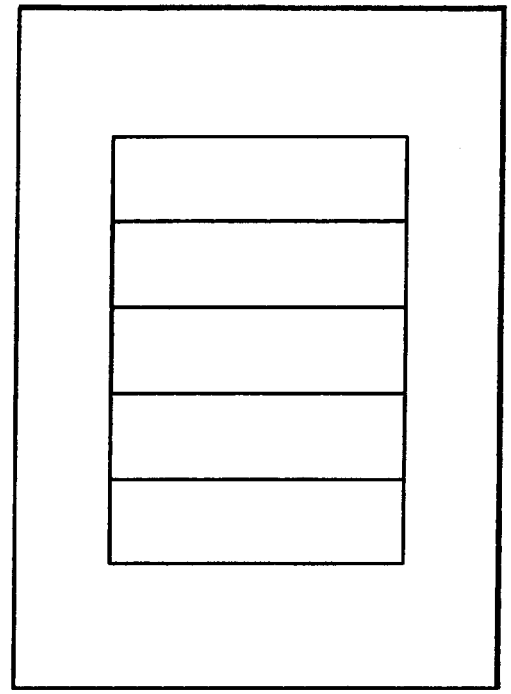
FIGS. 9A and 9B are a plurality of explanatory diagrams used as a reference in a description of copy processing.
Figure 9A:
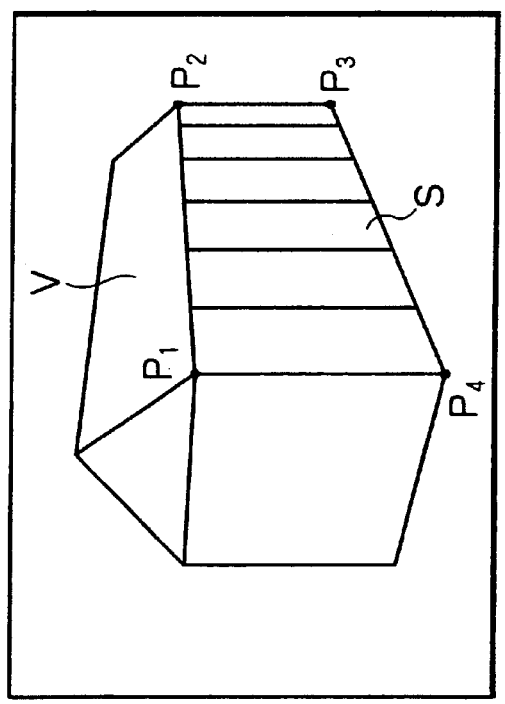

Assume that a 2-dimensional picture shown in FIG. 9A to represent a 3-dimensional object V serving as a model of a house is stored in the buffer of interest. In this case, as information on the shape of a wall surface S including vertical lines, a rectangular shape is specified whereas, as characteristic points, the vertexes $P_1$, $P_2$, $P_3$ and $P_4$ of the wall surface S are specified. In the copy processing described above, a 2-dimensional picture of the wall surface S including vertical lines, that is, an expansion drawing, is obtained as a result of expansion of the surface S of the 3-dimensional object V on a 2-dimensional plane as shown in FIG. 9B by transformation based on the inverse-transformation formula, and stored in the paste buffer.

In other words, assume that the 2-dimensional picture shown in FIG. 9A to represent a 3-dimensional object V has been stored in a picture buffer. In this case, when the user wants to obtain an expansion drawing of the wall surface S including vertical lines as shown in FIG. 9B, as a first step, the user designates the picture buffer for storing the 2-dimensional picture representing the 3-dimensional object V as the buffer of interest. As a second step, the user operates the Copy button 31. As a third step, the user operates the Rectangle button 32 to specify the rectangle as the shape of the wall surface S. As a fourth step, the vertexes $P_1$, $P_2$, $P_3$ and $P_4$ of the wall surface S including vertical lines in the 2-dimensional picture as shown in FIG. 9A are specified as characteristic points.

If the outcome of the judgment formed at the step S8 indicates that the Paste button 31 was operated, on the other hand, the paste-operation-processing unit 13 carries out paste processing. To put it in detail, the flow of processing goes on from the step S8 to a step S12 at which the paste-operation-processing unit 13 computes a transformation formula based on the information on a shape and the characteristic points. The transformation formula is referred to hereafter as a forward-transformation formula supplied to the picture-transformation-processing unit 20. At the next step S13, the picture-transformation-processing unit 20 uses the forward-transformation formula for transforming a picture stored in the paste buffer into a projection drawing. At the next step S14, the picture-transformation-processing unit 20 pastes the projection drawing on a surface of a 3-dimensional object represented by a 2-dimensional picture (a surface specified by the characteristic points) stored in the buffer of interest. The flow of processing then goes back to the step S1.

Figure 10A:
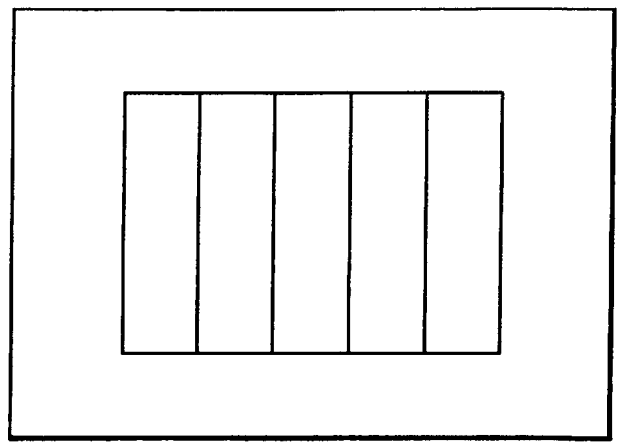
FIGS. 10A to 10C are a plurality of explanatory diagrams used as a reference in a description of paste processing.
Figure 10B:
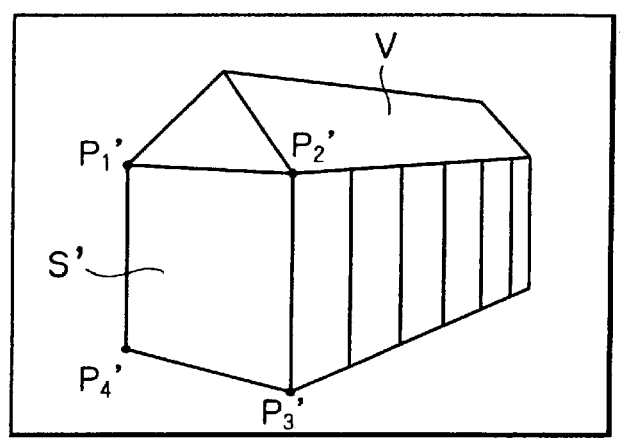

Assume that a picture on a 2-dimensional plane like one shown in FIG. 10A has been stored into the paste buffer by the copy processing explained earlier by referring to FIG. 9 and a 2-dimensional picture representing a 3-dimensional object V serving as a model of a house as shown in FIG. 10B is stored in the buffer of interest. In this case, in the paste processing described above, when a rectangle is specified as information on the shape of a blank wall surface S' of the 3-dimensional object V and the 4 vertexes $P_1'$, $P_2'$, $P_3'$ and $P_4'$ of the wall surface S' are specified as characteristic points, a projection drawing of the expansion drawing stored in the paste buffer is generated by transformation based on the forward-transformation formula and pasted on the wall surface S' of the 3-dimensional object V represented by the 2-dimensional picture stored in the buffer of interest, that is, a wall surface identified by the characteristic points $P_1'$ to $P_4'$ as shown in FIG. 10B to generate a projection drawing of the surface S' with the picture of FIG. 10A pasted thereon. As described earlier, the projection drawing of the wall surface S' is a drawing of the wall surface S' obtained as a result of projection of the surface S' on a screen.

Figure 10C:
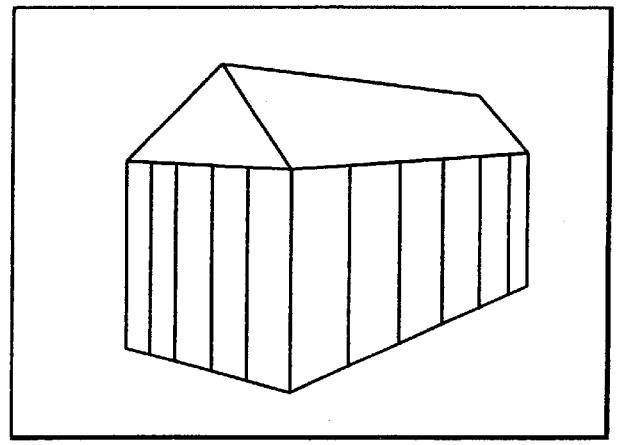

In other words, assume that the picture like the one shown in FIG. 10A has been stored in the paste buffer and the 2-dimensional picture of the 3-dimensional object V serving as a model of a house like the one shown in FIG. 10B has been stored in a picture buffer. In this case, when the user desires to obtain a 2-dimensional picture with the picture in the paste buffer pasted on the wall surface S' of the 3-dimensional object V as shown in FIG. 10C, as a first step, the user designates the picture buffer for storing the 2-dimensional picture representing the 3-dimensional object V as the buffer of interest. As a second step, the user operates the Paste button 31. As a third step, the user operates the Rectangle button to specify the rectangle as the shape of the wall surface S'. As a fourth step, the vertexes $P_1'$, $P_2'$, $P_3'$ and $P_4'$ of the rectangle of the wall surface S' in the 2-dimensional picture as shown in FIG. 10B are specified as characteristic points.

As is obvious from the above description, if copy processing explained earlier by referring to FIG. 9 is carried out by specifying a picture buffer for storing a 2-dimensional picture of a 3-dimensional object as the buffer of interest and followed by paste processing explained earlier by referring to FIG. 10, the texture of a wall surface S of the 2-dimensional picture can be copied to another wall surface S' thereof. That is to say, the user is capable of copying the texture of the wall surface S of the 2-dimensional picture to the other wall surface S' thereof by carrying out operations to perform the copy and the paste processing without specially being aware of orientations of the wall surfaces S and S'.

In addition, assume that characters ABC and DEF have been drawn in the paste buffer by using the conventional 2D painting technique or the like in a way similar to a technique to write characters on a plane. In this case, the characters can be pasted on walls of a house shown in FIG. 5A to obtain a natural 2-dimensional picture shown in FIG. 5B. That is to say, it is not necessary to draw the characters on the walls in order to obtain the natural 2-dimensional picture shown in FIG. 5B.

As another example, assume that an expansion drawing of surfaces $S_1$, $S_2$ and $S_3$ shown in FIG. 5C has been stored in the paste buffer, or a picture buffer for storing a texture for the expansion drawing of surfaces $S_1$, $S_2$ and $S_3$ is designated as the paste buffer. In this case, when paste processing is carried out with the vertexes $p_1$, $p_2$, $p_3$ and $p_4$ of the surface $S_1$ specified as characteristic points and a rectangle is specified as information on the shape of the surface $S_1$, the surface $S_1$ is added to a wall of the house of FIG. 5A as shown in FIG. 5C. In the same way, when second paste processing is carried out with a surface $S_2$ of FIG. 5C stored in the paste buffer, the vertexes $p_3$, $p_4$, $p_5$ and $p_6$ of the surface $S_2$ specified as characteristic points and a rectangle is specified as information on the shape of the surface $S_2$, the surface $S_1$ is added to the wall of the house of FIG. 5A as shown in FIG. 5C. By the same token, when third paste processing is carried out with a surface $S_3$ of FIG. 5C stored in the paste buffer, the vertexes $p_2$, $p_3$, $p_6$ and $p_7$ of the surface $S_3$ specified as characteristic points and a rectangle is specified as information on the shape of the surface $S_3$, the surface $S_3$ is added to the wall of the house of FIG. 5A as shown in FIG. 5C. As a result, a 2-dimensional picture of the house with a cubic room added thereto can be created with ease.

As is obvious from FIG. 5, a 3-dimensional object subjected to paste processing may or may not be displayed in a 2-dimensional picture stored in the buffer of interest. For example, FIG. 5B shows a case in which an original 3-dimensional object subjected to the paste processing, that is, an original 3-dimensional object on which characters are to be pasted, is shown in the original 2-dimensional picture, that is, the 2-dimensional picture shown in FIG. 5A. On the other hand, FIG. 5C shows a case in which an additional 3-dimensional object subjected to the paste processing, that is, the cube prescribed by the surfaces $S_1$, $S_2$ and $S_3$ shown in FIG. 5C, is not shown in the original 2-dimensional picture of FIG. 5A. It should be noted that, in the case in which an additional 3-dimensional object subjected to the paste processing is not shown in the original 2-dimensional picture, the processing to correct characteristic points specified by the user on the original 2-dimensional object, that is, the step S7 of the flowchart shown in FIG. 7 is skipped. As described earlier, in the processing carried out at the step S7, characteristic points specified by the user are corrected so that they are located on contour lines of an original 3-dimensional object shown in the 2-dimensional picture of FIG. 5A. Since the additional 3-dimensional object is not shown in the original 2-dimensional picture of FIG. 5A, however, the contour lines do not exist in the 2-dimensional picture.

In addition, an expansion drawing obtained from an original 2-dimensional picture by carrying out copy processing can be pasted on a 2-dimensional picture other than the original picture. Moreover, a surface of a 3-dimensional object on which an expansion drawing is to be pasted does not have to be the same shape as a surface of a 3-dimensional object serving as a source for generating the expansion drawing as shown in FIG. 11. To be more specific, FIG. 11A shows a 2-dimensional picture of a 3-dimensional object, which is a model representing the shape of a house. The 2-dimensional picture is stored in the buffer of interest. Copy processing is carried out to copy a wall surface with a lattice pattern to the paste buffer by creating an expansion drawing in the paste buffer shown in FIG. 11B. Another picture buffer for storing a 2-dimensional picture of a cylinder shown in FIG. 11C is then designated as the buffer of interest. The side surface of the cylinder is used as an object of paste processing to paste the lattice-pattern wall surface on the side surface of the cylinder as shown in FIG. 11D. That is to say, a texture of a 3-dimensional object can be pasted on another 3-dimensional object as a texture of the other object.

Furthermore, the paste buffer can be used for storing not only an expansion drawing obtained as a result of copy processing, but also any arbitrary drawing. Thus, by carrying out paste processing, any arbitrary drawing including an additional 3-dimensional object to be pasted can be pasted on an original 3-dimensional object represented by a 2-dimensional picture stored in the buffer of interest. As described above by referring to FIG. 5C, the additional 3-dimensional object to be pasted does not have to be shown in the 2-dimensional picture.

Besides the operations described above, the copy processing and the paste processing allow a variety of 3-dimensional operations to be carried out on a 2-dimensional picture. For example, an uneven surface of a 3-dimensional object represented by a 2-dimensional picture is copied to the paste buffer by carrying out copy processing to create an expansion drawing in the paste buffer. In the paste buffer, the unevenness of the surface is eliminated and, then, the surface with the unevenness thereof removed is subjected to paste processing to paste the surface on the original 3-dimensional object. As a result, it is possible to obtain a 2-dimensional picture representing the 3-dimensional object with the unevenness eliminated from the surface. In addition, in copy processing and paste processing carried out on a 3-dimensional object, characteristic points different from those specified in the copy processing may be specified in the paste processing. As a result, operations such as a movement, an enlargement, a shrinkage process and other nonlinear deformations can be carried out on the 3-dimensional object. An example of the nonlinear deformation is a deformation obtained as if photographing were carried out by using a lens having a special optical characteristic of the so-called fish-eye lens or the like.

Refer back to the flowchart shown in FIG. 7. If the result of the judgment formed at the step S3 indicates that the matte processing has been requested, that is, if the user has operated or clicked the Matte command button 31, the flow of processing goes on to a step S15 at which the input-event-processing unit 11 activates the matte-operation-processing unit 16 to carry out the matte processing. In this case, the matte-operation-processing unit 16 generates a matte of a 3-dimensional object represented by a 2-dimensional picture stored in the buffer of interest, and stores the matte in the buffer of interest. The flow of processing then goes back to the step S1. It should be noted that details of the matte processing will be described later.

If the result of the judgment formed at the step S3 indicates that the object-property processing or the light-source changing processing has been requested, that is, if the user has operated or clicked the Material or Light button 31, the flow of processing goes on to a step S16 at which the input-event-processing unit 11 activates the object-property-operation-processing unit 17 to carry out the object-property processing or the light-source changing processing (object-property/light-source-changing processing). The flow of processing then goes back to the step S1. It should be noted that details of the object-property processing or the light-source-changing processing will be described later.

If the result of the judgment formed at the step S3 indicates that the erase processing has been requested, that is, if the user has operated or clicked the Erase command button 31, the flow of processing goes on to a step S17 at which the input-event-processing unit 11 activates the erase-operation-processing unit 15 to carry out the erase processing. The flow of processing then goes back to the step S1. It should be noted that details of the erase processing will be described later.

If the result of the judgment formed at the step S3 indicates that the paint processing has been requested, that is, if the user has operated or clicked the Paint command button 31, the flow of processing goes on to a step S18 at which the input-event-processing unit 11 activates the paint-operation-processing unit 18 to carry out the paint processing. The flow of processing then goes back to the step S1. In the paint processing, a portion of a picture stored in the paste buffer is erased or another picture such as characters and a figure is added to the picture stored in the paste buffer by using typically a paint tool for performing 2D paint processing in the same way as the conventional technique in accordance with an operation carried out by the user on the input unit 6.

For example, as described above, an uneven surface of a 3-dimensional object represented by a 2-dimensional picture is copied to the paste buffer by carrying out copy processing to create an expansion drawing in the paste buffer. In the paste buffer, the unevenness of the surface is eliminated and, then, the surface with the unevenness thereof removed is subjected to paste processing to paste the surface on the original 3-dimensional object. As a result, it is possible to obtain a 2-dimensional picture representing the 3-dimensional object with the unevenness eliminated from the surface.

As another example, a 2-dimensional picture of a wall surface of a 3-dimensional object like the one shown in FIG. 5A is subjected to copy processing to generate an expansion drawing stored in the paste buffer. Then, characters ABC or DEF are drawn on the expansion drawing stored in the paste buffer by carrying out paint processing. Finally, the expansion drawing is pasted on the original wall surface by carrying out paste processing to obtain a natural 2-dimensional picture like the one shown in FIG. 5B. In this way, by carrying out 2D painting, 3-dimensional drawing can be carried out with ease.

Figure 12:
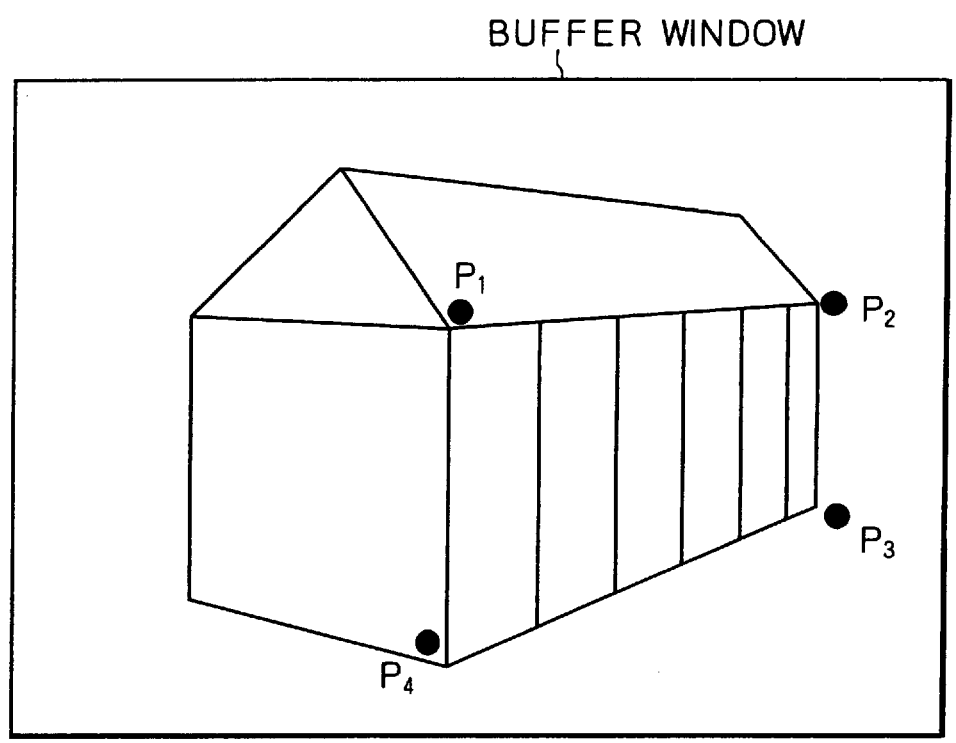
FIG. 12 is a diagram showing characteristic points specified by the user.

In the copy processing explained earlier by referring to FIG. 9 or the paste processing explained earlier by referring to FIG. 10, it is difficult even for a well trained user much familiar with operations to accurately specify the points $P_1$ to $P_4$ as shown in FIG. 9A or the points $P_1'$ to $P_4'$ as shown in FIG. 10B as characteristic points. That is to say, in the copy processing explained earlier by referring to FIG. 9, the positions of the points $P_1$ to $P_4$ actually specified by the user are generally different from the correct positions of the vertexes supposed to be specified as shown in FIG. 12. It is thus difficult even for a well trained user much familiar with operations to accurately specify the correct positions of the vertexes supposed to be specified as characteristic points if the 2-dimensional picture is blurring or vibrating.

In order to solve the above problem, at a step S7 of the flowchart shown in FIG. 7, automatic correction processing is carried out to correct the positions of characteristic points specified by the user to correct positions supposed to be specified.

That is to say, at the step S7, the copy-operation-processing unit 12 or the paste-operation-processing unit 13 invokes the transformation-specification-processing unit 19 and provides the transformation-specification-processing unit 19 with characteristic points and information on a shape, which are specified by the user by operating the unit 6.

The transformation-specification-processing unit 19 carries out automatic correction processing to correct the positions of the characteristic points received along with the information on a shape.

As will be described later, a point supposed to be specified as a characteristic point is basically a point on a contour line or a boundary line of a 3-dimensional object to serve as an object of copy or paste processing. The transformation-specification-processing unit 19 thus extracts contour lines of a surface of a 3-dimensional object to serve as an object of copy or paste processing and corrects the positions of characteristic points so as to place the points on the contour lines.

FIG. 13 shows a flowchart used as a reference in a description of the automatic correction processing carried out by the transformation-specification-processing unit 19. It should be noted that, in order to make the explanation simple, in the explanation, it is assumed that a surface of a 3-dimensional object displayed on a 2-dimensional picture and used as an object of copy or paste processing has a rectangular shape as shown for example in FIG. 12 and, the 4 vertexes of the rectangular surface are supposed to be specified as characteristic points as shown in the same figure.

The flowchart shown in FIG. 13 begins with a step S21 at which the transformation-specification-processing unit 19 selects a pair of adjacent points among characteristic points specified and entered by the user. As described above, a point supposed to be specified as a characteristic point is basically a point on a contour line of a 3-dimensional object represented by a 2-dimensional picture and used as an object of copy or paste processing. In addition, as will be described later, a position on a contour line to be specified is determined in advance in dependence on the shape of the 3-dimensional object. Thus, it is possible to recognize a pair of adjacent points among characteristic points specified and entered by the user on the basis of the shape of the 3-dimensional object. The transformation-specification-processing unit 19 further chooses one of the adjacent points pertaining to the selected pair at the step S21.

At the next step S22, the transformation-specification-processing unit 19 detects an area to serve as an object of edge detection carried out at the next step S23. Such as an area is referred to hereafter as an edge-candidate area. To put it in detail, at the step S22, the transformation-specification-processing unit 19 finds a line segment connecting the 2 characteristic points selected at the step S21. The 2 characteristic points selected at the step S21 are referred to hereafter as selected characteristic points. The transformation-specification-processing unit 19 then detects pixels in a range within a predetermined distance of typically 5 pixels from the line segment. Such a range is referred to hereafter as an edge candidate area.

Figure 14:
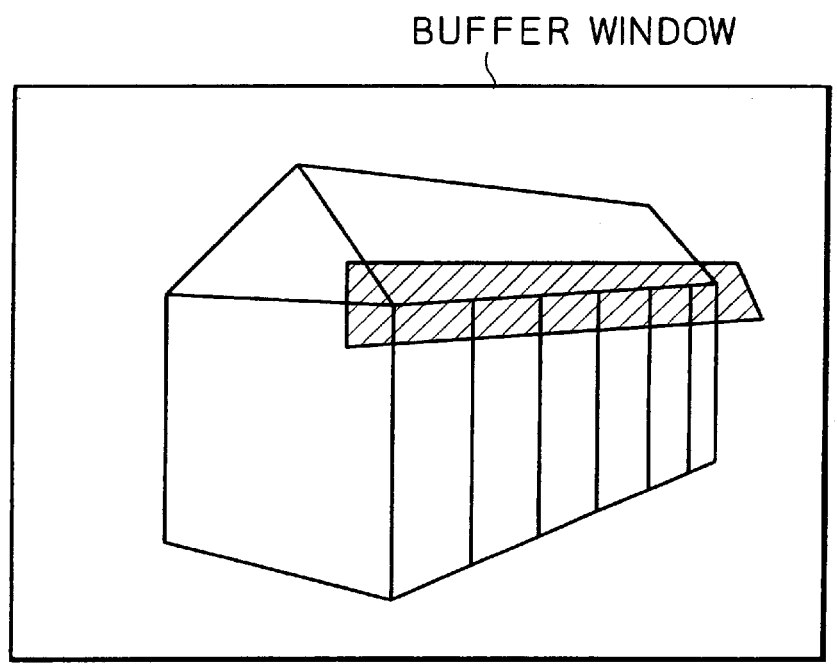
FIG. 14 is an explanatory diagram used as a reference in a description of details of processing carried out at a step S22 of the flowchart shown in FIG. 13.

Assume for example that the characteristic points $P_1$ to $P_4$ are specified as shown in FIG. 12 and the points $P_1$ and $P_2$ are chosen as selected characteristic points. In this case, a hatched range shown in FIG. 14 is detected as an edge candidate area.

It should be noted that, at the step S22, the transformation-specification-processing unit 19 may predetermine a distance from the line segment connecting the 2 selected characteristic points used for defining the edge candidate area from which pixels are detected, or request the user to enter such a distance by operating the input unit 6.

After the edge candidate area is selected, the flow of processing goes on to the step S23 at which the area is subjected to edge detection.

As techniques to detect an edge, a variety of conventional methods have been proposed. While any one of the methods can be adopted, the following technique is embraced.

Pixels in an edge candidate area are filtered by using an edge-detection filter referred to as a Sobel operator, and a gradient at each pixel known as a gradient vector is found. A pixel with a large gradient is detected as a pixel on an edge. While this technique of detecting a pixel with a large gradient as a pixel on an edge is known as a conventional method, in the present invention, an inner product of a normal-line vector and the gradient of each pixel in the edge candidate area is found, and a pixel with an inner product exceeding a threshold value is detected as a pixel on an edge, which is referred to hereafter as an edge pixel. A normal-line vector is a unit vector having a direction perpendicular to the line segment connecting the 2 selected characteristic points to each other.

In the example shown in FIG. 12, points close to but not necessarily coinciding with the vertexes of a rectangular surface of a 3-dimensional object subjected to copy or paste processing are selected as characteristic points. Thus, a line segment connecting 2 selected characteristic points to each other all but coincides with a contour line of the rectangular surface of the 3-dimensional object subjected to copy or paste processing. Thus, the inner product of the normal-line vector and the gradient of a pixel in the edge candidate area represents a component in the direction of the normal-line vector, that is, the component of the gradient in a direction all but perpendicular to the contour line. Accordingly, by detecting an edge by comparison of the magnitude of an inner product with a threshold value, effects of noise and the like can be reduced in comparison with a case in which an edge is detected by comparison of the magnitude of a gradient itself. That is to say, it is possible to carry out edge detection that is not easily affected by noise on a 2-dimensional picture and the texture of a stripe pattern or the like.

After the detection of edge pixels, the flow processing goes on to a step S24 to find a straight line passing through the edge pixels by using typically a least-square method. That is to say, the transformation-specification-processing unit 19 finds a straight line that gives a minimum sum of distances from the line to the edge pixels detected at the step S23. Such a straight line is referred to hereafter as an edge straight line.

Then, the flow processing goes on to a step S25 to form a judgment as to whether or not an edge straight line has been found for each pair of adjacent points among the characteristic points entered by the user. If the outcome of the judgment indicates that an edge straight line has not been found for each pair of adjacent points, the flow of processing goes back to the step S21 to select another pair of adjacent points, for which an edge straight line has not found yet, as selected characteristic points. The same processing is carried out repeatedly thereafter.

As the outcome of the judgment formed at the step S25 indicates that an edge straight line has been found for each pair of adjacent points, that is, after 4 edge straight lines have been found respectively for the pair of adjacent points $P_1$ and $P_2$, the pair of adjacent points $P_2$ and $P_3$, the pair of adjacent points $P_3$ and $P_4$ and the pair of adjacent points $P_4$ and $P_1$ of the example shown in FIG. 12, the flow of processing goes on to a step S26 at which cross points of the 4 edge straight lines are found. To be more specific, a first cross point of the edge line passing through the pair of adjacent points $P_4$ and $P_1$ and the edge line passing through the pair of adjacent points $P_1$ and $P_2$, a second cross point of the edge line passing through the pair of adjacent points $P_1$ and $P_2$ and the edge line passing through the pair of adjacent points $P_2$ and $P_3$, a third cross point of the edge line passing through the pair of adjacent points $P_2$ and $P_3$ and the edge line passing through the pair of adjacent points $P_3$ and $P_4$ and a fourth cross point of the edge line passing through the pair of adjacent points $P_3$ and $P_4$ and the edge line passing through the pair of adjacent points $P_4$ and $P_1$ are found. In addition, at the same step S26, the position of a characteristic point closest to each of the cross points is corrected to the position of the cross point. That is to say, the positions of the characteristic points $P_1$ to $P_4$ are corrected to the positions of the first to fourth cross points respectively. Finally, the flow of processing returns to a calling program.

As described above, in the automatic correction processing, the positions of the characteristic points $P_1$ to $P_4$ specified by the user are moved to the positions of the vertexes, which are supposed to be specified as the characteristic points. It is thus not necessary for the user to accurately specify positions supposed to be specified as characteristic points. That is to say, the user needs only to specify points close to the positions supposed to be specified as characteristic points.

It should be noted that, while the embodiment shown in FIG. 7 always carries out automatic correction processing on the positions of characteristic points, as an alternative, the processing can also be carried out only if the user makes a request for the processing. In addition, the user is also capable of further correcting the positions of characteristic points after being corrected by the automatic correction processing.

Moreover, the automatic correction processing can also be carried out by adoption of the method to detect edge pixels explained earlier by referring to FIG. 13 as follows.

Figure 15:
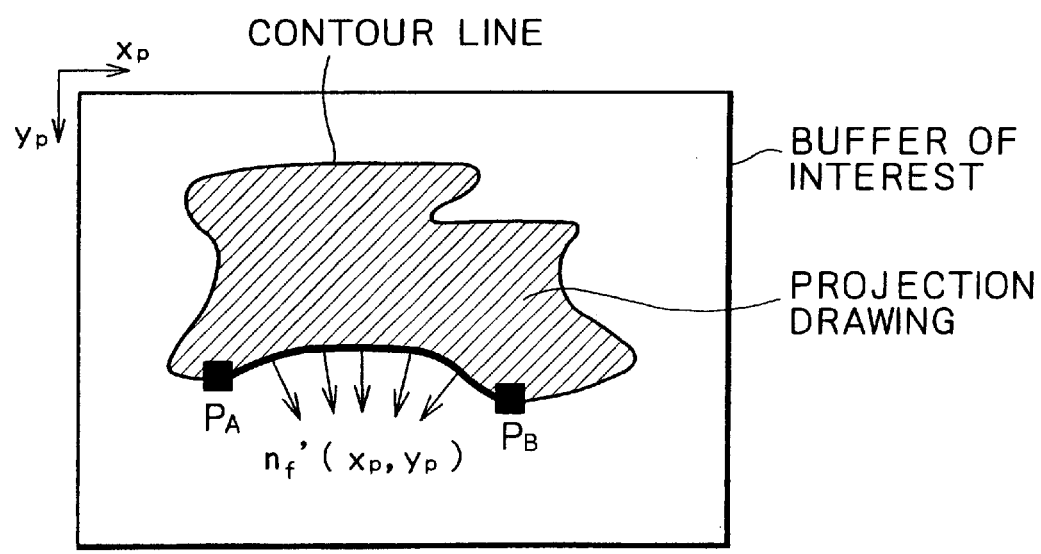
FIG. 15 is an explanatory diagram used as a reference in a description of a technique of extracting a contour line of a 3-dimensional object displayed on a 2-dimensional picture.

Assume that a 2-dimensional picture like one shown in FIG. 15 has been stored in the buffer of interest. It should be noted that a hatched portion shown in FIG. 15 represents a 3-dimensional object displayed on the 2-dimensional picture. Obtained as a result of projecting the 3-dimensional object in a 3-dimensional space on a screen, the picture is referred to hereafter as a projection drawing.

For the 2-dimensional picture shown in FIG. 15, points $P_A$ and $P_B$ are specified as characteristic points of the projection drawing of the 3-dimensional object. It should be noted that the characteristic points $P_A$ and $P_B$ are adjacent to each other on a contour line of the projection drawing of the 3-dimensional object.

Let a 2-dimensional coordinate system be defined with $x_p$ and $y_p$ axes serving as horizontal and vertical axes respectively as shown in FIG. 15 for the 2-dimensional picture stored in the buffer of interest. The 2-dimensional coordinate system is referred to hereafter as a screen coordinate system. The shape of the 3-dimensional object represented by the 2-dimensional picture can be determined from information on a shape. If the shape of the 3-dimensional object is known, a contour line between the characteristic points $P_A$ and $P_B$ of the projection drawing is generally defined by $f=0$ where the symbol f denotes a function, which is represented by using one or more parameters and has $x_p$ and $y_p$ as variables. Since the contour line of a projection drawing basically forms a closed loop, there are 2 contour lines between the characteristic points $P_A$ and $P_B$. In the projection drawing shown in FIG. 15, the 2 contour lines are shown as thin and thick lines respectively. On the contour line represented by the thick line, there are no other characteristic points. The function f has a type or a programming implementation varying in dependence on the 3-dimensional object.

To put it concretely, let symbols $C_1$, $C_2$, - - - and $C_N$ where the suffix N is an integer of at least 1 be the parameters. In this case, the contour line between the characteristic points $P_A$ and $P_B$ can be defined by the following equation:

$$F(x_p, y_p, C_1, C_2, \text{- - -}, C_N) = 0 \quad (1)$$

At a pixel on a true contour line, on the other hand, the component of the pixel value in a direction perpendicular to the contour line generally changes abruptly. It is possible to find the values of the parameters $C_1$, $C_2$, - - - and $C_N$ that maximize the component (in the direction of the normal-line vector) of differential values of each pixel on the screen coordinate system expressed by Eq. (1). It should be noted that the direction of the normal-line vector is the direction perpendicular to the contour line. Thus, the true contour line is a line defined by Eq. (1) using the parameters $C_1$, $C_2$, - - - and $C_N$ that maximize the component in the direction of the normal-line vector.

An energy $E_f$ is defined by Eq. (2) below for a line corresponding to a contour line between the characteristic points $P_A$ and $P_B$ defined by Eq. (1). As described above, there are 2 contour lines between the characteristic points $P_A$ and $P_B$. In this case, Eq. (2) defines an energy $E_f$ for a line corresponding to a contour line including no other characteristic points.

$$E_f = \frac{\sum_{\{(x_p, y_p) | f(x_p, y_p, P_1, \ldots, P_N) = 0\}} |\nabla B(x_p, y_p) \cdot n_f(x_p, y_p)|}{K} \quad (2)$$

The symbol $\Sigma$ used in Eq. (2) denotes summation for all pixels on a line represented by Eq. (1) The symbol $\nabla$ denotes a nabla operator. Notation $B(x_p, y_p)$ represents the value of a pixel at a position $(x_p, y_p)$ in the screen coordinate system. Notation $n_f(x_p, y_p)$ denotes a normal-line vector at a pixel at the position $(x_p, y_p)$. Shown in FIG. 15, a normal-line vector is a unit vector at the position $(x_p, y_p)$. The normal-line vector is a unit vector of a vector in a direction perpendicular to a line expressed by Eq. (1). There are 2 vectors in a direction perpendicular to the line expressed by Eq. (1). One of the vectors has an inward direction and the other vector has an outward direction. For example, the vector having the outward direction is used. Notation |x| denotes the norm of a vector x and the period '.' represents an operator for computing an inner product. The symbol K denotes the total number of pixels on the line represented by Eq. (1).

The term $\nabla B(x_p, y_p)$ appearing in Eq. (2) represents the differential value of the pixel value of a pixel on the line expressed by Eq. (1). Thus, the term $\nabla B(x_p, y_p)$ represents a gradient. The term $\nabla B(x_p, y_p)$ can be found by using a Sobel operator. That is to say, the term $\nabla B(x_p, y_p)$ can be found from the following equation.

$$\nabla B(x_p, y_p) = (\Delta_x B(x_p, y_p), \Delta_y B(x_p, y_p)) \quad (3)$$

$$\Delta_x B(x_p, y_p) = B(x_p + 1, y_p - 1) + 2B(x_p + 1, y_p) +$$
$$B(x_p + 1, y_p + 1) - (B(x_p - 1, y_p - 1) +$$
$$2B(x_p - 1, y_p) + B(x_p - 1, y_p + 1))$$

$$\Delta_y B(x_p, y_p) = B(x_p - 1, y_p + 1) + 2B(x_p, y_{p+1}) +$$
$$B(x_p + 1, y_p + 1) - (B(x_p - 1, y_p - 1) +$$
$$2B(x_p, y_p - 1) + B(x_p - 1, y_p - 1))$$

The values of the parameters $C_n$ maximizing the value of the energy $E_f$, where n=1, 2, - - - N, can be found typically as follows. Assume that the initial values of the parameters are $C_n'$. The values of the parameters $C_n$ are changed over a range from $(C_n' - \epsilon_n)$ to $(C_n' + \epsilon_n)$, where the symbol $\epsilon$ n is a predetermined infinitesimal value, and used for calculating the value of the expression on the right side of the equal sign in Eq. (2). The values of the parameters $C_n$ maximizing the value of the expression are selected.

To put it concretely, let a line segment L be a contour line between the characteristic points $P_A$ and $P_B$. For the line segment L, Eq. (2) can be rewritten as follows:

$$E_f = \frac{\sum_{(x_p, y_p) \in L} |\nabla B(x_p, y_p) \cdot n_L|}{K} \quad (4)$$

where, as described above, the symbol $\Sigma$ used in Eq. (4) denotes summation for all pixels on a line represented by Eq. (1), that is, the line segment in this case. The symbol $n_L$ represents a vector corresponding to the vector $n_f(x_p, y_p)$ in Eq. (2). The vector $n_L$ is a normal-line vector perpendicular to the line segment L. The symbol K denotes the total number of pixels on the line segment L.

If the contour line between the characteristic points $P_A$ and $P_B$ is a line segment, on the other hand, Eq. (1) can be rewritten by using 3 parameters $C_1$, $C_2$ and $C_3$ as follows:

$$F(x_p, y_p, C_1, C_2, C_3) = C_1 x_p + C_2 y_p + C_3 = 0 \quad (5)$$

Let $(x_1, y_1)$ and $(x_2, y_2)$ represent the coordinates of the characteristic points $P_A$ and $P_B$ respectively. In this case, the parameters $C_1$, $C_2$ and $C_3$ appearing in Eq. (5) can be represented as follows:

$$C_1 = y_1 - y_2, \quad C_2 = -x_1 + x_2$$

and $$C_3 = x_1 y_2 - x_2 y_1 \quad (6)$$

The values expressed by Eq. (6) are used as initial values $C_1'$, $C_2'$ and $C_3'$ of the parameters $C_1$, $C_2$ and $C_3$ respectively. The energy $E_f$ expressed by Eq. (4) is computed while the values of the parameters $C_1$, $C_2$ and $C_3$, and the values of the parameters $C_1$, $C_2$ and $C_3$ that maximize the energy $E_f$ are selected. Eq. (5) using the selected values of the parameters $C_1$, $C_2$ and $C_3$ expresses the true contour line between the characteristic points $P_A$ and $P_B$. Thus, when the characteristic points $P_A$ and $P_B$ are moved along a line expressed by such Eq. (5), the characteristic points $P_A$ and $P_B$ move along the true contour line.

It should be noted that, if the contour line between the characteristic points $P_A$ and $P_B$ is a line segment, changing the values of the parameters $C_1$, $C_2$ and $C_3$ changes the coordinates $(x_1, y_1)$ and $(x_2, y_2)$ of the characteristic points $P_A$ and $P_B$ as is obvious from Eq. (6). Thus, the coordinates $x_1, y_1, x_2$ and $y_2$ can be said to be parameters of the function f.

In addition, if the contour line between the characteristic points $P_A$ and $P_B$ is a line segment, the characteristic points $P_A$ and $P_B$ provide initial values of all the 3 parameters $C_1$, $C_2$ and $C_3$ used in the function f expressed by Eq. (5). If the contour line between the characteristic points $P_A$ and $P_B$ is a curve, however, initial values may not be provided for all parameters of the function f. In this case, for a parameter with no initial value provided thereto, a value set in advance may be used as an initial value. As an alternative, the user may also enter a value to be used as an initial value.

In addition, in the cases described above, the explanation is focused on only 2 characteristic points in order to make the explanation simple. With attention paid to only 2 characteristic points, however, the following problems are encountered in the actual processing. Assume that 3 characteristic points on a contour line, namely, characteristic point #1, characteristic point #2 adjacent to characteristic point #1 and characteristic point #3 adjacent to characteristic point #2, are specified. Automatic correction processing based on characteristic points #1 and #2 is carried out. Then, automatic correction processing based on characteristic points #2 and #3 is carried out. In this case, the corrected position of characteristic point #2 obtained as a result of the automatic correction processing based on characteristic points #1 and #2 may be different from the corrected position of characteristic point #2 obtained as a result of the automatic correction processing based on characteristic points #2 and #3.

In order to solve the problem described above, it is desirable to modify values of first parameters and second parameters in the actual processing so as to eliminate the difference in corrected position of characteristic point #2 between the automatic correction processing based on characteristic points #1 and #2 and the automatic correction processing based on characteristic points #2 and #3. The first parameters are parameters defining a contour line between characteristic points #1 and #2 while the second parameters are parameters defining a contour line between characteristic points #2 and #3. In this case, however, the first and second parameters are not mutually independent anymore. That is to say, the values of the first and second parameters must be in a relation satisfying a condition that there is no difference in corrected position of characteristic point #2. However, the relation between the values of the first parameters maximizing the energy $E_f$ expressed by Eq. (2) based on characteristic points #1 and #2 and the values of the second parameters maximizing the energy $E_f$ expressed by Eq. (2) based on characteristic points #2 and #3 may not satisfy the condition that there is no difference in corrected position of characteristic point #2. This problem can be solved by typically finding values of the first and second parameters that maximize the sum of the energy $E_f$ expressed by Eq. (2) based on characteristic points #1 and #2 and the energy $E_f$ expressed by Eq. (2) based on characteristic points #2 and #3.

In order to make the explanation simple, the above explanation describes a difference in position of only one characteristic point #2. It should be noted that the above explanation also holds true of all characteristic points on the same contour line. It is thus desirable to find parameters of Eq. (1) defining a contour line between 2 character points forming a pair and parameters of Eq. (1) defining a contour line between 2 character points forming an adjacent pair, and apply this technique to all pairs. That is to say, it is desirable to find the sum of energies $E_f$ for adjacent pairs of characteristic points on the same contour line and find parameters maximizing the sum.

Figure 16:
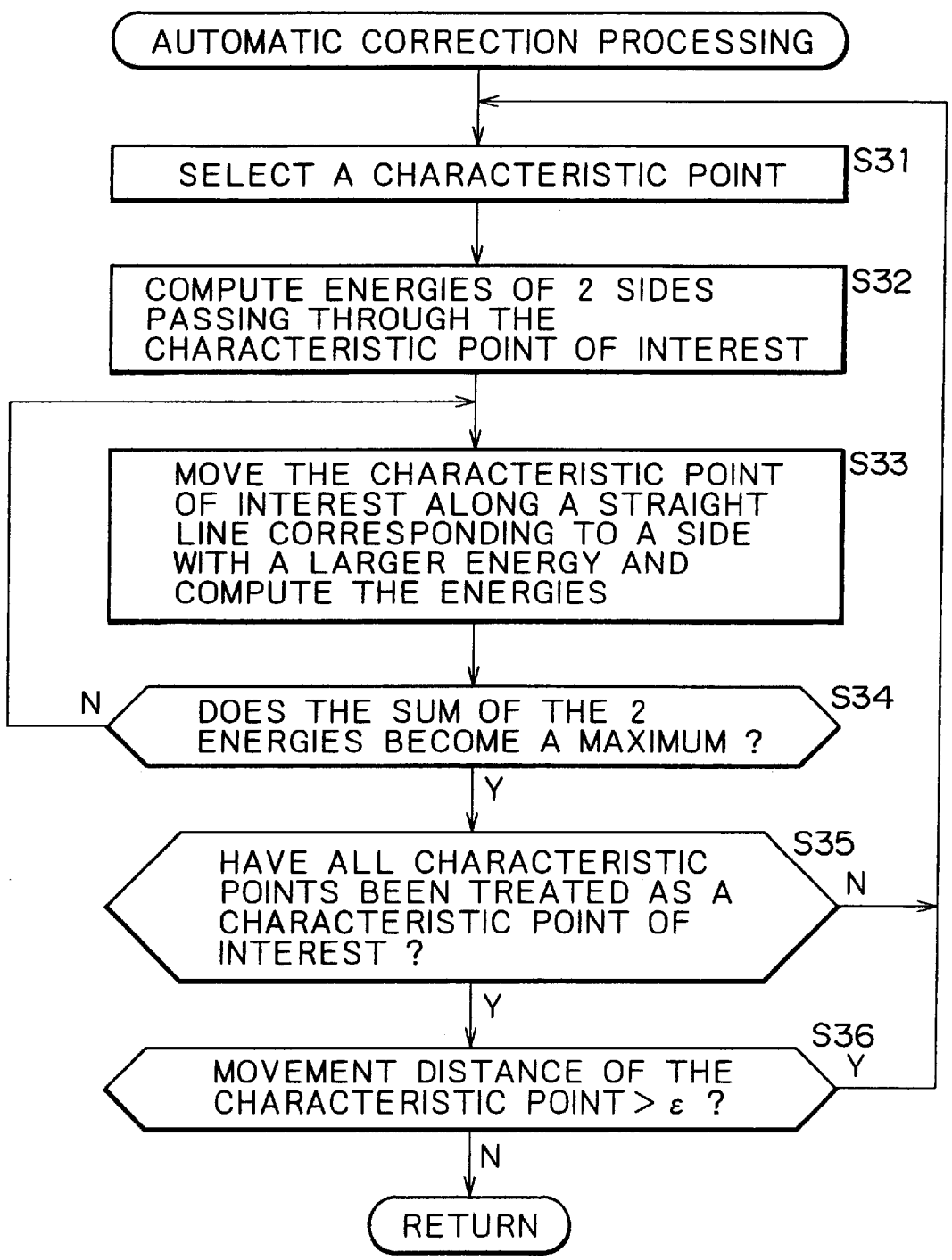
FIG. 16 shows another flowchart used as a reference in a description of details of processing carried out at the step S7 of the flowchart shown in FIG. 7.

Next, the automatic correction processing carried out at the step S7 of the flowchart shown in FIG. 7 is explained by referring to a flowchart shown in FIG. 16.

It should be noted that, in order to make the explanation simple, it is assumed that the projection drawing has a rectangular shape and the 4 vertexes of the rectangular shape are specified as characteristic points $P_1$ to $P_4$.

The energy $E_f$ expressed by Eq. (4) is computed while the 3 parameters $C_1$, $C_2$ and $C_3$ used in Eq. (5) or the x coordinates $x_1$ and $x_2$ as well as the y coordinates $y_1$ and $y_2$ of 2 characteristic points in Eq. (6) are being varied. The coordinates $x_1$, $x_2$, $y_1$ and $y_2$ maximizing the energy $E_f$ are selected. However, the amount of entailed computation to find the coordinates $x_1$, $x_2$, $y_1$ and $y_2$ maximizing the energy $E_f$ is large. In order to reduce the amount of computation, the following simplified technique is thus adopted.

As shown in FIG. 16, the flowchart begins with a step S31 at which one of the characteristic points $P_1$ to $P_4$ is selected as the characteristic point of interest. At the next step S32, the energies $E_f$ of 2 sides of the rectangular shape, which pass through the characteristic point of interest are computed. The 2 sides each connect one characteristic point of interest to another characteristic point. To put it concretely, take a hatched projection drawing shown in FIG. 17 as an example. A point $P_4$ is selected as the character point of interest among the characteristic points $P_1$ to $P_4$. In this case, at the step S32, the energies $E_f$ of 2 sides $P_4P_1$ and $P_4P_3$ of the 4-side rectangular shape $P_1P_2P_3P_4$, which pass through the characteristic point of interest $P_4$ are computed. The 2 sides $P_4P_1$ and $P_4P_3$ connect the characteristic point of interest $P_4$ to the other characteristic points $P_1$ and $P_3$ respectively.

At the next step S33, one of the 2 sides that has a larger energy computed at the step S32 is selected as a side coinciding with a contour of the projection drawing. Then, the point of interest is moved along the selected side including a straight-line extension of the selected side. This side including the straight-line extension is also referred to hereafter as an edge straight line. Subsequently, the energies $E_f$ for the sides connecting the characteristic point of interest at the new position to 2 characteristic points adjacent to the characteristic point of interest are computed. To put it concretely, again take a hatched projection drawing shown in FIG. 17 as an example. With the point $P_4$ selected as the character point of interest among the characteristic points $P_1$ to $P_4$, the energy $E_f$ for the side $P_1P_4$ connecting the characteristic point of interest $P_4$ to characteristic point $P_1$ adjacent to the characteristic point of interest $P_4$ and the energy $E_f$ for the side $P_4P_3$ connecting the characteristic point of interest $P_4$ to characteristic point $P_3$ adjacent to the characteristic point of interest $P_4$ are computed. Assume that the energy $E_f$ computed for the side $P_3P_4$ is found greater than the energy $E_f$ computed for the side $P_4P_1$. In this case, the point of interest $P_4$ is moved along the side $P_4P_3$ including the straight-line extension thereof in either of directions indicated by an arrow D to a new position. For the new position of the point of interest $P_4$, the energy $E_f$ for the side $P_1P_4$ connecting the characteristic point of interest $P_4$ to characteristic point $P_1$ adjacent to the characteristic point of interest $P_4$ and the energy $E_f$ for the side $P_4P_3$ connecting the characteristic point of interest $P_4$ to characteristic point $P_3$ adjacent to the characteristic point of interest $P_4$ are again computed.

The flow of processing then goes on to a step S34 to form a judgment as to whether or not the sum of the energies $E_f$ found at the step S33 for the 2 sides has reached a maximum value. If the outcome of the judgment indicates that the sum of the energies $E_f$ has not reached a maximum value, the flow of processing goes back to the step S33 at which the characteristic point of interest is again moved to a new position on the edge straight line and the same processing is repeated.

If the outcome of the judgment formed at the step S34 indicates that the sum of the energies $E_f$ found at the step S33 for the 2 sides has reached a maximum value, on the other hand, the flow of processing goes on to a step S35. The fact that the sum has reached a maximum value is determined typically as follows. Take the projection drawing shown in FIG. 17 as an example. If a normal-line vector $n_{14}$ of the side $P_4P_1$ with the characteristic point of interest $P_4$ moved to a new position on the edge straight line $P_3P_4$ becomes all but perpendicular to a side connecting vertexes supposed to be specified as the characteristic points $P_1$ and $P_4$, the sum of the energies $E_f$ found at the step S33 for the 2 sides is determined to have reached a maximum value. In this case, as described above, the flow of processing goes on to the step S35 to form a judgment as to whether or not processing has been carried out for all of the characteristic points $P_1$ to $P_4$ each serving as a characteristic point of interest. If the outcome of the judgment indicates that processing has not been carried out for all of the characteristic points $P_1$ to $P_4$ each serving as a characteristic point of interest, the flow of processing goes back to the step S31 to select a characteristic point, that has not been selected yet so far as a characteristic point of interest, as the next characteristic point of interest. Then, the flow of processing goes on to the step S32 to repeat the same processing for the characteristic point selected this time as the next characteristic point of interest.

If the outcome of the judgment formed at the step S35 indicates that processing has been carried out for all of the characteristic points $P_1$ to $P_4$ each serving as a characteristic point of interest, on the other hand, the flow of processing goes on to a step S36 to form a judgment as to whether or not the magnitude of a movement made by any of the characteristic points $P_1$ to $P_4$ in the processing carried out the step S33 is greater than a predetermined threshold value $\epsilon$. The magnitude of a movement made by a characteristic point is defined as the distance between the position of the characteristic point before the movement and the position of the characteristic point after the movement. If the outcome of the judgment formed at the step S36 indicates that the magnitude of a movement made by any of the characteristic points $P_1$ to $P_4$ in the processing carried out the step S33 is greater than the predetermined threshold value $\epsilon$, the flow of processing goes back to the step S31 to repeat the same processing. That is to say, the characteristic points $P_1$ to $P_4$ are selected as a characteristic point of interest one after another, and each of the characteristic points of interest is moved to a new position that provides a maximum sum of energies computed for 2 sides intersecting each other at the characteristic point of interest.

If the outcome of the judgment formed at the step S36 indicates that the magnitude of a movement made by each of the characteristic points $P_1$ to $P_4$ in the processing carried out the step S33 is not greater than the predetermined threshold value ε, that is, if the characteristic points $P_1$ to $P_4$ were almost not moved, on the other hand, control is returned to a calling program.

Then, the copy-operation-processing unit 12 or the paste-operation-processing unit 13, which are shown in FIG. 4, derives an inverse-transformation formula or a forward-transformation formula respectively by using characteristic points with their positions corrected as described above and using information on a shape. Techniques for deriving an inverse-transformation formula and a forward-transformation formula are explained as follows.

Figure 18:
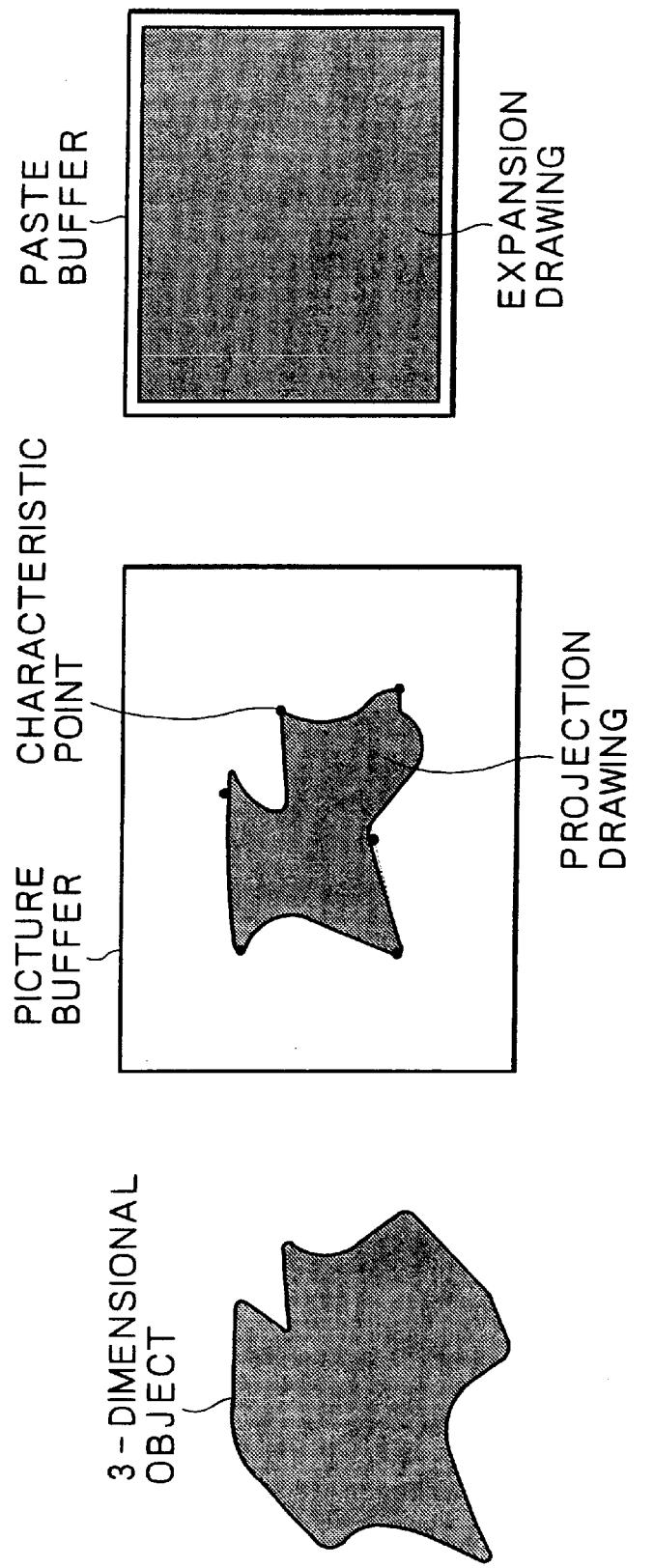
FIGS. 18A to 18C are a plurality of explanatory diagrams used as a reference in a description of a technique of finding an inverse-transformation formula and a forward-transformation formula.

When a picture of a 3-dimensional object in a 3-dimensional space like one shown in FIG. 18A is taken by using the camera 9 shown in FIG. 3, the camera 9 outputs a 2-dimensional picture showing a projection image or a projection drawing, which is a picture obtained as a result of projection of the 3-dimensional object on a screen as shown in FIG. 18B. Thus, the 2-dimensional picture showing such a projection drawing is stored in one of the picture buffers except the paste buffer.

In the paste buffer, on the other hand, an expansion drawing like one shown in FIG. 18C is stored. An expansion drawing is a drawing obtained as a result of expansion of a surface of a 3-dimensional object in a 3-dimensional space like one shown in FIG. 18A on a 2-dimensional plane. If a surface of a 3-dimensional object is a plane, for example, a 2-dimensional picture of the front view of the plane is stored in the paste buffer. If a surface of a 3-dimensional object is the side surface of a cylinder, a 2-dimensional picture with a rectangular shape obtained as a result of expansion of the side surface on a 2-dimensional plane is stored in the paste buffer. If a surface of a 3-dimensional object is spherical, a 2-dimensional picture obtained as a result of expansion of the spherical surface on a 2-dimensional plane is stored in the paste buffer. Typically, the spherical surface is expanded on the 2-dimensional plane by adoption of a normal-interval cylindrical projection used in map drawing or another technique of projection. If a surface of a 3-dimensional object is a tertiary curved surface expressible by 2 parameters s and t, a 2-dimensional picture obtained as a result of expansion of the curved surface on a 2-dimensional plane is stored in the paste buffer. The curved surface is expanded on the 2-dimensional plane by using the horizontal or vertical axis to express the parameter s or t respectively. An example of such a $3^{rd}$-order curved surface is a Bezier surface. If the 3-dimensional object is a body of rotation, a 2-dimensional picture obtained as a result of expansion of the body of rotation on a 2-dimensional plane is stored in the paste buffer. The body of rotation is expanded on the 2-dimensional plane by adopting the direction of the circumference of the body and the direction of axis of rotation as the direction of the horizontal and vertical axes respectively.

Copy processing is carried out to transform a surface of a 3-dimensional object represented by a 2-dimensional picture stored in the buffer of interest as a projection drawing shown in FIG. 18B into an expansion drawing stored in the paste buffer like one shown in FIG. 18C. In the copy processing, first of all, some characteristic points on the surface on the projection drawing and information on the shape of the surface of the 3-dimensional object are specified. In FIG. 18B, portions each denoted by a ■ mark each represent a characteristic point. Then, an inverse-transformation formula is derived. In accordance with the inverse-transformation formula, the surface on the projection drawing like the one shown in FIG. 18B is transformed into an expansion drawing like one shown in FIG. 18C to be stored in the paste buffer.

On the other hand, paste processing is carried out to paste an expansion drawing like one shown in FIG. 18C on a surface of a 3-dimensional object represented by a 2-dimensional picture stored in the buffer of interest as a projection drawing shown in FIG. 18B. In the paste processing, first of all, some characteristic points on a projection drawing and information on the shape of the surface of the 3-dimensional object are specified. In FIG. 18B, portions each denoted by a ■ mark each represent a characteristic point. Then, a forward-transformation formula is derived. In accordance with the forward-transformation formula, the expansion drawing like the one shown in FIG. 18C is transformed into a projection drawing like one shown in FIG. 18B to be pasted on the picture buffer of interest.

Thus, relations among a 3-dimensional object in the 3-dimensional space, a projection drawing of the object and an expansion drawing of the object are a problem encountered in the derivations of an inverse-transformation formula and a forward-transformation formula.

Figure 19:
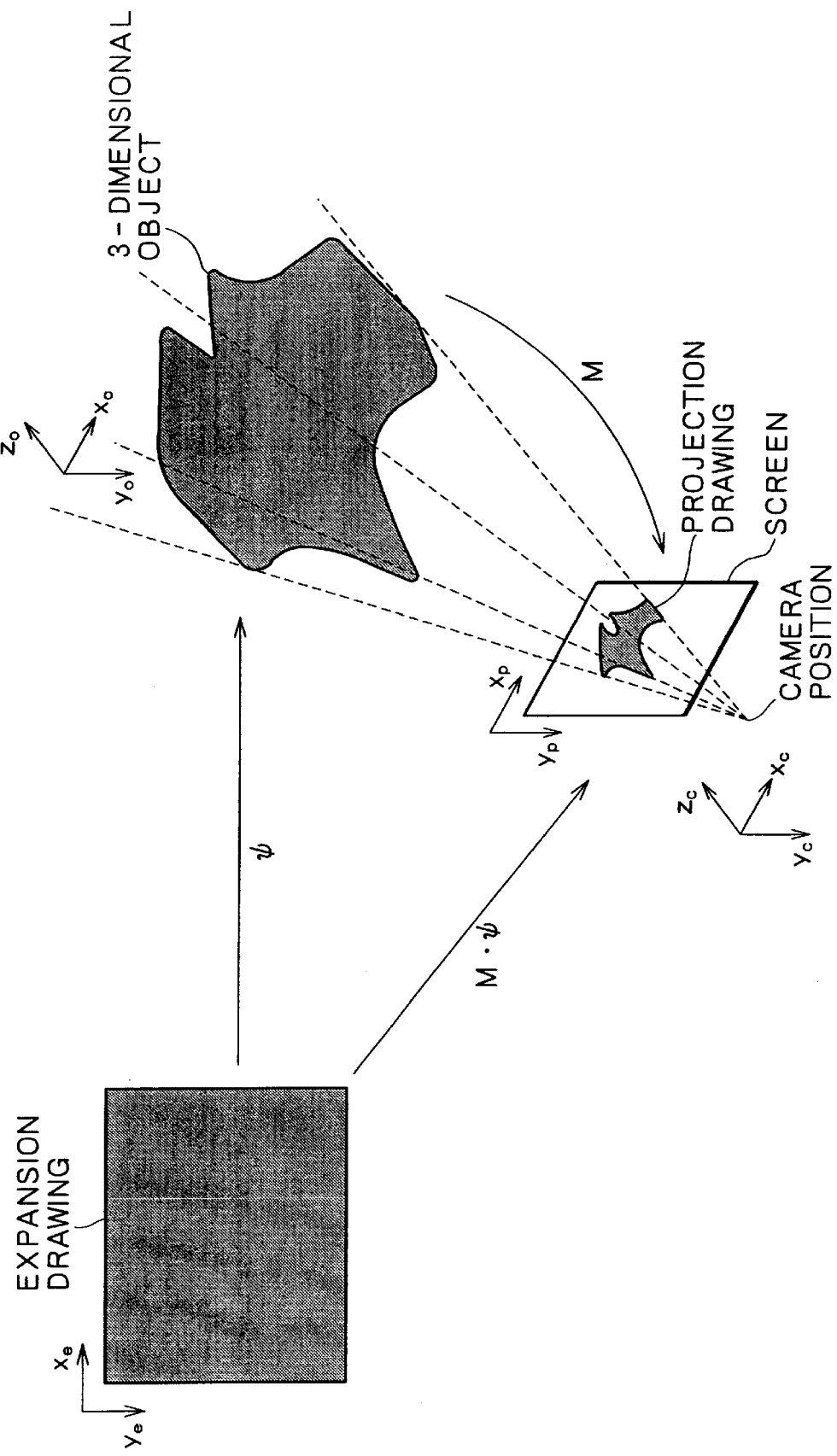
FIG. 19 is a diagram showing relations among a 3-dimensional object in a 3-dimensional space, an expansion drawing and a projection drawing.

In order to solve the problem, consider a 2-dimensional coordinate system for the expansion drawing, a 3-dimensional coordinate system for the 3-dimensional object and a 2-dimensional coordinate system for the projection drawing, which are shown in FIG. 19. The x and y coordinates of the 2-dimensional coordinate system for the expansion drawing are $x_e$ and $y_e$ respectively. The x, y and z coordinates of the 3-dimensional coordinate system for the 3-dimensional object are $x_o$, $y_o$ and $z_o$ respectively. The x and y coordinates of the 2-dimensional coordinate system for the projection drawing are $x_p$ and $y_p$ respectively. Let notation B $(x_p, y_p)$ represent a pixel value at a point $(x_p, y_p)$ on the projection drawing stored in the buffer of interest and notation C $(x_e, y_e)$ represent a pixel value at a point $(x_e, y_e)$ on the expansion drawing stored in the paste buffer. In addition, let a symbol ψ denote a map image for pasting the expansion drawing on a surface of the 3-dimensional object and a symbol M represent a map for transforming the 3-dimensional object into the projection drawing.

Figure 20:
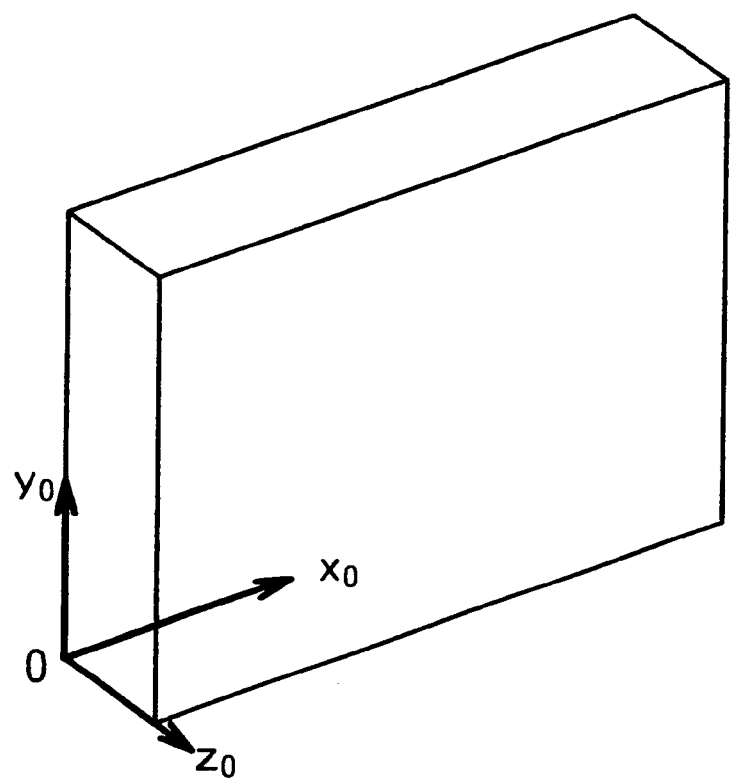
FIG. 20 is a diagram showing how to set coordinate axes.

The 2-dimensional coordinate system for the expansion drawing, the 3-dimensional coordinate system for the 3-dimensional object and the 2-dimensional coordinate system (or the screen coordinate system) for the projection drawing can be set arbitrarily. For example, the 3-dimensional coordinate system for the 3-dimensional object can be set to provide convenient expression of the 3-dimensional object. To put it concretely, assume that the 3-dimensional object is a cylinder. In this case, the 3-dimensional coordinate system can be set so that the origin (0, 0, 0) of the 3-dimensional coordinate system coincides with the center of the circular top surface or the circular bottom surface, and the $y_o$ axis of the 3-dimensional coordinate system coincides with the rotational axis of the cylinder. The rotational axis of a cylinder is a straight line connecting the center of the circular top surface to the center of the circular bottom of the cylinder. If a surface of the 3-dimensional object is rectangular, the 3-dimensional coordinate system can be set so that the origin (0, 0, 0) of the 3-dimensional coordinate system coincides with the left low vertex of the rectangular surface whereas the $x_o$ and $y_o$ axes of the 3-dimensional coordinate system coincide with the horizontal and vertical sides of the rectangular surface respectively as shown in FIG. 20.

A point $(x_o, y_o, z_o)$ on the 3-dimensional object corresponds to a point $(x_e, y_e)$ on the expansion drawing on a 1-to-1 basis. A map ψ or $ψ^{-1}$ defining an inter-drawing relation between such points can be found by geometrical calculation. Thus, if a map M or $M^{-1}$ defining an inter-drawing relation between a point ($x_o$, $y_o$, $z_o$) on the 3-dimensional object and a point ($x_p$, $y_p$) on the projection drawing is known, a map $M\psi$ for transforming a point ($x_e$, $y_e$) on the expansion drawing into a point ($x_p$, $y_p$) on the projection drawing can be found.

If attention is paid only to the 3-dimensional object and the projection drawing, however, in order to find the map M, it is necessary to determine which point ($x_p$, $y_p$) on the projection drawing a point ($x_o$, $y_o$, $z_o$) on the 3-dimensional object is projected on. In order to determine which point ($x_p$, $y_p$) on the projection drawing a point ($x_o$, $y_o$, $z_o$) on the 3-dimensional object is projected on from the projection drawing, basically, it is necessary to prepare a plurality of 2-dimensional pictures and adopt the principle of a trigonometrical survey. In addition, in order to represent a 3-dimensional model of a 3-dimensional object, it is necessary to provide a memory for temporarily storing 3-dimensional data representing an observer-eye view of a point ($x_o$, $y_o$, $z_o$) on the 3-dimensional object in the 3-dimensional space. Moreover, computation to handle such 3-dimensional data is also required as well.

For the reasons described above, a map $\psi$ based on information on a shape provided by the user and a map M based on characteristic points specified by the user are found. Furthermore, an inter-drawing relation between an expansion drawing and a projection drawing, that is, a map $M\psi$ for transforming the expansion drawing and the projection drawing is found. It should be noted that the map $M\psi$ is a forward-transformation formula for carrying out forward transformation while a map $(M\psi)^{-1}$ is an inverse-transformation formula for carrying out transformation inverse to forward transformation. Thus, an inverse-transformation formula can be derived by finding an inverse matrix of the map $M\psi$ by adoption of typically the Gauss elimination method or the like.

In this way, an inverse-transformation formula $(M\psi)^{-1}$ can be found with ease from a forward-transformation formula $M\psi$. A technique of deriving a forward-transformation formula $M\psi$ is explained as follows.

As described above, a point ($x_o$, $y_o$, $z_o$) on the 3-dimensional object corresponds to a point ($x_e$, $y_e$) on the expansion drawing on a 1-to-1 basis. Thus, the coordinates of the point ($x_o$, $y_o$, $z_o$) can be expressed in terms of the map $\psi$ and the point ($x_e$, $y_e$) by Eq. (7) as follows:

$$\begin{pmatrix} x_o \\ y_o \\ z_o \end{pmatrix} = \psi(x_e, y_e) = \begin{pmatrix} \psi_1(x_e, y_e) \\ \psi_2(x_e, y_e) \\ \psi_3(x_e, y_e) \end{pmatrix} \quad (7)$$

Assume that the 3-dimensional object in the 3-dimensional space is photographed by using the camera 9 to provide a projection drawing. 3-dimensional coordinates representing the position ($x_c$, $y_c$, $z_c$) of the camera 9 are referred to hereafter as camera coordinates. The camera coordinates ($x_c$, $y_c$, $z_c$) can be expressed by Eq. (8) in terms of the point coordinates ($x_o$, $y_o$, $z_o$), 3 elements $t_1$ to $t_3$ and 9 elements $r_{11}$, $r_{12}$, $r_{13}$, $r_{21}$, $r_{22}$, $r_{23}$, $r_{31}$, $r_{32}$ and $r_{33}$. The 3 elements $t_1$, $t_2$ and $t_3$ represent a parallel movement in the 3-dimensional space whereas the 9 elements $r_{11}$, $r_{12}$, $r_{13}$, $r_{21}$, $r_{22}$, $r_{23}$, $r_{31}$, $r_{32}$ and $r_{33}$ represent a rotational movement in the 3-dimensional space.

$$\begin{pmatrix} x_c \\ y_c \\ z_c \end{pmatrix} = \begin{pmatrix} r_{11} & r_{12} & r_{13} \\ r_{21} & r_{22} & r_{23} \\ r_{31} & r_{32} & r_{33} \end{pmatrix} \begin{pmatrix} x_o \\ y_o \\ z_o \end{pmatrix} + \begin{pmatrix} t_1 \\ t_2 \\ t_3 \end{pmatrix} \quad (8)$$

A point ($x_p$, $y_p$) on a projection drawing is obtained as a result of projection of a point ($x_c$, $y_c$, $z_c$) on the 3-dimensional object in the camera coordinates on a screen. This transformation is a homogenous transformation or a projective transformation as is described in a reference with a title of "Computer Graphics, Principle and Practice," authored by James D Foley, Andries Van Dam, Steven K. Feiner and John F. Hughes and published by ADDISON-WESLEY PUBLISHING COMPANY in the year of 1966. Thus, the transformation can be represented by a rational expression, both the numerator and the denominator of which are a linear expression of either the x, y or z coordinate, that is, an expression of tertiary terms of either the x, y or z coordinate and constant terms. Let a symbol W denote any number representing a homogenous coordinate. In this case, a point ($x_p$, $y_p$) on the projection drawing on the screen can be expressed in terms of the homogenous coordinate by Eq. (9) as follows.

$$\begin{pmatrix} wx_p \\ wy_p \\ w \end{pmatrix} = \begin{pmatrix} f_h & 0 & 0 \\ 0 & f_v & 0 \\ 0 & 0 & 1 \end{pmatrix} \begin{pmatrix} x_c \\ y_c \\ z_c \end{pmatrix} \quad (9)$$

where notations $f_h$ and $f_v$ denote products f×h and f×v respectively, the symbol f is the focal distance of the camera 9, the symbol h represents the width or the horizontal length of a pixel and the symbol v expresses the height or the vertical length of a pixel.

As is obvious from FIG. (9), the x coordinate $x_p$ or the y coordinate $y_p$ of a projection drawing is obtained as a result of division of the x coordinate $wx_p$ or the y coordinate $wy_p$ of the homogeneous coordinates respectively by the z coordinate w.

From Eqs. (7) and (9), Eq. (10) below can be derived.

$$\begin{pmatrix} wx_p \\ wy_p \\ w \end{pmatrix} = M \begin{pmatrix} \psi_1(x_e, y_e) \\ \psi_2(x_e, y_e) \\ \psi_3(x_e, y_e) \\ 1 \end{pmatrix} = M\psi(x_e, y_e) \quad (10)$$

The symbol M used in Eq. (10) denotes a matrix for transforming $\psi$ ($x_e$, $y_e$), that is, ($x_o$, $y_o$, $z_o$) into ($x_p$, $y_p$) as is obvious from FIG. 19. The matrix M is expressed as follows:

$$M = \begin{pmatrix} m_{11} & m_{12} & m_{13} & m_{14} \\ m_{21} & m_{22} & m_{23} & m_{24} \\ m_{31} & m_{32} & m_{33} & 1 \end{pmatrix} \quad (11)$$

$$= \begin{pmatrix} r_{11}f_h/t_3 & r_{12}f_h/t_3 & r_{13}f_h/t_3 & t_1f_h/t_3 \\ r_{21}f_v/t_3 & r_{22}f_v/t_3 & r_{23}f_v/t_3 & t_2f_v/t_3 \\ r_{31}/t_3 & r_{32}/t_3 & r_{33}/t_3 & 1 \end{pmatrix}$$

$\psi(\psi_1, \psi_2, \psi_3)$ appearing in Eq. (10) can be found by geometrical computation based on information on a shape entered by the user. In addition, the matrix M appearing in Eq. (10) can be found from characteristic points entered by the user. As shown in Eq. (11), the matrix M generally consists of 11 elements, namely, $m_{11}$, $m_{12}$, $m_{13}$, $m_{14}$, $m_{21}$, $m_{22}$, $m_{23}$, $m_{24}$, $m_{31}$, $m_{32}$ and $m_{33}$, as unknown quantities. If 6 points consisting of 5 points each having a degree of freedom of 2 and 1 point having a degree of freedom of 1 are specified as characteristic points, the quantities $m_{11}$, $m_{12}$, $m_{13}$, $m_{14}$, $m_{21}$, $m_{22}$, $m_{23}$, $m_{24}$, $m_{31}$, $m_{32}$ and $m_{33}$ can be found. If more than 6 points on the projection drawing are specified as characteristic points, the 11 elements, namely, $m_{11}$, $m_{12}$, $m_{13}$, $m_{14}$, $m_{21}$, $m_{22}$, $m_{23}$, $m_{24}$, $m_{31}$, $m_{32}$ and $m_{33}$, can be found by adopting the least-square method or the like.

As described above, the matrix M is found from characteristic points entered by the user. It is thus unnecessary to handle 3-dimensional data of a 3-dimensional object in the camera coordinates. Accordingly, computation using the 3-dimensional data is also not required. It is also unnecessary to use a plurality of 2-dimensional pictures obtained as a result of photographing the same 3-dimensional object from a plurality of positions. That is to say, the matrix M can be found from a 2-dimensional picture obtained as a result of photographing a 3-dimensional object from one position. As a result, the map $M\psi$ (and the inverse map $(M\psi)^{-1}$) can be found without computation manipulating the 3-dimensional data in the camera coordinates and without using a plurality of 2-dimensional pictures.

The following description explains techniques for computing the map $\psi$ and the matrix M for a 3-dimensional object having a cubic shape.

In the case of a 3-dimensional object having a cubic shape, the map $\psi$ of Eq. (7) can be expressed by typically Eq. (12) below. The map $\psi$ is an inter-drawing relation between a point $(x_o, y_o, z_o)$ on a surface of the cubic body in the 3-dimensional space and a point $(x_e, y_e)$ on the expansion drawing.

$$\begin{pmatrix} x_o \\ y_o \\ z_o \end{pmatrix} = \begin{pmatrix} \psi_1(x_e, y_e) \\ \psi_2(x_e, y_e) \\ \psi_3(x_e, y_e) \end{pmatrix} = \begin{pmatrix} x_e \\ y_e \\ 0 \end{pmatrix} \quad (12)$$

In this case, however, the 2-dimensional coordinates for the projection drawing are coordinates on a plane for $z_o=0$ in the 3-dimensional coordinates for the 3-dimensional object. The 2-dimensional coordinates for the projection drawing are referred to hereafter as screen coordinates and the 3-dimensional coordinates for the 3-dimensional object are referred to simply as 3-dimensional coordinates. The coordinates on the plane for $z_o=0$ in the 3-dimensional coordinates are selected so as to provide equal x coordinates and equal y coordinates, that is, $x_e=x_o$ and $y_e=y_o$. That is to say, the screen coordinates are the coordinates on the xy plane. The 3-dimensional coordinate system is set so that its origin coincides with a vertex of a surface of the cubic body and the xy plane of the 3-dimensional coordinate system coincides with the surface of the cubic body.

Since Z is equal to 0 at Eq. (12), the elements $m_{13}$, $m_{23}$ and $m_{33}$ on third column of the matrix M appearing in Eq. (11) are not required. In this case, Eq. (10) can be rewritten into Eq. (13) as follows:

$$\begin{pmatrix} wx_p \\ wy_p \\ w \end{pmatrix} = M \begin{pmatrix} x_e \\ y_e \\ 0 \\ 1 \end{pmatrix} = \begin{pmatrix} m_{11} & m_{12} & m_{14} \\ m_{21} & m_{22} & m_{24} \\ m_{31} & m_{32} & 1 \end{pmatrix} \begin{pmatrix} x_e \\ y_3 \\ 1 \end{pmatrix} \quad (13)$$

As is obvious from Eq. (13), only 8 elements of the matrix M, namely, $m_{11}$, $m_{12}$, $m_{14}$, $m_{21}$, $m_{22}$, $m_{24}$, $m_{31}$ and $m_{32}$, need to be found. Thus, by specifying 4 points on the projection drawing corresponding to 4 points on the expansion drawing as characteristic points, the 8 elements of the matrix M, namely, $m_{11}$, $m_{12}$, $m_{14}$, $m_{21}$, $m_{22}$, $m_{24}$, $m_{31}$ and $m_{32}$, can be found. This is because, since each characteristic point is specified in terms of an $x_p$ coordinate and an $y_p$ coordinate, the 4 specified characteristic points provide a total of 8 pieces of information.

Figure 21A:
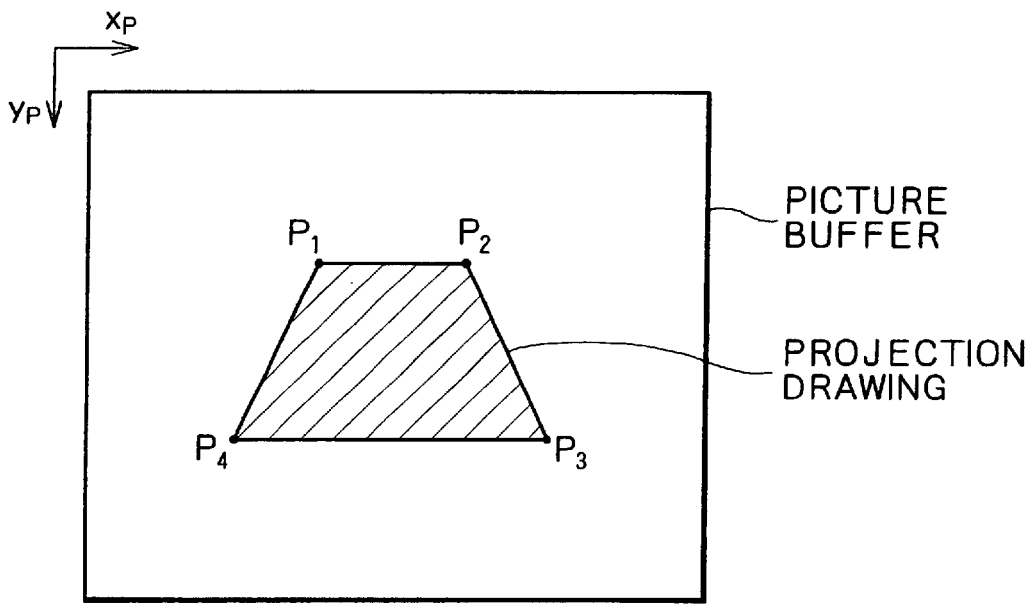
FIGS. 21A and 21B are a plurality of explanatory diagrams used as a reference in a description of a technique of finding an inverse-transformation formula and a forward-transformation formula for a 3-dimensional object having a cubic shape.
Figure 21B:
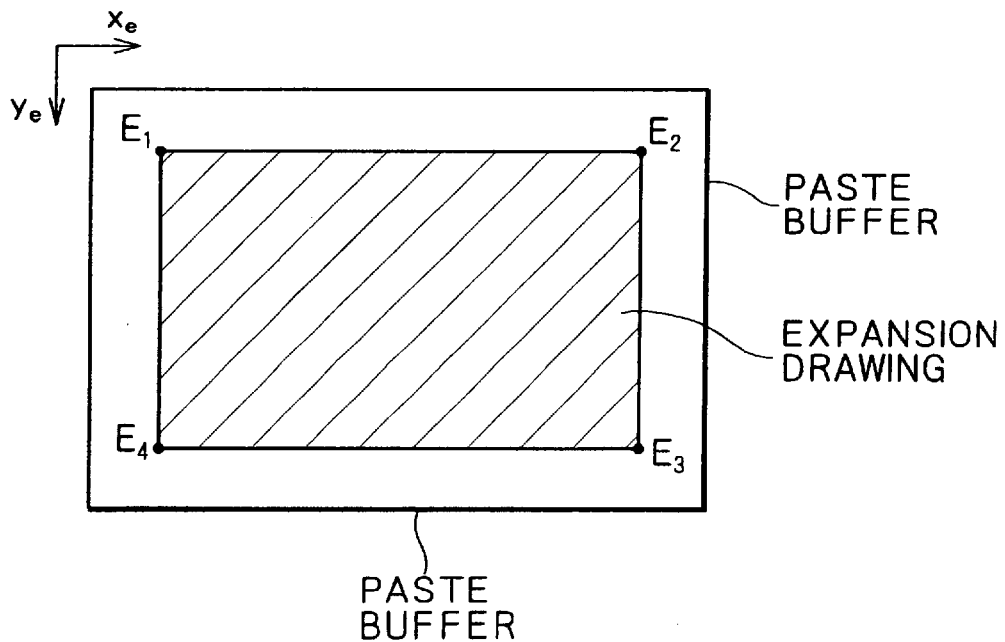

In the case of a 3-dimensional object having a cubic shape, a typical result of projection of a rectangular surface of the object on a plane or a screen is a trapezium like for example one shown in FIG. 21A. In this case, assume for example that the user specifies the 4 vertexes of the projection drawing of the trapezium as characteristic points. As shown in FIG. 21A, enumerated in the clockwise direction starting with the vertex at the upper left corner of the trapezium, the vertexes of the trapezium are $P_1$, $P_2$, $P_3$ and $P_4$. As shown in FIG. 21B, on the other hand, enumerated in the clockwise direction starting with the vertex at the upper left corner of a rectangular expansion drawing stored in the paste buffer, the vertexes of the rectangle are $E_1$, $E_2$, $E_3$ and $E_4$. In this case, the vertexes of the trapezium $P_1$, $P_2$, $P_3$ and $P_4$ correspond to the vertexes of the rectangle $E_1$, $E_2$, $E_3$ and $E_4$ respectively.

Let the coordinates of the vertexes of the rectangle $E_1$, $E_2$, $E_3$ and $E_4$ in a 2-dimensional coordinate system for the expansion drawing be $(0, 0)$, $(L_W, 0)$, $(L_W, L_H)$ and $(0, L_H)$ respectively where the symbols $L_W$ and $L_H$ denote the width or the horizontal length and the height or the vertical length of the rectangular shape of the expansion drawing respectively. The 2-dimensional coordinate system is referred to as a paste-buffer coordinate system. The width $L_W$ and the height $L_H$ of the rectangular shape of the expansion drawing can be set by the user at arbitrary values in a range permitted by the size of the paste buffer. Besides values set by the user in this way, the width $L_W$ and the height $L_H$ of the rectangular shape of the expansion drawing can also be set in advance at values that provide a predetermined ratio of the area of the expansion drawing to the size of the buffer. A typical value of the ratio is 80%. As another alternative, the width $L_W$ and the height $L_H$ of the rectangular shape can also be set in advance at fixed values.

Let the screen coordinates of the points $P_1$, $P_2$, $P_3$ and $P_4$ each specified by the user as a characteristic point be $(x_{p1}, y_{p1})$, $(x_{p2}, y_{p2})$, $(x_{p3}, y_{p3})$ and $(x_{p4}, y_{p4})$ respectively. From Eq. (10), the following equation holds true.

$$\begin{pmatrix} w_1 x_{p1} & w_2 x_{p2} & w_3 x_{p3} & w_4 x_{p4} \\ w_1 y_{p1} & w_2 y_{p2} & w_3 y_{p3} & w_4 y_{p4} \\ w_1 & w_2 & w_3 & w_4 \end{pmatrix} = M \begin{pmatrix} 0 & L_W & L_W & 1 \\ 0 & 0 & L_H & L_H \\ 1 & 1 & 1 & 1 \end{pmatrix} \quad (14)$$

The symbols $w_1$, $w_2$, $w_3$ and $w_4$ in Eq. (14) each denote any arbitrary number representing a homogenous coordinate.

A matrix M in Eq. (14) is a matrix including 8 elements, namely, the unknown quantities $m_{11}$, $m_{12}$, $m_{14}$, $m_{21}$, $m_{22}$, $m_{24}$, $m_{31}$ and $m_{32}$. Since 8 simultaneous equations can be established from Eq. (14), the 8 unknown quantities $m_{11}$, $m_{12}$, $m_{14}$, $m_{21}$, $m_{22}$, $m_{24}$, $m_{31}$ and $m_{32}$, that is, the matrix M, can be found. It should be noted that, characteristic points, which are specified by the user and then corrected in the automatic correction processing described above, are basically used as characteristic points for finding the matrix M.

In copy or paste processing carried out on a rectangular surface of a 3-dimensional object with a rectangular shape, the map $\psi$ and the matrix M are found by using Eqs. (12) and (14). In the case of paste processing, the map $M\psi$ is used as a forward-transformation formula as it is. In the case of copy processing, on the other hand, an inverse matrix of the map $M\psi$ is found and used as an inverse-transformation formula.

In this case, the 3-dimensional object is not limited to a cubic body. Since the transformation formula used in paste processing is the map $M\psi$ as it is, the formula is referred to as a forward-transformation formula. Since the transformation formula used in copy processing is a map inverse to the map $M\psi$, on the other hand, the formula is referred to as an inverse-transformation formula.

In copy processing, the picture-transformation-specification-processing unit 20 writes pixels in the trapezoidal projection drawing $P_1P_2P_3P_4$ stored in the buffer of interest shown in FIG. 21A at corresponding positions in the rectangular expansion drawing $E_1E_2E_3E_4$ stored in the paste buffer shown in FIG. 21B in accordance with the inverse-transformation formula $(M\psi)^{-1}$.

In case 1 pixel in the buffer of interest corresponds to a plurality of pixels in the paste buffer, the pixel value of the pixel in the buffer of interest is written at the position of each of the pixels in the paste buffer. As an alternative, the pixel value of the pixel in the buffer of interest is written only at the position of one of the pixels in the paste buffer and, at the position of each of the other pixels in the paste buffer, an interpolated value is written. Each of the interpolated values is found by interpolation of a plurality of pixels in the buffer of interest. For example, assume that a pixel A in the buffer of interest corresponds to pixels $a_1$ and $a_2$ in the paste buffer. In this case, the pixel value of the pixel A is written typically at the position of the pixel $a_1$. At the position of the pixel $a_2$, typically, an average of the pixel value of the pixel A and the pixel value of a pixel in the buffer of interest adjacent to the pixel A is written.

In case a plurality of pixels in the buffer of interest correspond to 1 pixel in the paste buffer, on the contrary, the pixel value of one of the pixels in the buffer of interest is written at the position of the pixel in the paste buffer. As an alternative, typically, a weighed sum of the pixel values of the pixels in the buffer of interest is written at the position of the pixel in the paste buffer. The weighed sum is found by means of a filter.

In the operation based on the inverse-transformation formula $(M\psi)^{-1}$ to write a pixel value into the paste buffer as described above, for each pixel of the projection drawing stored in the buffer of interest, by calculation, the picture-transformation-processing unit 20 may determine which pixel of the expansion drawing stored in the paste buffer a pixel of the projection drawing should be transformed. As an alternative, for each pixel of the expansion drawing stored in the paste buffer, by calculation, the picture-transformation-specification-processing unit 20 may reversely determine which pixel of the projection drawing stored in the buffer of interest should be transformed into a pixel of the expansion drawing.

In paste processing, on the other hand, the picture-transformation-processing unit 20 writes pixels in the rectangular expansion drawing $E_1E_2E_3E_4$ stored in the paste buffer shown in FIG. 21B at corresponding positions in the trapezoidal projection drawing $P_1P_2P_3P_4$ stored in the buffer of interest shown in FIG. 21A in accordance with the forward-transformation formula $M\psi$ in order to paste the expansion drawing on the 2-dimensional projection drawing stored in the buffer of interest.

It should be noted that 1 pixel in the paste buffer may correspond to a plurality of pixels in the buffer of interest. In this case, much like the copy processing, the pixel value of the pixel in the paste buffer is written at the position of each of the pixels in the buffer of interest. As an alternative, the pixel value of the pixel in the paste buffer is written only at the position of one of the pixels in the buffer of interest and, at the position of each of the other pixels in the buffer of interest, an interpolated value is written.

In case a plurality of pixels in the paste buffer correspond to 1 pixel in the buffer of interest, on the contrary, the pixel value of one of the pixels in the paste buffer of interest is written at the position of the pixel in the buffer of interest. As an alternative, typically, a weighed sum of the pixel values of the pixels in the paste buffer is written at the position of the pixel in the buffer of interest. The weighed sum is found by means of a filter.

In the operation based on the forward-transformation formula $M\psi$ to write a pixel value into the buffer of interest as described above, for each pixel of the expansion drawing stored in the paste buffer, by calculation, the picture-transformation-processing unit 20 may determine which pixel of the projection drawing stored in the buffer of interest a pixel of the expansion drawing should be transformed. As an alternative, for each pixel of the projection drawing stored in the buffer of interest, by calculation, the picture-transformation-processing unit 20 may reversely determine which pixel of the expansion drawing stored in the paste buffer should be transformed into a pixel of the projection drawing.

The techniques of computing the map $\psi$ and the matrix M for a 3-dimensional object having a cubic shape have been explained so far. Techniques of computing the map $\psi$ and the matrix M for a 3-dimensional object having a primitive shape such as a cylinder, a cone or a sphere are described in references such as Japanese Patent Laid-open No. Hei 1-164654 submitted earlier by the applicant for a patent of the present invention in detail. It is thus unnecessary to repeat the explanation in this specification. It should be noted that Japanese Patent Laid-open No. Hei 1-164654 is an application claiming a domestic priority right based on Japanese Patent Laid-open No. Hei 10-197390.

It is worth noting that the map $\psi$ and the matrix M for a 3-dimensional object having a non-primitive shape can also be computed provided that the shape can be expressed by a function.

In addition, points specified as characteristic points are not limited to those explained above. For example, points on a trapezoidal surface of a projection drawing shown in FIG. 21 specified as characteristic points as described above are not limited to the vertexes of the trapezium. Instead, points on the sides of the trapezoidal surface may also be specified as characteristic points of the projection drawing.

Moreover, besides points displayed on a projection drawing or visible points, points not displayed on a projection drawing or invisible points may also be specified as characteristic points of the projection drawing.

In either case, it is necessary to set in advance a relation indicating which position in the expansion drawing stored in the paste buffer each point specified as a characteristic point of the projection drawing corresponds to.

In paste processing, basically, a picture stored in the paste buffer is pasted on a surface of a 3-dimensional object indicated by characteristic points specified by the user as described earlier. That is to say, pixel values of the picture stored in the paste buffer are written into the buffer of interest. However, assume for example that paste processing is carried out to add a new 3-dimensional object to a 2-dimensional picture stored in the buffer of interest. In this case, by merely writing pixel values of a picture stored in the paste buffer over the buffer of interest, it is impossible to place the new 3-dimensional object behind a 3-dimensional object already displayed on the 2-dimensional picture stored in the buffer of interest even though it is possible to place the new 3-dimensional object in front of the 3-dimensional object already displayed on the 2-dimensional picture.

In order to solve the problem described above, a matte is used in this embodiment, making it possible to place the new 3-dimensional object behind the 3-dimensional object already displayed on the 2-dimensional picture stored in the buffer of interest.

A matte is a picture of the so-called grace scale representing the shape of an object displayed on a 2-dimensional picture. Values of a matte represent a contribution factor $\alpha$ at each pixel of the 2-dimensional picture. A matte of a 2-dimensional picture stored in the buffer of interest is generated at the step S15 of the flowchart shown in FIG. 7. Thus, a matte of a 2-dimensional picture is stored in a picture buffer for storing the 2-dimensional picture.

Each pixel composing a matte has a pixel value in a typical range 0 to 1. The pixel value of 1 is assigned to a pixel composing the so-called foreground whereas the pixel value of 0 is assigned to a pixel composing the so-called background. The value of a pixel composing a boundary portion between the foreground and the background is determined by a ratio of the foreground included in the pixel to the background included in the pixel. To be more specific, the higher the ratio of the foreground, the closer the value assigned to the pixel to 1 and, the lower the ratio of the foreground and the higher the ratio of the background, the closer the value assigned to the pixel to 0.

Figure 22A:
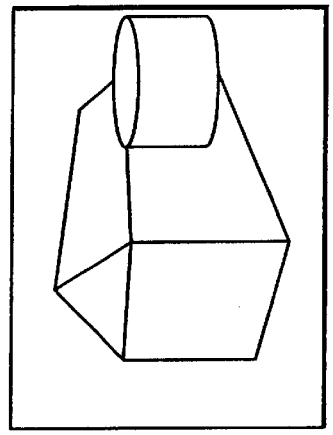
FIGS. 22A to 22D are a plurality of explanatory diagrams used as a reference in a description of matte processing.

Assume for example that a 2-dimensional picture of a 3-dimensional object having a shape of a house as shown in FIG. 22A has been stored in the buffer of interest. Let matte processing be carried out on the 2-dimensional picture with the house portion used as the foreground and the rest of the picture used as the background. In this case, the matte-operation-processing unit 16 produces a matte like one shown in FIG. 22B and stores the matte into the buffer of interest. It should be noted that, in the matte shown in FIG. 22B, the pixel values of shadowed portion are 1 and those of the un-shadowed portion are 0.

As a typical technique to generate a matte, it is possible to adopt a method disclosed for example in a reference with a title of "Intelligent Scissors for Image Composition" authored by Eric N. Mortensen and William A. Barrett, Proceedings of SIGGRAPH 95, pages 191 to 198 or either of Japanese Patent Laid-open No. Hei 8-331455 and Japanese Patent Laid-open No. Hei 10-143654, which were submitted earlier by the applicant for a patent of the present invention.

If a matte is stored in the buffer of interest along with the 2-dimensional picture thereof, the user is allowed to indicate whether the matte is valid or invalid by operating the input unit 6.

Figure 22C:
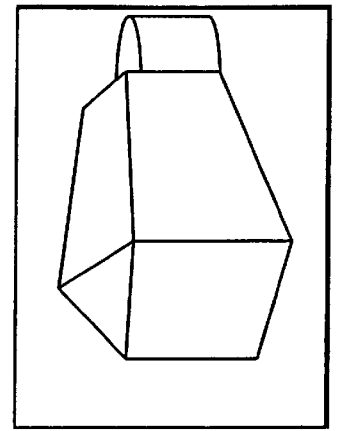
Figure 22B:
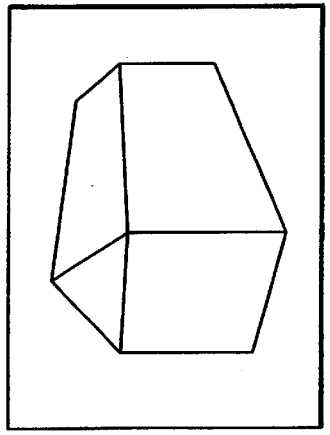

Now, assume that the 2-dimensional picture shown in FIG. 22A and the matte shown in FIG. 22B have been stored in the buffer of interest. Then, let paste processing be specified to paste a new 3-dimensional object such as a cylinder on the 2-dimensional picture stored in the buffer of interest. In this case, if the matte is specified to be invalid, a projection drawing of the cylinder is merely drawn over the 2-dimensional picture to result in a 2-dimensional picture showing the cylinder in front of the house as shown in FIG. 22C.

Figure 22D:
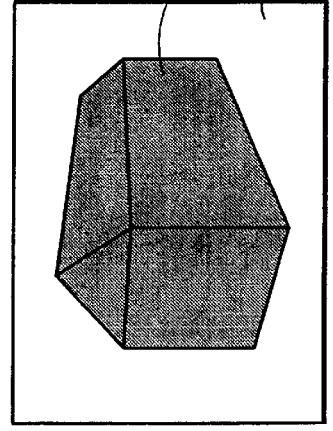

If the matte is specified to be valid, on the other hand, a new 2-dimensional picture C is generated in accordance with the following equation:

$$C=\alpha A+(1-\alpha)B$$

where the symbol A denotes the pixel value of a pixel composing the 2-dimensional picture stored in the buffer of interest, the symbol B denotes the pixel value of a pixel composing the projection drawing of the cylinder, the symbol C denotes the pixel value of a pixel composing the new 2-dimensional picture generated by the paste processing and the symbol $\alpha$ denotes the contribution factor of the pixel value of a pixel composing the matte. Thus, in this case, the paste processing results in a 2-dimensional picture showing the cylinder behind the house as shown in FIG. 22D.

By carrying out paste processing with a matte specified to be valid as described above, it is possible to implement the so-called occlusion whereby a portion of an added new 3 order hidden behind a 3-dimensional object already displayed on a 2-dimensional picture is made invisible. Thus, in this case, a matte can be set to function as a flag indicating whether or not to allow an operation to draw a new object over a projection drawing.

It should be noted that the user may also be requested to create a matte.

Figure 23:
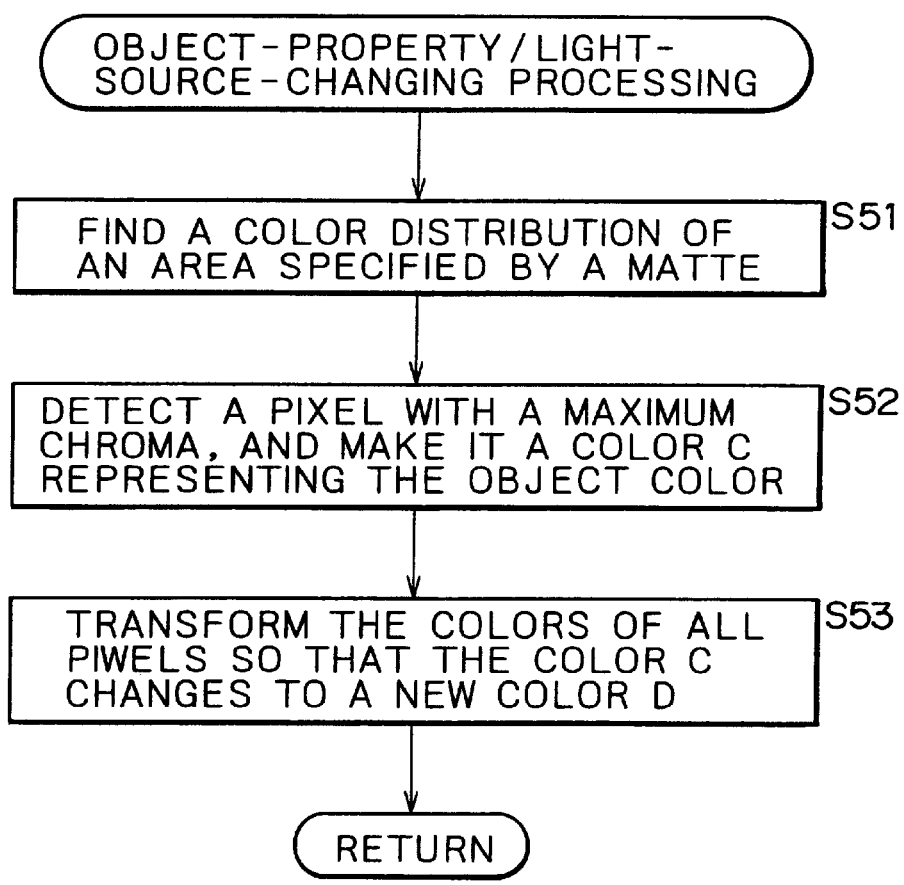
FIG. 23 shows a flowchart used as a reference in a description of details of processing carried out at a step S16 of the flowchart shown in FIG. 7.

Next, the object-property/light-source changing processing carried out at the step S16 of the flowchart shown in FIG. 7 is explained by referring to a flowchart shown in FIG. 23. It should be noted that a matte of a 2-dimensional picture stored in the buffer of interest is assumed to have been generated and stored in the buffer of interest.

As shown in FIG. 23, the flowchart used as a reference in a description of the object-property/light-source changing processing begins with a step S51 to detect a color distribution in an area of an object shown in a 2-dimensional picture stored in the buffer of interest and expressed by a matte also stored in the buffer of interest. To put it in detail, at the step S51, an area of the object shown in the 2-dimensional picture stored in the buffer of interest is recognized from the matte also stored in the buffer of interest and a distribution of RGB values of pixels in the area in the RGB space is detected. The distribution of RGB values is referred to as the color distribution.

At the next step S52 after the color distribution is detected, a pixel with the greatest color chroma is identified on the basis of the color distribution detected at the step S51. A pixel with the highest color chroma is referred to hereafter as a greatest-chroma pixel.

FIG. 24 is a diagram showing a color distribution of an object in the RGB space. In the figure, the color distribution is represented by a portion enclosed by a solid line. It should be noted that FIG. 24 shows a normalized color distribution in which the maximum of the R, G and B values is set at 1. Thus, in the RGB space shown in FIG. 24, an RGB point (0, 0, 0) is represented by the black color and an RGB point (1, 1, 1) is represented by the white color.

In the RGB space, the longer the distance from a position to a line connecting a black point to a white point, that is, the longer the distance from a point to a line connecting the point (0, 0, 0) to the point (1, 1, 1), the greater the chroma at the point. Thus, a greatest-chroma pixel detected at the step S52 is a pixel having a color of the position at the longest distance from the line connecting the point (0, 0, 0) to the point (1, 1, 1) in the color distribution detected at the step S51. To put it concretely, in the case of the embodiment shown in FIG. 24, a pixel having a color of a point C in the same figure is detected as a greatest-chroma pixel.

The color C of the greatest-chroma pixel, that is, the R, G and B values of the greatest-chroma pixel, can be regarded as the original color of the object shown in the 2-dimensional picture stored in the buffer of interest.

Later on, at the next step S53, the color distribution detected at the step S51 is changed, and a pixel value, strictly speaking, the R, G and B values according to the modified color distribution, are written into the position of the corresponding pixel composing the 2-dimensional picture stored in the buffer of interest. Control is finally returned to a calling routine. To put it in detail, at the step S53, the color C of the greatest-chroma pixel is transformed into a predetermined color D, and the colors of other pixels composing the area of the object are also transformed in accordance with a predetermined rule.

To put it concretely, if object-property processing to modify the properties of the object such as the color and the material sensitivity is requested, at the step S53, the color C of the greatest-chroma pixel is transformed into the predetermined color D, and the colors of other pixels composing the area of the object are also transformed linearly in the same way.

To put it in detail, after the color C of the greatest-chroma pixel is transformed into the predetermined color D, each color between the color C and the point (1, 1, 1) representing the white color in the color distribution of the object is linearly transformed into a color between the color D and the point (1, 1, 1). In the same way, each color between the color C and the point (0, 0, 0) representing the black color in the color distribution of the object is then linearly transformed into a color between the color D and the point (0, 0, 0). As a result, the color distribution is changed from one represented by the solid line to another one represented by a dashed line shown in FIG. 24. Since the color is subjected to transformation in this way, a color Q brightest in the original color distribution is transformed into a color T, which is also brightest in the color distribution after the transformation. By the same token, a color P darkest in the original color distribution, is transformed into a color S, which is also darkest in the color distribution after the transformation.

Each color between the color C and the point (1, 1, 1) representing the white color is a mirror-reflection component obtained as a result of reflection of a light coming from the light source by a mirror surface. On the other hand, each color between the color C and the point (0, 0, 0) representing the black color is a scattering-reflection component obtained as a result of scattering reflection of a light coming from the light source. By linear transformation of the object's color distribution comprising mirror-reflection components and scattering-reflection components as such, the color of the projection drawing of the object shown in the 2-dimensional picture stored in the buffer of interest can be changed by keeping the original shadow as it is. That is to say, in the case described above, the color of the object shown in the 2-dimensional picture is changed from C to D.

It should be noted that the color modification described above is based on the theory of a dichromatic reflection model.

Figure 25B:
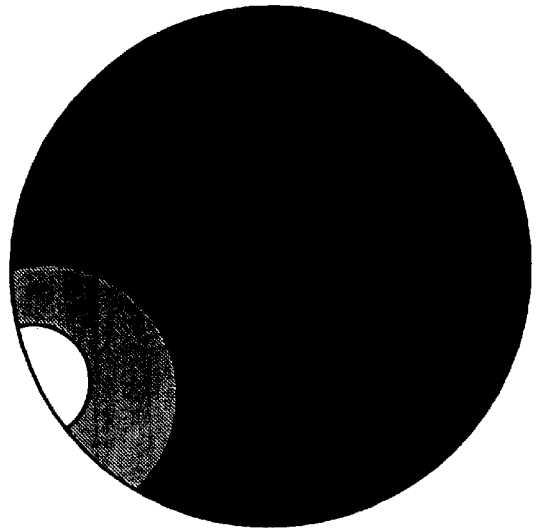
FIGS. 25A and 25B are a plurality of diagrams showing a result of transformation to nonlinearly transform a color distribution of an object.
Figure 25A:
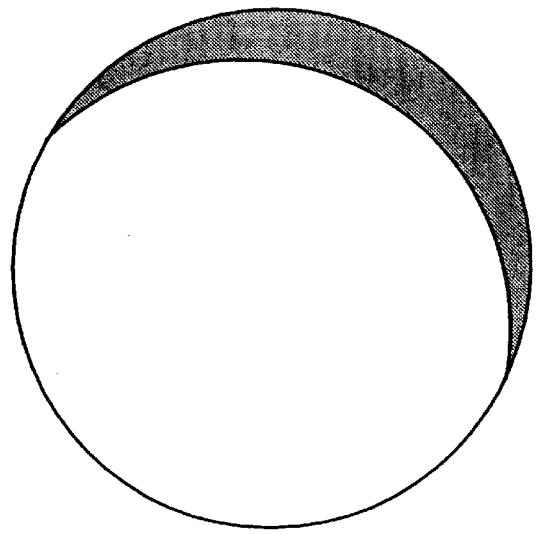

In the case described above, the mirror-reflection components and the scattering-reflection components are linearly transformed. It should be noted that, at the step S53, the mirror-surface-reflection components and/or the scattering-reflection components can also be transformed nonlinearly. For example, in the case of the color distribution shown in FIG. 24, almost all mirror-reflection color components between the colors C and Q are transformed into colors close to the color D, whereas the color Q and colors close thereto are transformed into colors close to the color T. As a result, the object is transformed into one with only a portion thereof exhibiting strong mirror reflection. An example of this transformation is shown in FIG. 25. In this example, an object, which exhibits much scattering reflection and is bright as a whole as shown in FIG. 25A, is transformed into an object with a portion thereof exhibiting strong mirror reflection as shown in FIG. 25B.

By nonlinearly transforming scattering-reflection components and mirror-reflection components as described above, an area exhibiting mirror reflection can be made narrower or wider, and the strength of the mirror reflection can be changed. As a result, the property of the object can be modified.

It should be noted that exhibition of partial strong mirror reflection described above is attributed to the property of an object with small surface roughness. Thus, the modification of the color distribution described above may result in a change in object surface to a smooth one.

When light-source-modification processing is requested to change the light source, at the step S53 of the flowchart shown in FIG. 23, colors between the color Q and the color C of a mirror-reflection component in the RBG space shown in FIG. 24 are transformed into a distribution over colors of a new light source from the color C. That is to say, in the color distribution of the object, the brightest color can be regarded as the color of the light source. Thus, in the RBG space shown in FIG. 24, colors distributed over the brightest color Q from the color C are transformed into a distribution over colors of the new light source from the color C. As a result, it is possible to obtain an effect as if the light source were changed to the new light source.

Next, the erase processing carried out at the step S17 of the flowchart shown in FIG. 7 is explained.

In erase processing, a portion of a 2-dimensional picture stored in a picture buffer is erased as described above. Thus, the erase processing can basically be carried out as follows. First of all, a picture buffer used for storing a 2-dimensional picture serving as an object of erase processing is designated as the buffer of interest. Then, copy processing is carried out to store an expansion drawing into the paste buffer. Subsequently, a portion of the expansion drawing stored in the paste buffer is erased. Finally, paste processing is carried out to paste a projection drawing for the expansion drawing on the original position in the buffer of interest.

Assume for example that it is desired to erase a cylinder embedded in a wall with a lattice pattern drawn thereon from a 2-dimensional picture shown in FIG. 26A. In accordance with the procedure of the paste processing described above, first of all, copy processing is carried out to store an expansion drawing of the wall into the paste buffer as shown in FIG. 26B. Then, the cylinder portion is merely erased before carrying out paste processing. However, such erase processing results in an unnatural 2-dimensional picture wherein the portion including the erased cylinder becomes a portion with no pattern.

In order to solve the problem described above, after a portion of the expansion drawing stored in the paste buffer is erased, the background of the erased portion is reproduced.

Reconsider the above case to erase a cylinder embedded in a wall with a lattice pattern drawn thereon from a 2-dimensional picture shown in FIG. 26A. In this case, copy processing is carried out to store an expansion drawing of the wall into the paste buffer as shown in FIG. 26B. Then, the cylinder portion is erased and, before carrying out paste processing, a background of the erased portion is drawn. Thus, a lattice pattern is drawn over the entire expansion drawing in the paste buffer like one shown in FIG. 26C.

As a result, by carrying out paste processing using such an expansion drawing, it is possible to obtain a natural 2-dimensional picture wherein the cylinder is erased from the picture and a lattice pattern is then reproduced on the portion used to be occupied by the erased cylinder as shown in FIG. 26D.

It should be noted that, as a method of erasing a portion of a picture and then reproducing a background on the erased portion as described above, one of techniques disclosed in references authored by the applicant for a patent of the present invention can be adopted. The references include Japanese Patent Laid-open No. Hei 9-128529 corresponding to an EP disclosure No. 0772157 and Japanese Patent Laid-open No. Hei 10-105700 corresponding to U.S. Pat. No. 5,892,853.

The copy processing described so far is carried out to generate an expansion drawing of only one surface of a 3-dimensional object shown in a 2-dimensional picture stored in the buffer of interest and to store the expansion drawing in the paste buffer. It should be noted, however, that the copy processing can also be carried out to generate an expansion drawing of two or more adjacent surfaces of a 3-dimensional object shown in a 2-dimensional picture stored in the buffer of interest and to store the expansion drawing in the paste buffer.

For example, assume that a 2-dimensional picture representing a 3-dimensional object with a shape of a house has been stored in the buffer of interest as shown in FIG. 27A, and it is desired to add contiguous character strings and figures on a wall with a lattice pattern and an adjacent wall with no pattern. In this case, first of all, copy processing is carried out on the wall with a lattice pattern to generate an expansion drawing of the wall and store the expansion drawing into the paste buffer. Then, a string of characters and a figure are drawn on the expansion drawing, and paste processing is carried out to paste the patterned wall with the string of characters and the figure drawn thereon on the original 2-dimensional picture. Furthermore, the same pieces of processing are carried out on the wall with no pattern. To be more specific, first of all, copy processing is carried out on the wall with no pattern to generate an expansion drawing of the wall and store the expansion drawing into the paste buffer. Then, a string of characters and a figure are drawn on the expansion drawing, and paste processing is carried out to paste the unpatterned wall with the string of characters and the figure drawn thereon on the original 2-dimensional picture. Since the same pieces of processing are carried out twice, however, the operations are cumbersome. In addition, it is difficult to draw the string of characters on the wall with no pattern as a continuation to the string of characters already drawn on the wall with a lattice pattern, and also hard to draw the figure on the wall with no pattern as a continuation to the figure already drawn on the wall with a lattice pattern.

In order to solve the problem described above, copy processing is carried out to generate an expansion drawing of the wall with a lattice pattern as well as an expansion drawing of the adjacent wall with no lattice pattern, and store the 2 expansion drawings into the paste buffer as a contiguous drawing as shown in FIG. 27B. In this case, it is easy to draw a contiguous string of characters and a contiguous figure over the wall with a lattice pattern and the adjacent wall with no pattern.

Figure 28:
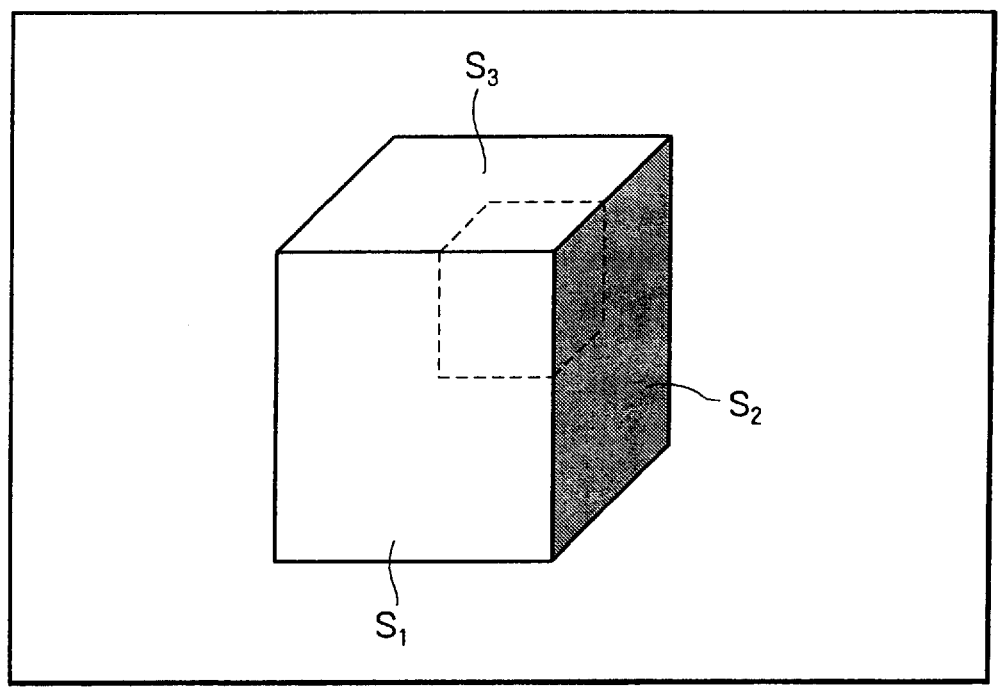
FIG. 28 is a diagram showing a 2-dimensional picture displaying a 3-dimensional object with a line drawn over 3 surfaces thereof.

As another example, assume that a 2-dimensional picture representing a 3-dimensional object with a cubic shape has been stored in the buffer of interest as shown in FIG. 28 and it is desired, for example, to draw a continuous line represented by a dashed line in the figure over 3 visible surfaces $S_1$, $S_2$ and $S_3$. In this case, an expansion drawing can be produced for each of the surfaces $S_1$, $S_2$ and $S_3$, a segment of line can then be drawn on the expansion drawing and the expansion drawing with the segment of line drawn thereon can finally be pasted on the original 2-dimensional picture. Instead of carrying out such operations, which are cumbersome and difficult as described above, an expansion drawing is generated by concatenating expansion drawings of the surfaces $S_1$, $S_2$ and $S_3$ in accordance with a relation of connection among the surfaces $S_1$, $S_2$ and $S_3$, and, then, a segment of line is drawn on the expansion drawing resulting from the concatenation. In this way, a line continuous over the surfaces $S_1$, $S_2$ and $S_3$ can be resulted in with ease.

In order to implement a process to typically add a continuous string of characters or a continuous figure to a plurality of adjacent surfaces of a 3-dimensional object represented by a 2-dimensional picture stored in the buffer of interest, it is desirable to carry out copy processing on the surfaces by treating the surfaces as a single object.

Figure 29:
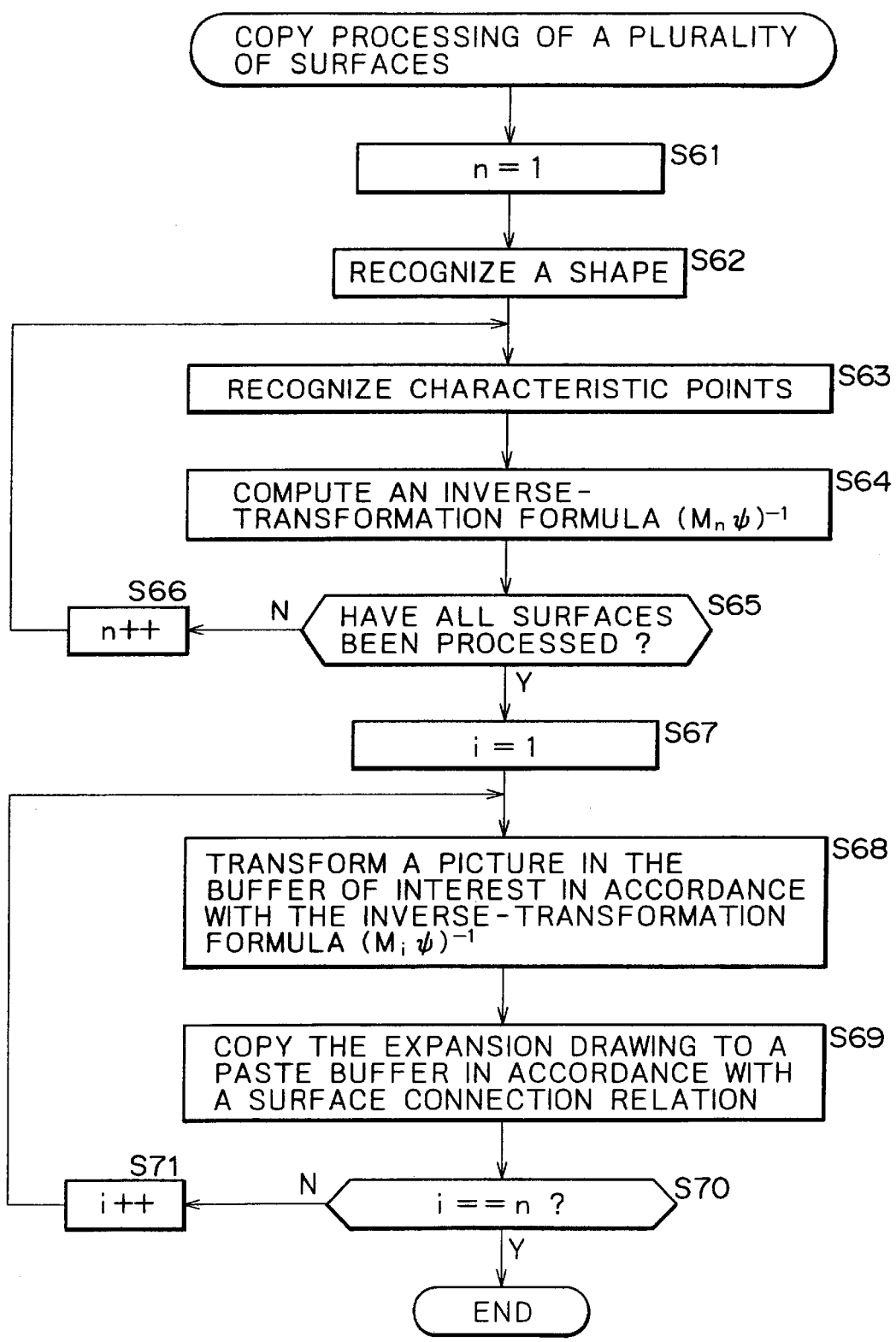
FIG. 29 shows a flowchart used as a reference in a description of copy processing carried out on a plurality of surfaces.

The following description explains copy processing carried out on a plurality of adjacent surfaces of a 3-dimensional object represented by a 2-dimensional picture stored in the buffer of interest by referring to a flowchart shown in FIG. 29.

As shown in the figure, the copy processing carried out on an object comprising a plurality of surfaces begins with a step S61 at which the copy-operation-processing unit 12 sets a variable n at an initial value of typically 1. Then, as the user operates a shape button 32 shown in FIG. 8, the flow of the copy processing goes on to a step S62 at which the copy-operation-processing unit 12 recognizes information on shapes of the surfaces of the 3-dimensional object subjected to the copy processing on the basis of the operation carried out by the user on the shape button 32.

Then, as the user operates the input unit 6 to specify characteristic points on a surface of the 3-dimensional object subjected to the copy processing and represented by a 2-dimensional picture stored in the buffer of interest, the flow of the copy processing goes on to a step S63 at which the copy-operation-processing unit 12 recognizes the coordinates of the specified characteristic points in the coordinate system of the 2-dimensional picture. It should be noted that, if necessary, the copy-operation-processing unit 12 supplies the characteristic points to the transformation-specification-processing unit 19 for carrying out the automatic correction processing described above after the recognition of the coordinates of the characteristic points.

After the copy-operation-processing unit 12 recognizes the coordinates of the specified characteristic points in the coordinate system of the 2-dimensional picture, the flow of the copy processing goes on to a step S64 at which the copy-operation-processing unit 12 finds an inverse-transformation formula $(M_n \psi)^{-1}$ for transforming the surface of the 3-dimensional object represented by the 2-dimensional picture stored in the buffer of interest into an expansion drawing by using the information on a shape recognized at the step S62 and the characteristic points recognized at the immediately preceding step S63. The symbol $M_n$ used in the notation $(M_n \psi)^{-1}$ representing the inverse-transformation formula denotes a matrix M for surface #n, which is one of the surfaces subjected to the copy processing. Surface #n is indicated by the characteristic points recognized at the step S63 in an n-th iteration of execution of a loop consisting of the step S63, the step S64, a step S65 and a step S66. The matrix M is used for projecting the surface of the 3-dimensional object in the 3-dimensional space on a screen as described earlier by referring to FIG. 19.

The flow of the copy processing then goes on to a step S65 to form a judgment as to whether or not the input-event-processing unit 11 has received characteristic points entered by the user for all the surfaces subjected to the copy processing. If the outcome of the judgment formed at the step S65 indicates that the user has not entered characteristic points for all the surfaces subjected to the copy processing, that is, if the user again operates the input unit 6 in order to specify characteristic points of another surface of the 3-dimensional object subjected to the copy processing, for example, the flow of the copy processing goes on to the step S66 at which the copy-operation-processing unit 12 increments the variable n by 1. After the user operates the input unit 6 to specify characteristic points on a next surface of the 3-dimensional object subjected to the copy processing, the flow of the copy processing goes back to the step S63 to repeat the same processing by execution of a next iteration of the loop described above.

If the outcome of the judgment formed at the step S65 indicates that the user has entered characteristic points for all the surfaces subjected to the copy processing, that is, if the user typically operates the input unit 6 to specify the end of the operation to enter characteristic points, on the other hand, the flow of the copy processing goes on to a step S67 at which the copy-operation-processing unit 12 sets a variable i at an initial value of typically 1 and supplies the inverse-transformation formula $(M_i \psi)^{-1}$ to the picture-transformation-processing unit 20. At the next step S68, the picture-transformation-processing unit 20 transforms the projection drawing of surface #i of the 3-dimensional object represented by the 2-dimensional picture stored in the buffer of interest into an expansion drawing by using the inverse-transformation formula $(M_i \psi)^{-1}$. As described before, surface #i is identified by characteristic points thereof.

At the next step S69, the picture-transformation-processing unit 20 stores the expansion drawing of surface #i into the paste buffer.

The picture-transformation-processing unit 20 writes the expansion drawing of surface #i into the paste buffer in accordance with a relation of connection with each one of the surfaces subjected to the copy processing, which is joined to surface #i. A surface joined to surface #i is referred to hereafter as a joined surface. Assume for example that surface #i', where i' is an integer in the range 1 to (i–1), has been written into the paste buffer. If surface #i' is joined to surface #i in the 3-dimensional object, the picture-transformation-processing unit 20 basically writes the expansion drawing of surface #i into the paste buffer so that the expansion drawing of surface #i is joined to the expansion drawing of surface #i', which has been written into the paste buffer before. As a result, in this case, an expansion drawing representing a state of expanding surfaces #i and #i' of the 3-dimensional object at the same time is stored in the paste buffer.

It should be noted that, for i=1, that is, in an operation to write the expansion drawing of surface #1 into the paste buffer, none of the surfaces subjected to the copy processing have been stored in the paste buffer. Thus, the expansion drawing of surface #1 is written into the paste buffer at any arbitrary location such as typically the center of the paste buffer.

After the expansion drawing of surface #i is written into the paste buffer, the flow of the copy processing goes on to a step S70 at which the copy-operation-processing unit 12 forms a judgment as to whether or not the variable i is equal to n. If the outcome of the judgment formed at the step S70 indicates that the variable i is not equal to n, that is, if the expansion drawings of the surfaces subjected to the copy processing have not all been stored in the paste buffer, the flow of the copy processing goes on to a step S71 at which the variable i is incremented by 1. Then, the flow of the copy processing goes back to the step S68 to repeat the pieces of processing at the steps S68 to S71 till the outcome of the judgment formed at the step S70 indicates that the variable i is equal to n.

As the outcome of the judgment formed at the step S70 indicates that the variable i is equal to n, the copy processing is terminated.

By carrying out the pieces of processing at the steps S68 to S71 repeatedly as described above, first of all, the expansion drawing of surface #1 is written into the paste buffer and, then, the expansion drawing of surface #2 is written into the paste buffer at a location according to a relation of connection with surface #1. Subsequently, the expansion drawing of surface #3 is written into the paste buffer at a location according to a relation of connection with surface #1 and a relation of connection with surface #2. Thereafter, the operation to write the expansion drawing of a surface into the paste buffer is carried out in the same way till the expansion drawing of surface #n is written into the paste buffer. Eventually, a joint drawing is stored in the paste buffer as a result of the repeated operations to write the expansion drawings of the surfaces. A joint drawing is a picture obtained as a result of joining the expansion drawings of a plurality of surfaces subjected to the copy processing in accordance with relations of connection among the surfaces and surface #1, which is used as a base of the joint drawing.

Assume for example that, in a projection drawing shown in FIG. 30A, rectangular surface #1 having vertexes at points $A_1$, $B_1$, $C_1$ and $D_1$ and rectangular surface #2 having vertexes at points $A_2$, $B_2$, $C_2$ and $D_2$ have a common side coinciding with a side $B_1C_1$ of surface #1 and a side $A_2D_2$ of surface #2. First of all, the expansion drawing of surface #1 is written into the paste buffer and, then, the expansion drawing of surface #2 is written into the paste buffer at a location according to a relation of connection with surface #1. As a result, a joint drawing shown in FIG. 30B is stored in the paste buffer. As shown in the figure, the joint drawing consists of the expansion drawings of surfaces #1 and #2.

In the embodiment shown in FIGS. 30A and 30B, the vertexes of rectangular surface #1 are specified as characteristic points on the projection drawing at points $A_1$, $B_1$, $C_1$ and $D_1$, which correspond to points $a_1$, $b_1$, $c_1$ and $d_1$ on the expansion drawing of surface #1 respectively. The expansion drawing of surface #1 has a width of 1 and a length of 1. The coordinate system of the expansion drawing, that is, the paste-buffer coordinate system, is set at such a location and in such an orientation that the origin of the coordinate system coincides with the center of gravity of the expansion drawing representing surface #1, whereas the x and y axes of the coordinate system are oriented in the right and downward directions respectively.

The x and y axes of the coordinate system of the expansion drawing of surface #i, that is, the x and y axes of the paste-buffer coordinate system, are denoted hereafter by symbols $x_{ei}$ and $y_{ei}$ respectively.

Thus, in the paste buffer shown in FIG. 30B, the $x_{e1}$ and $y_{e1}$ coordinates of the points $a_1$, $b_1$, $c_1$ and $d_1$ on the expansion drawing of surface #1 are (–1/2, –1/2), (1/2, –1/2), (1/2, 1/2) and (–1/2, 1/2) respectively.

By the same token, the vertexes of rectangular surface #2 are specified as characteristic points on the projection drawing at points $A_2$, $B_2$, $C_2$ and $D_2$, which correspond to points $a_2$, $b_2$, $c_2$ and $d_2$ on the expansion drawing of surface #2 respectively. The expansion drawing of surface #2 has a width of 1 and a length of 1. The paste-buffer coordinate system is set at such a location and in such an orientation that the origin of the coordinate system coincides with the center of gravity of the expansion drawing representing surface #2, whereas the x and y axes of the coordinate system are oriented in the right and downward directions respectively. The x and y axes of the coordinate system of the expansion drawing of surface #2 are denoted hereafter by symbols $x_{e2}$ and $y_{e2}$ respectively.

Thus, in the paste buffer shown in FIG. 30B, the $x_{e2}$ and $y_{e2}$ coordinates of the points $a_2$, $b_2$, $c_2$ and $d_2$ on the expansion drawing of surface #2 are (−1/2, −1/2), (1/2, −1/2), (1/2, 1/2) and (−1/2, 1/2) respectively.

As described above, the expansion drawings of rectangular surfaces #1 and #2 are each a square having a length of 1 and a width of 1. It should be noted, however, that the expansion drawings of rectangular surfaces #1 and #2 can each have a rectangular shape of any other arbitrary scale.

After a joint drawing like the one shown in FIG. 30B has been stored in the paste buffer, characters and a figure can be written and drawn over the joint drawing in the same way as the case of an expansion drawing of 1 surface stored in the paste buffer.

As another example, a 3-dimensional object comprises 5 surfaces, namely, surfaces #1, #2, #3, #4 and #5 each having a rectangular shape as indicated by its information on a shape. The object is photographed by means of the camera 9 to result in a projection drawing like one shown in FIG. 31A. The projection drawing is transformed into a joint drawing consisting of expansion drawings of surfaces #1 to #5 by execution of the processing representing by the flowchart shown in FIG. 29. As a result, a joint drawing like one shown in FIG. 31B is obtained.

In the projection drawing shown in FIG. 31A, a continuous line-segment pattern is drawn over surfaces #1 to #3, which are joined to each other. In the expansion drawing shown in FIG. 31B, however, the line-segment pattern becomes discontinuous at each junction between the surfaces, that is, on the border between surfaces #1 and #2 and on the border between surfaces #1 and #3. The fact that a continuous line-segment pattern on a projection drawing becomes a discontinuous line-segment pattern on an expansion drawing as such is unnatural, making the user feel a sense of incompatibility.

The phenomenon described above is attributed to the fact that a projection drawing obtained as a result of photographing a 3-dimensional object by means of the camera 9 is affected by distorted-line aberration of a lens employed in the camera 9 or the like so that the projection drawing does not match a projection drawing obtained as a result of simple perspective transformation of the 3-dimensional object.

In order to solve the problem described above, there is provided a technique for preventing an unnatural expansion drawing like the one described above from being produced whereby the so-called camera parameters including the distorted-line aberration of the lens employed in the camera 9 are found and the perspective transformation expressed by Eq. (9) is carried out by taking the camera parameters into consideration.

However, a lot of processing is required and it takes a long time to find the camera parameters of an operation to photograph a 3-dimensional object by means of the camera 9 on a full scale from a projection drawing obtained as a picture produced by the camera 9.

In order to solve this problem, there has been provided a method for transforming a projection drawing produced by the camera 9 into an expansion drawing by assuming that the projection drawing does not include an error caused by the distorted-line aberration of the lens employed in the camera 9 or the like.

To put it in detail, in a projection drawing not including an error caused by the distorted-line aberration of the lens, parallel straight lines in the 3-dimensional space converge on a common point referred to as a point of elimination. In the method for transforming a projection drawing produced by the camera 9 into an expansion drawing, the point of elimination on the projection drawing is assumed to be a single point of line convergence.

To put it concretely, let a 3-dimensional object comprise surface #1 having vertexes A, B, C and D and surface #2 having vertexes A, B, F and E as shown in FIG. 32A. Due to distorted-line aberration of the lens employed in the camera 9 or the like, in a projection drawing photographed by the camera 9, the point of elimination of surface #1, that is, the cross point of straight lines AB and DC, does not actually coincide with the point of elimination of surface #2, that is, the cross point of straight lines AB and EF. As a result, a continuous line-segment pattern over surfaces #1 and #2 on the projection drawing becomes a discontinuous line-segment pattern on the border between 2 expansion drawings of surfaces #1 and #2 constituting a joint drawing as shown in FIG. 32B.

It should be noted that, in the example shown in FIGS. 32A and 32B, the points A to F on the projection drawing correspond to points a to f on the expansion drawings respectively.

Figures 33A, 33B:
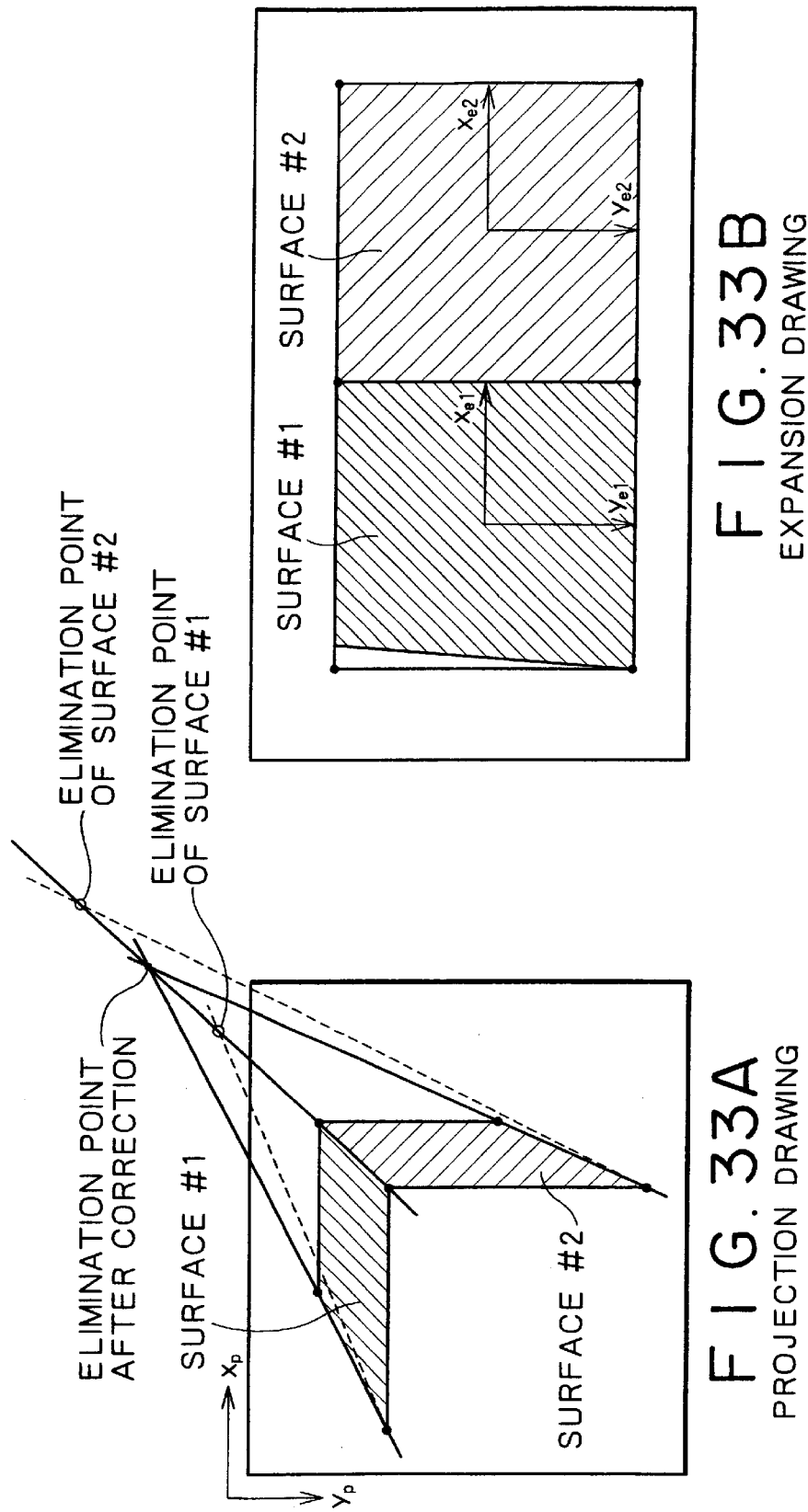
FIGS. 33A and 33B are a plurality of explanatory diagrams used as a reference in a description of a case in which a projection drawing corrected to make points of elimination coincide with each other is transformed into an expansion drawing.

In order to solve the problem of the pattern discontinuity described above, the projection drawing is transformed into an expansion drawing by correcting the points of elimination of surfaces #1 and #2 on the projection drawing to a single common point of elimination as shown in FIG. 33A. As a result, a continuous line-segment pattern over a plurality of surfaces on the projection drawing remains as a continuous line-segment pattern as well over a plurality of surfaces on the expansion drawing.

In this case, however, the expansion drawing like one shown in FIG. 33B is obtained as a result of the transformation of the projection drawing having the corrected point of elimination as shown in FIG. 33A. As shown in the figures, a non-configuration portion of surface #1 in the projection drawing becomes a configuration portion of surface #1 in the expansion drawing. On the other hand, a configuration portion of surface #2 in the projection drawing does not appear as a configuration portion of surface #2 in the expansion drawing. As a result, the expansion drawing becomes unnatural.

In order to make the expansion drawing natural, the picture-transformation-processing unit 20 shown in FIG. 4 corrects an inter-drawing relation between the projection and expansion drawings. As described above, the forward-transformation formula $M\psi$ and the inverse-transformation formula $(M\psi)^{-1}$ prescribe the inter-drawing relation between the projection and expansion drawings. An inter-drawing relation obtained as a result of the correction of the inter-drawing relation between the projection and expansion drawings is referred to hereafter as a new inter-drawing relation.

Figure 34:
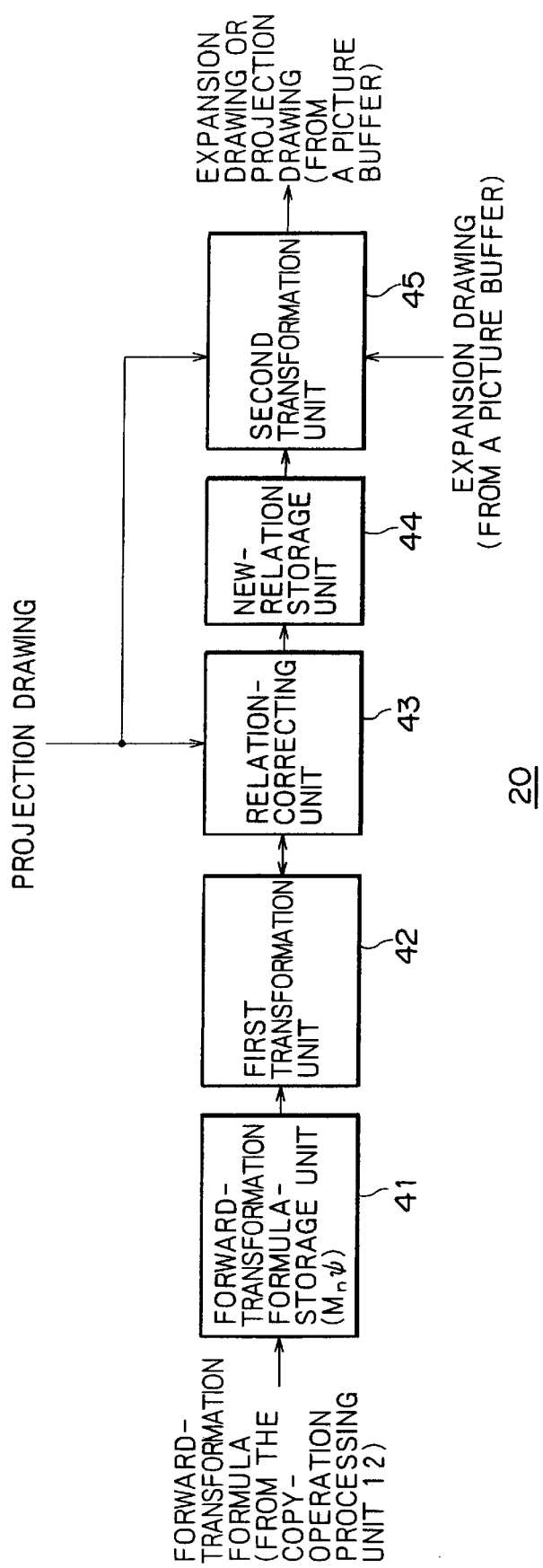
FIG. 34 is a block diagram showing a typical functional configuration of a picture-transformation-processing unit 20 employed in the picture-processing apparatus shown in FIG. 4.

FIG. 34 is a diagram showing a typical functional configuration of the picture-transformation-processing unit 20 for carrying out such processing.

A forward-transformation-formula-storage unit 41 is used for storing forward-transformation formulas for surfaces composing a 3-dimensional object displayed in a projection drawing to be transformed into an expansion drawing. As described above, the paste-operation-processing unit 13 computes each forward-transformation formula $M\psi$. It should be noted, however, that in this embodiment, the copy-operation-processing unit 12 computes each forward-transformation formula $M\psi$ in the same way as the paste-operation-processing unit 13 does, and supplies the forward-transformation formulas $M\psi$ to the forward-transformation-formula storage unit 41.

A first transformation unit 42 transforms a point on a side common to 2 adjacent surfaces on the expansion drawing into a point on the projection drawing by using a forward-transformation formula stored in the forward-transformation-formula storage unit 41 for one of the adjacent surfaces. Then, the first transformation unit 42 transforms the same point on the side common to the 2 adjacent surfaces on the expansion drawing into a point on the projection drawing by using a forward-transformation formula stored in the forward-transformation-formula storage unit 41 for the other adjacent surface. Results of the transformations and the point on the expansion drawing prior to the transformation are supplied to a relation-correcting unit 43.

The relation-correcting unit 43 corrects an inter-drawing relation between the projection and expansion drawings, which is prescribed by the forward-transformation formula, in accordance with the information received from the first transformation unit 42, and supplies a corrected relation also referred to as a new inter-drawing relation to a new-relation storage unit 44.

The new-relation storage unit 44 is used for storing the new inter-drawing relation received from the relation-correcting unit 43.

A second transformation unit 45 transforms the projection drawing stored in the buffer of interest into an expansion drawing on the basis of the new-relation stored in the new-relation storage unit 44, and stores the expansion drawing in the paste buffer. In addition, the second transformation unit 45 also transforms the expansion drawing stored in the paste buffer into a projection drawing on the basis of the new-relation stored in the new-relation storage unit 44, and pastes the projection drawing on the buffer of interest.

Figure 35:
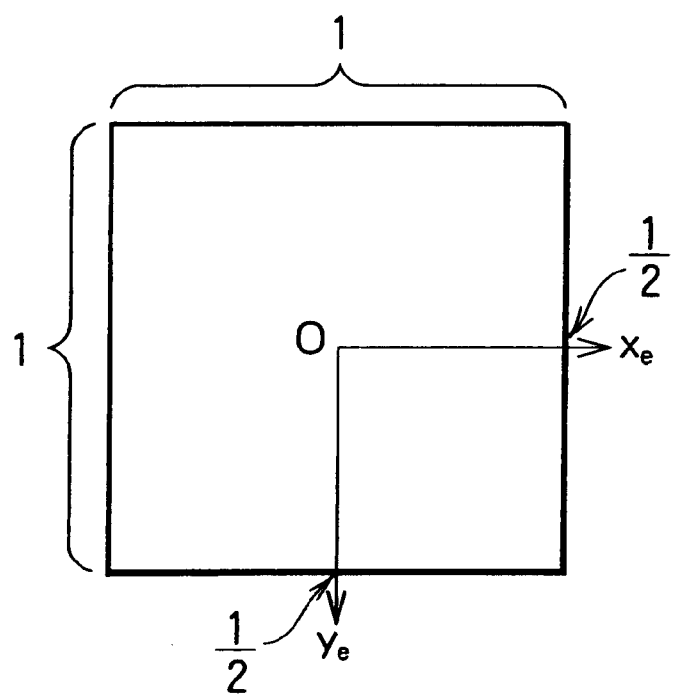
FIG. 35 is a diagram showing how to set a paste-buffer coordinate system.

It should be noted that, in the following description, a projection drawing of a surface with information on a shape indicating a rectangle is transformed into an expansion drawing with a square shape having a width of 1 and a length of 1 as shown in FIG. 35. In addition, the coordinate system for the expansion drawing of each surface, that is, the paste-buffer coordinate system, is set so that the origin of the coordinate system coincides with the center of gravity of the expansion drawing.

Figure 36:
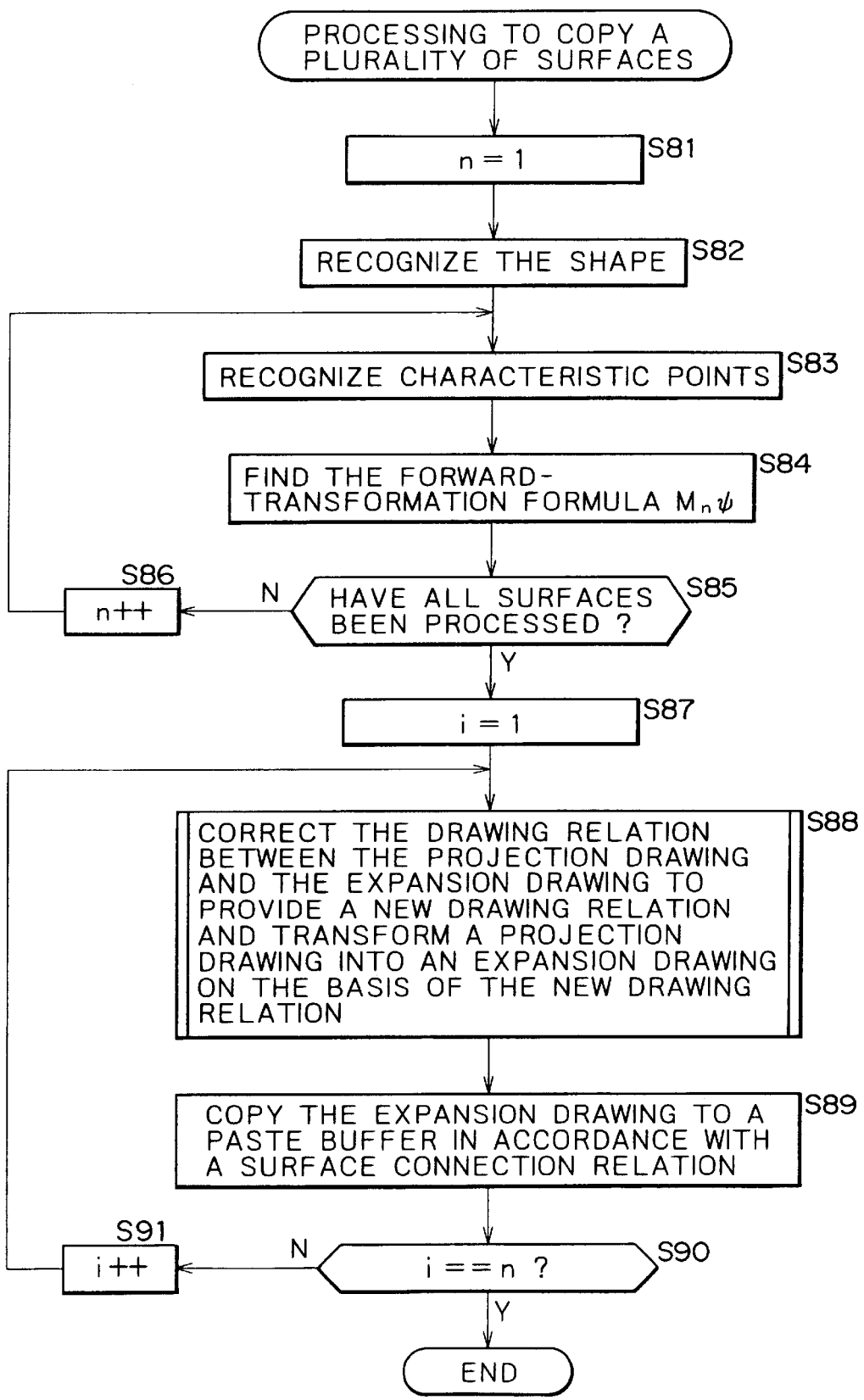
FIG. 36 shows another flowchart used as a reference in a description of copy processing carried out on a plurality of surfaces.

The following description explains processing carried out by the picture-transformation-processing unit 20 shown in FIG. 34 in the copy processing performed on a plurality of surfaces by referring to a flowchart shown in FIG. 36.

As shown in FIG. 36, the flowchart begins with a step S81 at which the copy-operation-processing unit 12 shown in FIG. 4 sets a variable n at an initial value of typically 1. Then, as the user operates a shape button 32 shown in FIG. 8, the flow of the copy processing goes on to a step S82 at which the copy-operation-processing unit 12 recognizes information on a shape of the surfaces of the 3-dimensional object subjected to the copy processing on the basis of the operation carried out by the user on the shape button 32.

Then, as the user operates the input unit 6 to specify characteristic points on a surface of the 3-dimensional object subjected to the copy processing and represented by a 2-dimensional picture stored in the buffer of interest, the flow of the copy processing goes on to a step S83 at which the copy-operation-processing unit 12 recognizes the coordinates of the specified characteristic points in the coordinate system of the 2-dimensional picture. The surface, the coordinates of the characteristic points of which are recognized at the step S83, are referred to as the surface of interest. It should be noted that, if necessary, the copy-operation-processing unit 12 supplies the characteristic points to the transformation-specification-processing unit 19 for carrying out the automatic correction processing described above after the recognition of the coordinates of the characteristic points.

After the copy-operation-processing unit 12 recognizes the coordinates of the specified characteristic points in the coordinate system of the 2-dimensional picture, the flow of the copy processing goes on to a step S84 at which the copy-operation-processing unit 12 finds a forward-transformation formula $M_n\psi$ prescribing an inter-drawing relation between the projection and expansion drawings for the surface of interest by using the information on a shape recognized at the step S82 and the characteristic points recognized at the immediately preceding step S83 in the way described above. The symbol $M_n$ used in the notation $M_n\psi$ representing the forward-transformation formula denotes a matrix M for surface #n, which is one of the surfaces subjected to the copy processing. Surface #n is the surface of interest indicated by the characteristic points recognized at the step S83 in an n-th iteration of execution of a loop consisting of the step S83, the step S84, a step S85 and a step S86.

The flow of the copy processing then goes on to a step S85 to form a judgment as to whether or not the input-event-processing unit 11 has received characteristic points entered by the user for all the surfaces subjected to the copy processing. If the outcome of the judgment formed at the step S85 indicates that the user has not entered characteristic points for all the surfaces subjected to the copy processing, that is, if the user again operates the input unit 6 in order to specify characteristic points of another surface, for example, the flow of the copy processing goes on to the step S86 at which the copy-operation-processing unit 12 increments the variable n by 1. After the user operates the input unit 6 to specify characteristic points on a next surface of the 3-dimensional object subjected to the copy processing, the flow of the copy processing goes back to the step S83 to repeat the same processing by execution of a next iteration of the loop described above.

If the outcome of the judgment formed at the step S85 indicates that the user has entered characteristic points for all the surfaces subjected to the copy processing, that is, if the user typically operates the input unit 6 to specify the end of the operation to enter characteristic points, on the other hand, the flow of the copy processing goes on to a step S87 at which the copy-operation-processing unit 12 sets a variable i at an initial value of typically 1. Also at the same step S87, the copy-operation-processing unit 12 supplies the forward-transformation formulas $M_i\psi$ where i=1 to n to the forward-transformation-formula storage unit 41 employed in the picture-transformation-processing unit 20 shown in FIG. 34 to be stored therein. Obtained in the processing of the loop consisting of the step S83, the step S84, the step S85 and the step S86 described above, each of the forward-transformation formulas $M_i\psi$ prescribes a drawing relation between the projection drawing of surface #i and the corresponding expansion drawing.

At the next step S88, the picture-transformation-processing unit 20 shown in FIG. 34 corrects the inter-drawing relation between the projection drawing of surface #i and the corresponding expansion drawing, resulting in a new inter-drawing relation. As described above, the inter-drawing relation is prescribed by the forward-transformation formulas $M_i \psi$. The picture-transformation-processing unit 20 then transforms the projection drawing of surface #i of the 3-dimensional object represented by the 2-dimensional picture stored in the buffer of interest into the expansion drawing by using the new inter-drawing relation. The flow of the copy processing then goes on to a step S89.

At the next step S89, the picture-transformation-processing unit 20 stores the expansion drawing of surface #i obtained at the step S88 into the paste buffer. To put it in detail, the picture-transformation-processing unit 20 writes the expansion drawing of surface #i into the paste buffer in accordance with a relation of connection with each one of the surfaces subjected to the copy processing, which is joined to surface #i, in the same way as the step S69 of the flowchart shown in FIG. 29. The flow of the copy processing then goes on to a step S90.

At the step S90, the copy-operation-processing unit 12 forms a judgment as to whether or not the variable i is equal to n. If the outcome of the judgment formed at the step S90 indicates that the variable i is not equal to n, that is, if the expansion drawings of the surfaces subjected to the copy processing have not all been stored in the paste buffer, the flow of the copy processing goes on to a step S91 at which the variable i is incremented by 1. Then, the flow of the copy processing goes back to the step S88 to repeat the pieces of processing at the step S88 to S91 till the outcome of the judgment formed at the step S90 indicates that the variable i is equal to n.

As the outcome of the judgment formed at the step S90 indicates that the variable i is equal to n, the copy processing is terminated.

Figure 37:
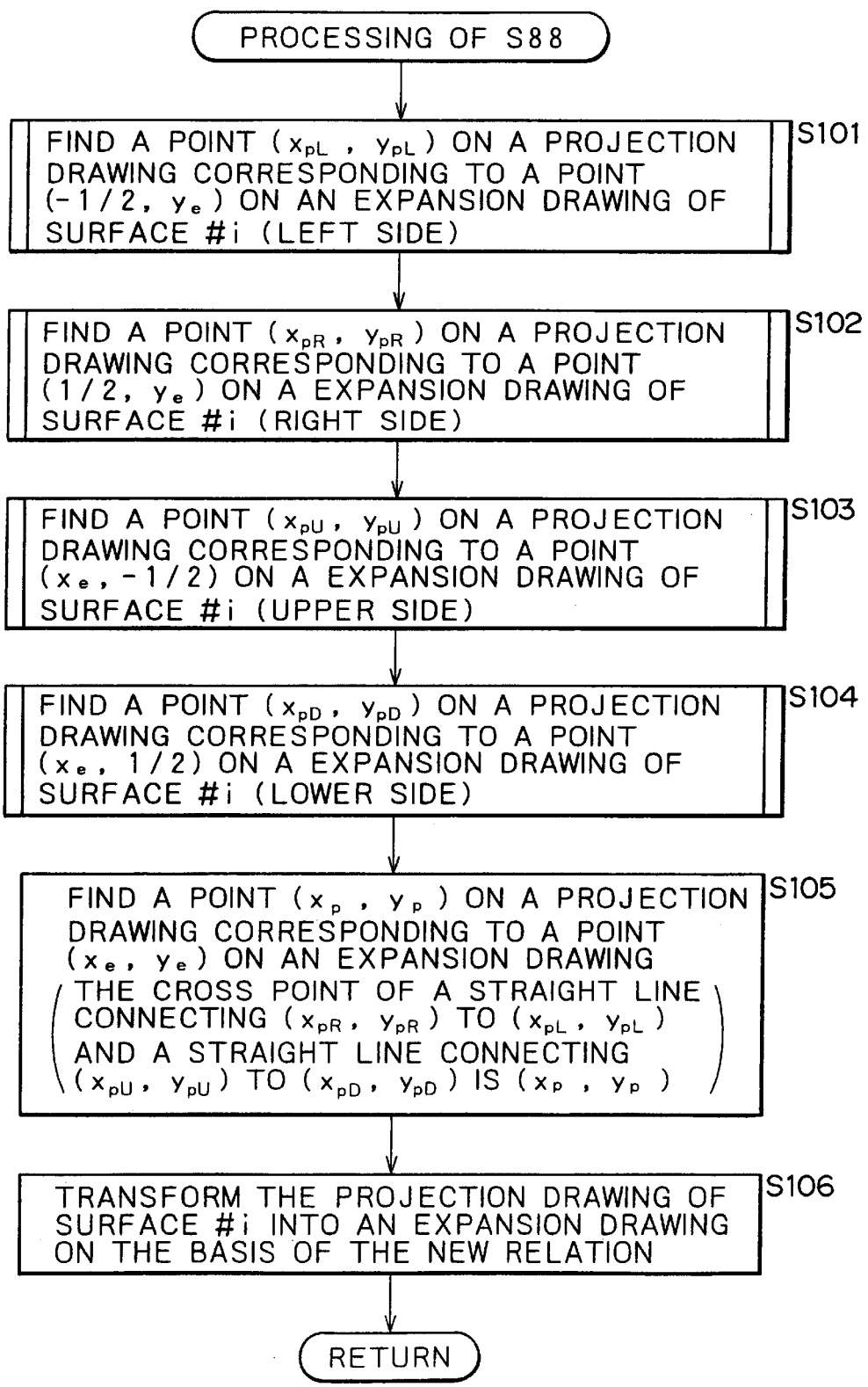
FIG. 37 shows a flowchart used as a reference in a description of details of processing carried out at a step S88 of the flowchart shown in FIG. 36.

The following description further explains the processing carried out by the picture-transformation-processing unit 20 shown in FIG. 34 at the step S88 of the flowchart used as a reference in a description of the copy processing performed on a plurality of surfaces as shown in FIG. 36 by referring to a flowchart shown in FIG. 37.

As shown in FIG. 37, the flowchart begins with a step S101 at which the first transformation unit 42 and the relation-correcting unit 43 find a point $(x_{pL}, y_{pL})$ on the projection drawing. The point $(x_{pL}, y_{pL})$ is supposed to correspond to a point $(-1/2, y_e)$ on the expansion drawing of surface #i serving as the surface of interest. Each pair consisting of a point $(x_{pL}, y_{pL})$ on the projection drawing and a corresponding point $(-1/2, y_e)$ on the expansion drawing is supplied to the new-relation storage unit 44 as a new inter-drawing relation.

To put it in detail, a surface constituting the projection drawing and having information on a shape indicating that the surface is rectangular is transformed into an expansion drawing with a square shape having a width of 1 and a length of 1. The coordinate system for the expansion drawing of each surface, that is, the paste-buffer coordinate system, is set at such a location and in such an orientation that the origin of the coordinate system coincides with the center of gravity of the expansion drawing representing surface #i, whereas the $x_e$ and $y_e$ axes of the coordinate system are oriented in the right and downward directions respectively as shown in FIG. 35. With such a coordinate system, each point $(-1/2, y_e)$ on the expansion drawing is a point on the left side of the square shape of the expansion drawing. Thus, the processing is carried out at the step S101 to find each point $(x_{pL}, y_{pL})$ located on the projection drawing and supposed to correspond to a point $(-1/2, y_e)$ on the left side of the expansion drawing of surface #i serving as the surface of interest. Each pair of a point $(-1/2, y_e)$ and the corresponding point $(x_{pL}, y_{pL})$ is stored in the new-relation storage unit 44 as a new inter-drawing relation.

At the next step S102, the first transformation unit 42 and the relation-correcting unit 43 find a point $(x_{pR}, y_{pR})$ on the projection drawing. The point $(x_{pR}, y_{pR})$ is supposed to correspond to a point $(1/2, y_e)$ on the expansion drawing of surface #i serving as the surface of interest. Each pair consisting of a point $(x_{pR}, y_{pR})$ on the projection drawing and a corresponding point $(1/2, y_e)$ on the expansion drawing is supplied to the new-relation storage unit 44 as a new inter-drawing relation.

To put it in detail, the paste-buffer coordinate system is set in such an orientation that the $x_e$ and $y_e$ axes of the coordinate system are oriented in the right and downward directions respectively as described earlier. With such a coordinate system, each point $(1/2, y_e)$ on the expansion drawing is a point on the right side of the square shape of the expansion drawing. Thus, the processing is carried out at the step S102 to find each point $(x_{pR}, y_{pR})$ located on the projection drawing and supposed to correspond to a point $(1/2, y_e)$ on the right side of the expansion drawing of surface #i serving as the surface of interest. Each pair of a point $(1/2, y_e)$ and the corresponding point $(x_{pR}, y_{pR})$ is stored in the new-relation storage unit 44 as a new inter-drawing relation.

At the next step S103, the first transformation unit 42 and the relation-correcting unit 43 find a point $(x_{pU}, y_{pU})$ on the projection drawing. The point $(x_{pU}, y_{pU})$ is supposed to correspond to a point $(x_e, -1/2)$ on the expansion drawing of surface #i serving as the surface of interest. Each pair consisting of a point $(x_{pU}, y_{pU})$ on the projection drawing and a corresponding point $(x_e, -1/2)$ on the expansion drawing is supplied to the new-relation storage unit 44 as a new inter-drawing relation.

To put it in detail, if the expansion drawing is viewed in the way described above, each point $(x_e, -1/2)$ on the expansion drawing is a point on the upper side of the square shape of the expansion drawing. Thus, the processing is carried out at the step S103 to find each point $(x_{pU}, y_{pU})$ located on the projection drawing and supposed to correspond to a point $(x_e, -1/2)$ on the upper side of the expansion drawing of surface #i serving as the surface of interest. Each pair of a point $(x_e, -1/2)$ and the corresponding point $(x_{pU}, y_{pU})$ is stored in the new-relation storage unit 44 as a new inter-drawing relation.

At the next step S104, the first transformation unit 42 and the relation-correcting unit 43 find a point $(x_{pD}, y_{pD})$ on the projection drawing. The point $(x_{pD}, y_{pD})$ is supposed to correspond to a point $(x_e, 1/2)$ on the expansion drawing of surface #i serving as the surface of interest. Each point $(x_e, 1/2)$ is located on the lower side of the square shape forming the expansion drawing of surface #i Each pair consisting of a point $(x_{pD}, y_{pD})$ on the projection drawing and a corresponding point $(x_e, 1/2)$ on the expansion drawing is supplied to the new-relation storage unit 44 as a new inter-drawing relation.

It should be noted that the pieces of processing of the steps S101 to S104 can be carried out in any arbitrary order. As an alternative, the pieces of processing of the steps S101 to S104 can be carried out in parallel.

After the processing of the step S104 is carried out, the flow of the relation correction goes on to a step S105 at which a second transformation unit 45 finds a point $(x_p, y_p)$ on the projection drawing. The point $(x_p, y_p)$ is supposed to correspond to a point $(x_e, y_e)$ inside the square shape of the expansion drawing. The point $(x_p, y_p)$ is found on the basis of the new inter-drawing relations between points on the sides of the square shape of the expansion drawing and points on the projection drawing. The new inter-drawing relations have been obtained as results of the pieces of processing carried out at the steps S101 to S104. Each pair of a point ($x_p$, $y_p$) and a corresponding point ($x_e$, $y_e$) is supplied to the new-relation storage unit 44 as a new inter-drawing relation.

At the next step S106, the second transformation unit 45 transforms the projection drawing of surface #i into an expansion drawing on the basis of the new inter-drawing relations between the projection drawing of surface #i and the expansion drawing, which have been stored in the new-relation storage unit 44.

Figure 38:
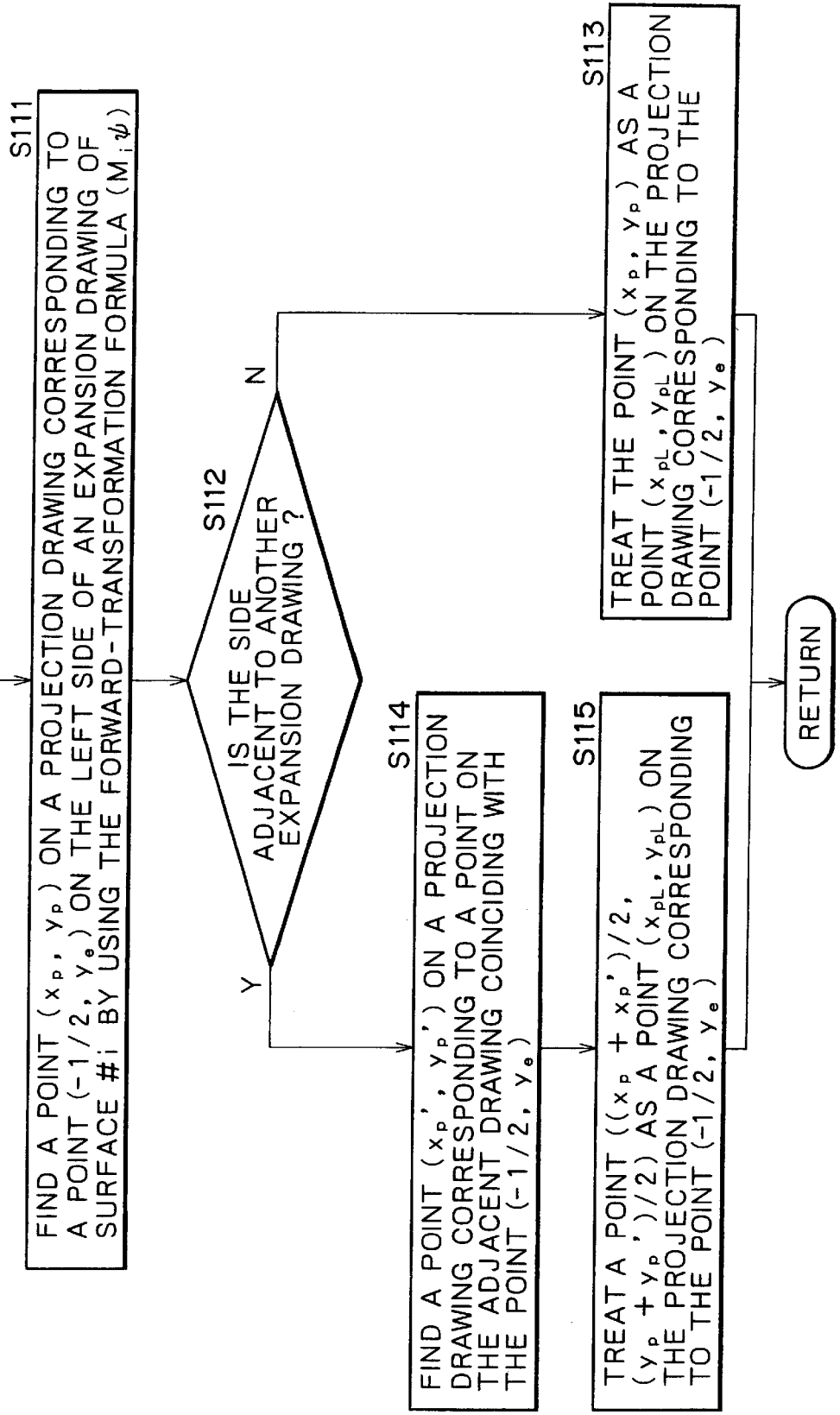
FIG. 38 shows a flowchart used as a reference in a description of details of processing carried out at a step S101 of the flowchart shown in FIG. 37.

Next, the processing carried out at the step S101 of the flowchart shown in FIG. 37 is further explained by referring to a flowchart shown in FIG. 38.

As shown in FIG. 38, the flowchart begins with a step S111 at which the first transformation unit 42 finds a point ($x_p$, $y_p$) on the projection drawing. The point ($x_p$, $y_p$) corresponds to a point ($-1/2$, $y_e$) on the left side of the square shape forming the expansion drawing of surface #i used as the surface of interest. The point ($x_p$, $y_p$) is found on the basis of the forward-transformation formula $M_i\psi$ stored in the forward-transformation formula storage unit 41. Each pair consisting of a point ($x_p$, $y_p$) on the projection drawing and a corresponding point ($-1/2$, $y_e$) on the expansion drawing is supplied to the relation-correcting unit 43.

Assume for example that, in the case shown in FIGS. 31A and 31B, surface #1 serves as the surface of interest. In this case, a point ($x_p$, $y_p$) existing on the projection drawing and corresponding to a point ($-1/2$, $y_e$) on the left side of the square shape forming the expansion drawing of surface #1 can be found by using the following equation, which corresponds to Eq. (13).

$$(w_1 x_p, w_1 y_p, w_1)^T = M_1 \psi(-1/2, y_e, 1)^T \qquad (15)$$

where the symbol $w_1$ represents a homogenous coordinate and the symbol T denotes a matrix transposition operator.

The flow of the processing then goes on to a step S112 at which the relation-correcting unit 43 forms a judgment as to whether or not the left side of the square shape forming the expansion drawing of surface #i serving as the surface of interest is adjacent to another surface, that is, a judgment as to whether or not there is a square shape forming the expansion drawing of another surface sharing the left side as one of the sides thereof.

If the outcome of the judgment formed at the step S112 indicates that the left side of the square shape forming the expansion drawing of surface #i serving as the surface of interest is adjacent to no other surfaces, that is, if the outcome of the judgment formed at the step S112 indicates that there is no square shape forming the expansion drawing of another surface sharing the left side as one of the sides thereof, the flow of the processing goes on to a step S113 at which the relation-correcting unit 43 designates the point ($x_p$, $y_p$) found at the step S111 as a point ($x_{pL}$, $y_{pL}$) existing on the projection drawing and corresponding to a point ($-1/2$, $y_e$) on the left side of the square shape forming the expansion drawing of surface #i. Control is then returned to a calling routine.

That is to say, if the left side of the square shape forming the expansion drawing of surface #i serving as the surface of interest is adjacent to no other surfaces, the point ($x_p$, $y_p$) found on the basis of the forward-transformation formula $M_i\psi$ is used as a point ($x_{pL}$, $y_{pL}$) existing on the projection drawing and corresponding to a point ($-1/2$, $y_e$) on the left side of the square shape forming the expansion drawing of surface #i as it is. Thus, in this case, the inter-drawing relation between points on the left side of the square shape forming the expansion drawing of surface #i serving as the surface of interest and points on the projection drawing, which is prescribed by the forward-transformation formula $M_i\psi$, is used as it is.

If the outcome of the judgment formed at the step S112 indicates that the left side of the square shape forming the expansion drawing of surface #i serving as the surface of interest is adjacent to another surface, that is, if the outcome of the judgment formed at the step S112 indicates that there is a square shape forming the expansion drawing of another surface sharing the left side as one of the sides thereof, on the other hand, the flow of the processing goes on to a step S114. The expansion drawing of the other surface sharing the left side as one of the sides thereof is referred to as an adjacent expansion drawing. At the step S114, the relation-correcting unit 43 requests the first transformation unit 42 to find a point ($x_p'$, $y_p'$) existing on the projection drawing and corresponding to a point existing on the adjacent expansion drawing and coinciding with the point ($-1/2$, $y_e$) on the left side of the square shape forming the expansion drawing of surface #i on the basis of the forward-transformation formula for the adjacent expansion drawing.

As described above, in the case shown in FIGS. 31A and 31B, surface #1 serves as the surface of interest. The left side of the square shape forming the expansion drawing of surface #1 is adjacent to the expansion drawing of surface #2. Thus, the expansion drawing of surface #2 is referred to as an adjacent expansion drawing. In the case shown in FIGS. 31A and 31B, a paste-buffer coordinate system ($x_{e1}$, $y_{e1}$) for the expansion drawing of surface #1 and a paste-buffer coordinate system ($x_{e2}$, $y_{e2}$) for the expansion drawing of surface #2 are set in the same orientation with their origins separated from each other by a distance of 1. Thus, each point existing on the right side of the square shape of the adjacent expansion drawing, that is, the expansion drawing of surface #2, and coinciding with the point ($-1/2$, $y_e$) on the left side of the square shape forming the expansion drawing of surface #1 has coordinates of ($1/2$, $y_e$) Thus, the point ($x_p'$, $y_p'$) found at the step S114 on the basis of the forward-transformation formula for the adjacent expansion drawing corresponds to a point existing on the adjacent expansion drawing and coinciding with the point ($-1/2$, $y_e$) on the left side of the square shape forming the expansion drawing of surface #1. Since the point ($x_p'$, $y_p'$) corresponds to a point existing on the adjacent expansion drawing and coinciding with the point ($-1/2$, $y_e$) on the left side of the square shape forming the expansion drawing of surface #1, the point ($x_p'$, $y_p'$) corresponds to a point ($1/2$, $y_e$) existing on the right side of the square shape of the adjacent expansion drawing. For this reason, the point ($x_p'$, $y_p'$) can be found from the following equation, which corresponds to Eq. (13):

$$(w_2 x_p', w_2 y_p', w_2)^T = M_2 \psi(1/2, y_e, 1)^T \qquad (16)$$

where the symbol $w_2$ denotes any arbitrary number representing a homogenous coordinate.

At the next step S115, the relation-correcting unit 43 uses typically average coordinates (($x_p+x_p'$)/2, ($y_p+y_p'$)/2)) as the coordinates of the point ($x_{pL}$, $y_{pL}$) located on the projection drawing and designated as a point corresponding to the point ($-1/2$, $y_e$) on the expansion drawing of surface #i serving as the surface of interest where the symbols $x_p$ and $y_p$ are the coordinates of a point located on the projection drawing and found at the step S111 whereas the symbols $x_p'$ and $y_p'$ are the coordinates of a point located on the projection drawing and found at the step S114. Control is then returned to a calling routine.

With surface #1 of FIGS. 31A and 31B serving as the surface of interest as described above, as shown in FIGS. 39A and 39B, assume that a point A ($x_p$, $y_p$) on the projection drawing is found as a point corresponding to a point a (−1/2, $y_e$) on the left side of a square shape forming the expansion drawing of surface #1 serving as the surface of interest. In addition, assume that a point B ($x_p'$, $y_p'$) on the projection drawing is found as a point corresponding to a point b (1/2, $y_e$) on the right side of a square shape forming the expansion drawing of surface #2. On the expansion drawing, the point a (−1/2, $y_e$) coincides with the point b (1/2, $y_e$). If the point A ($x_p$, $y_p$) existing on the projection drawing and corresponding to the point a (−1/2, $y_e$) does not coincide with the point B ($x_p'$, $y_p'$) existing on the projection drawing and corresponding to the point b (1/2, $y_e$), a pattern shift results as shown in FIG. 31B.

In order to solve this problem, the relation-correcting unit 43 finds average coordinates (($x_p+x_p'$)/2, ($y_p+y_p'$)/2)) as the coordinates of a new point C located on the projection drawing and designated as a point corresponding to the point a (−1/2, $y_e$) on the expansion drawing of surface #1 serving as the surface of interest as shown in FIGS. 39A and 39B where the symbols $x_p$ and $y_p$ are the coordinates of the point A located on the projection drawing whereas the symbols $x_p'$ and $y_p'$ are the coordinates of the point B located on the projection drawing.

Thus, by carrying out the same processing on surface #2 serving as the surface of interest, an inter-drawing relation can be corrected so that a point a of surface #1 coinciding with a point b of surface #2 on the expansion drawing and the point b both correspond to the same point C on the projection drawing.

Figure 40:
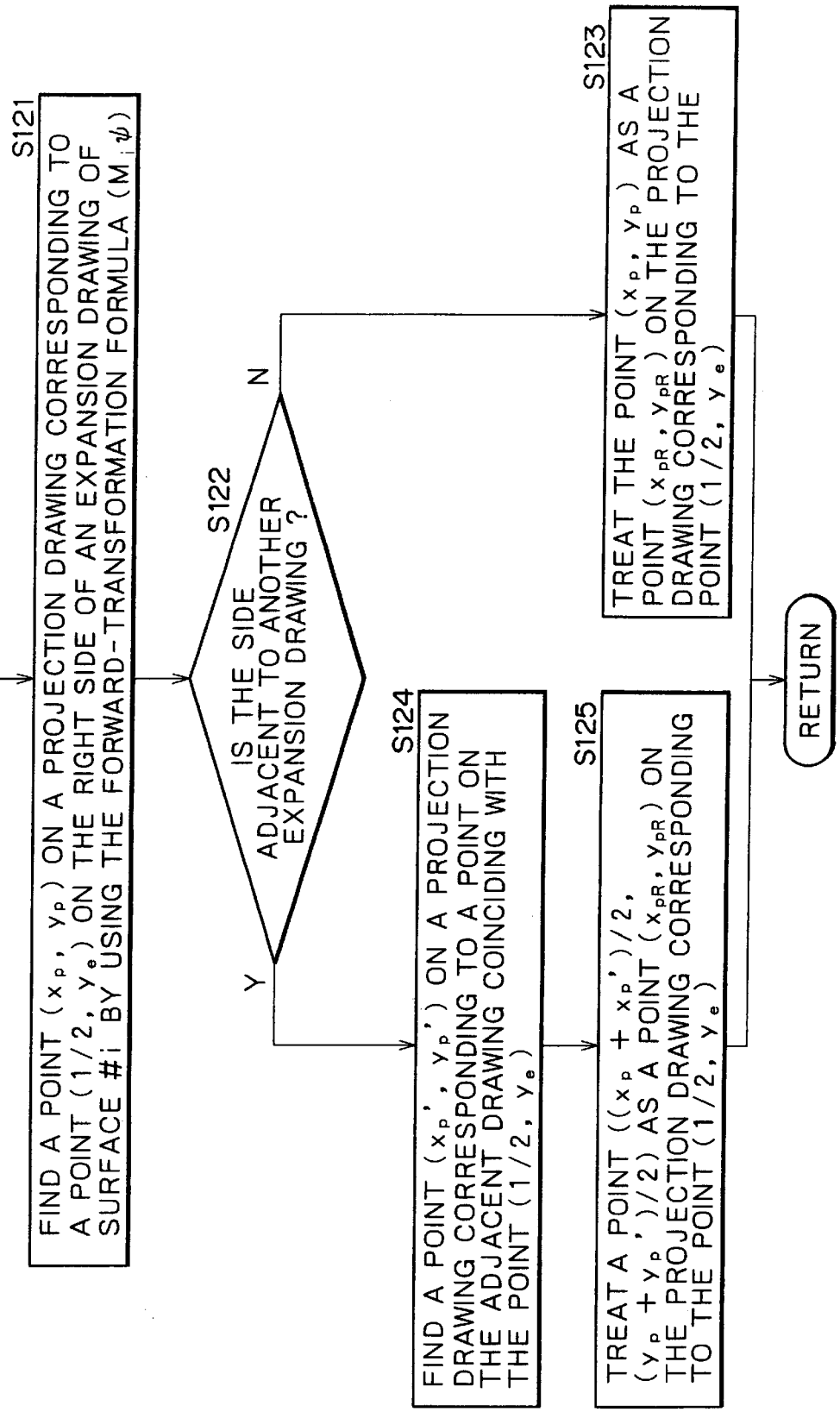
FIG. 40 shows a flowchart used as a reference in a description of details of processing carried out at a step S102 of the flowchart shown in FIG. 37.

Next, the processing carried out at the step S102 of the flowchart shown in FIG. 37 is further explained by referring to a flowchart shown in FIG. 40.

As shown in FIG. 40, the flowchart begins with a step S121 at which the first transformation unit 42 finds a point ($x_p$, $y_p$) on the projection drawing. The point ($x_p$, $y_p$) corresponds to a point (1/2, $y_e$) on the right side of the square shape forming the expansion drawing of surface #i used as the surface of interest. The point ($x_p$, $y_p$) is found on the basis of the forward-transformation formula $M_i\psi$ stored in the forward-transformation-formula storage unit 41. Each pair consisting of a point ($x_p$, $y_p$) on the projection drawing and a point (1/2, $y_e$) on the expansion drawing is supplied to the relation-correcting unit 43.

Assume for example that, in the case shown in FIGS. 31A and 31B, surface #1 serves as the surface of interest. In this case, a point ($x_p$, $y_p$) existing on the projection drawing and corresponding to a point (1/2, $y_e$) on the right side of the square shape forming the expansion drawing of surface #1 can be found by using the following equation, which corresponds to Eq. (13).

$$(w_1 x_p, w_1 y_p, w_1) = M_1\psi(1/2, y_e, 1)^T \qquad (17)$$

The flow of the processing then goes on to a step S122 at which the relation-correcting unit 43 forms a judgment as to whether or not the right side of the square shape forming the expansion drawing of surface #i serving as the surface of interest is adjacent to another surface, that is, a judgment as to whether or not there is a square shape forming the expansion drawing of another surface sharing the right side as one of the sides thereof.

If the outcome of the judgment formed at the step S122 indicates that the right side of the square shape forming the expansion drawing of surface #i serving as the surface of interest is adjacent to no other surfaces, that is, if the outcome of the judgment formed at the step S122 indicates that there is no square shape forming the expansion drawing of another surface sharing the right side as one of the sides thereof, the flow of the processing goes on to a step S123 at which the relation-correcting unit 43 designates the point ($x_p$, $y_p$) found at the step S121 as a point ($x_{pR}$, $y_{pR}$) existing on the projection drawing and corresponding to a point (1/2, $y_e$) on the right side of the square shape forming the expansion drawing of surface #i. Control is then returned to a calling routine.

That is to say, if the right side of the square shape forming the expansion drawing of surface #i serving as the surface of interest is adjacent to no other surfaces, the point ($x_p$, $y_p$) found on the basis of the forward-transformation formula $M_i\psi$ is used as a point ($x_{pR}$, $y_{pR}$) existing on the projection drawing and corresponding to a point (1/2, $y_e$) on the right side of the square shape forming the expansion drawing of surface #i as it is. Thus, in this case, the relation between points on the right side of the square shape forming the expansion drawing of surface #i serving as the surface of interest and points on the projection drawing, which is prescribed by the forward-transformation formula $M_i\psi$, is used as it is.

If the outcome of the judgment formed at the step S122 indicates that the right side of the square shape forming the expansion drawing of surface #i serving as the surface of interest is adjacent to another surface, that is, if the outcome of the judgment formed at the step S122 indicates that there is a square shape forming the expansion drawing of another surface sharing the right side as one of the sides thereof, on the other hand, the flow of the processing goes on to a step S124. The expansion drawing of the other surface sharing the right side as one of the sides thereof is referred to as an adjacent expansion drawing. At the step S124, the relation-correcting unit 43 requests the first transformation unit 42 to find a point ($x_p'$, $y_p'$) existing on the projection drawing and corresponding to a point existing on the adjacent expansion drawing and coinciding with the point (1/2, $y_e$) on the right side of the square shape forming the expansion drawing of surface #i on the basis of the forward-transformation formula for the adjacent expansion drawing.

As described above, in the case shown in FIGS. 31A and 31B, surface #1 serves as the surface of interest. The right side of the square shape forming the expansion drawing of surface #1 is adjacent to the expansion drawing of surface #3. Thus, the expansion surface of surface #3 is referred to as an adjacent expansion drawing. In the case shown in FIGS. 31A and 31B, the origin of a paste-buffer coordinate system ($x_{e3}$, $y_{e3}$) for the expansion drawing of surface #3 is shifted from the origin of a paste-buffer coordinate system ($x_{e1}$, $y_{e1}$) for the expansion drawing of surface #1 by a distance of 1, and the former is rotated in the counterclockwise direction by an angle of 90 degrees relative to the latter. Thus, each point existing on the upper side of the square shape of the adjacent expansion drawing, that is, the expansion drawing of surface #3, and coinciding with the point (1/2, $y_e$) on the right side of the square shape forming the expansion drawing of surface #1 has coordinates of (−$y_e$, −1/2). Here, the upper side is a side of surface #3 seen from a point of view wherein the $x_{e3}$ and $y_{e3}$ axes are oriented in the right and downward directions respectively. Thus, the point ($x_p'$, $y_p'$) found at the step S124 on the basis of the forward-transformation formula for the adjacent expansion drawing corresponds to a point existing on the adjacent expansion drawing and coinciding with the point (−$y_e$, −1/2) on the right side of the square shape forming the expansion drawing of surface #1. Since the point ($x_p'$, $y_p'$) corresponds to a point existing on the adjacent expansion drawing and coinciding with the point (1/2, $y_e$) on the right side of the square shape forming the expansion drawing of surface #1, the point ($x_p'$, $y_p'$) corresponds to a point (1/2, $y_e$) existing on the right side of the square shape of the adjacent expansion drawing. For this reason, the point ($x_p'$, $y_p'$) can be found from the following equation, which corresponds to Eq. (13):

$$(w_3 x_p', w_3 y_p', w_3)^T = M_3 \psi(-y_e', -1/2, 1)^T \quad (18)$$

where the symbol $w_3$ denotes any arbitrary number representing a homogenous coordinate.

At the next step S125, the relation-correcting unit 43 uses typically average coordinates (($x_p + x_p'$)/2, ($y_p + y_p'$)/2)) as the coordinates of the point ($x_{pR}$, $y_{pR}$) located on the projection drawing and designated as a point corresponding to the point (1/2, $y_e$) on the expansion drawing of surface #i serving as the surface of interest where the symbols $x_p$ and $y_p$ are the coordinates of a point located on the projection drawing and found at the step S121 whereas the symbols $x_p'$ and $y_p'$ are the coordinates of a point located on the projection drawing and found at the step S124. Control is then returned to a calling routine.

With surface #1 of FIGS. 31A and 31B serving as the surface of interest as described above, as shown in FIGS. 41A and 41B, assume that a point D ($x_p$, $y_p$) on the projection drawing is found as a point corresponding to a point d (1/2, $y_e$) on the right side of a square shape forming the expansion drawing of surface #1 serving as the surface of interest. In addition, assume that a point E ($x_p'$, $y_p'$) on the projection drawing is found as a point corresponding to a point e ($-y_e$, $-1/2$) on the upper side of a square shape forming the expansion drawing of surface #3. On the expansion drawing, the point d (1/2, $y_e$) coincides with a point e ($-y_e$, $-1/2$). If the point D ($x_p$, $y_p$) existing on the projection drawing and corresponding to the point d (1/2, $y_e$) does not coincide with the point E ($x_p'$, $y_p'$) existing on the projection drawing and corresponding to the point e ($-y_e$, $-1/2$), a pattern shift results as shown in FIG. 31B.

Figures 41A, 41B:
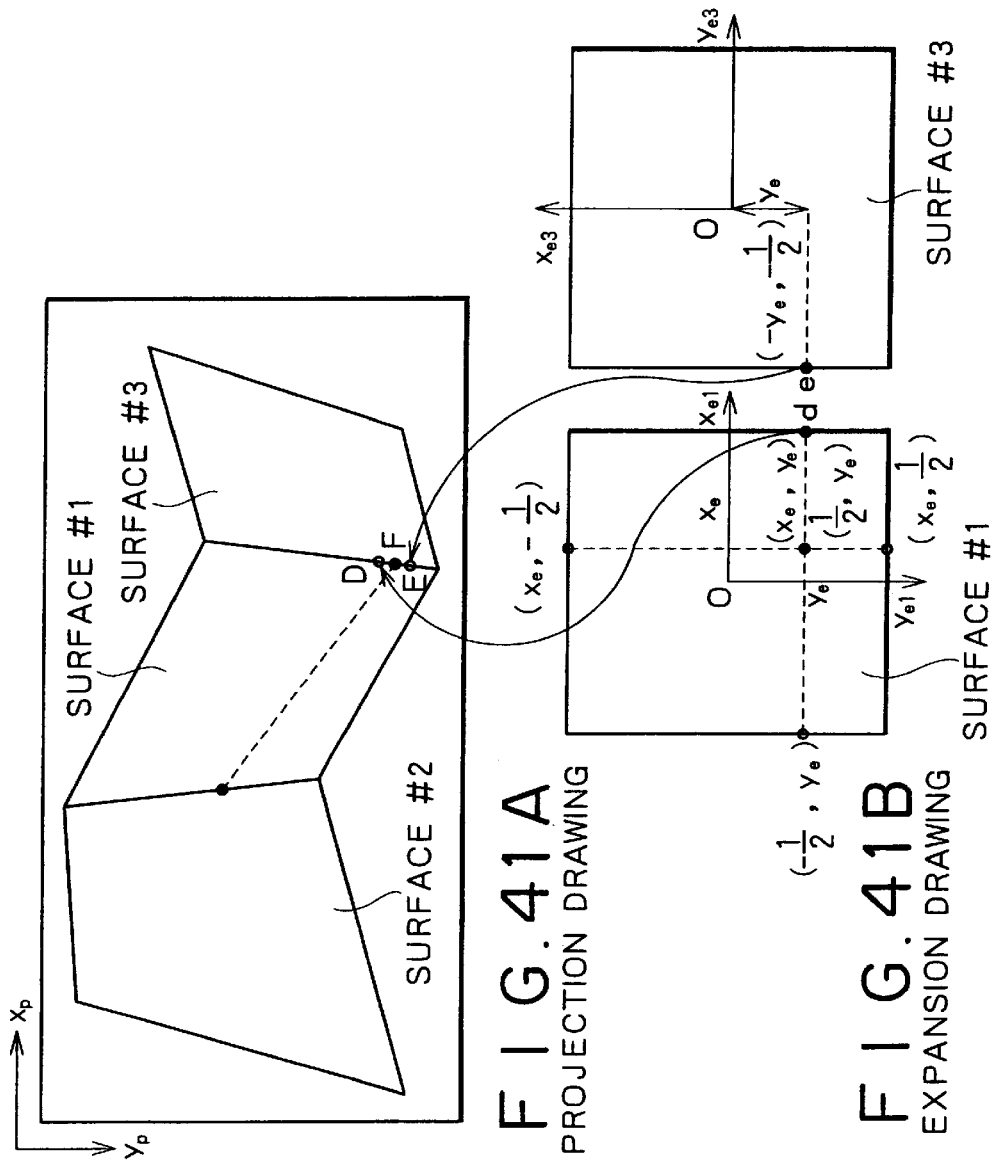
FIGS. 41A and 41B are a plurality of diagrams showing details of processing carried out at a step S102 of the flowchart shown in FIG. 37.

In order to solve this problem, the relation-correcting unit 43 finds average coordinates (($x_p + x_p'$)/2, ($y_p + y_p'$)/2)) as the coordinates of a new point F located on the projection drawing and designated as a point corresponding to the point d (1/2, $y_e$) on the expansion drawing of surface #1 serving as the surface of interest as shown in FIGS. 41A and 41B where the symbols $x_p$ and $y_p$ are the coordinates of the point D located on the projection drawing whereas the symbols $x_p'$ and $y_p'$ are the coordinates of the point E located on the projection drawing.

Thus, by carrying out the processing on surface #3 serving as the surface of interest in the same way as that explained earlier by referring to FIGS. 39A and 39B, an inter-drawing relation can be corrected so that a point d of surface #1 coinciding with a point e of surface #3 on the expansion drawing and the point e both correspond to the same point F on the projection drawing.

Figure 42:
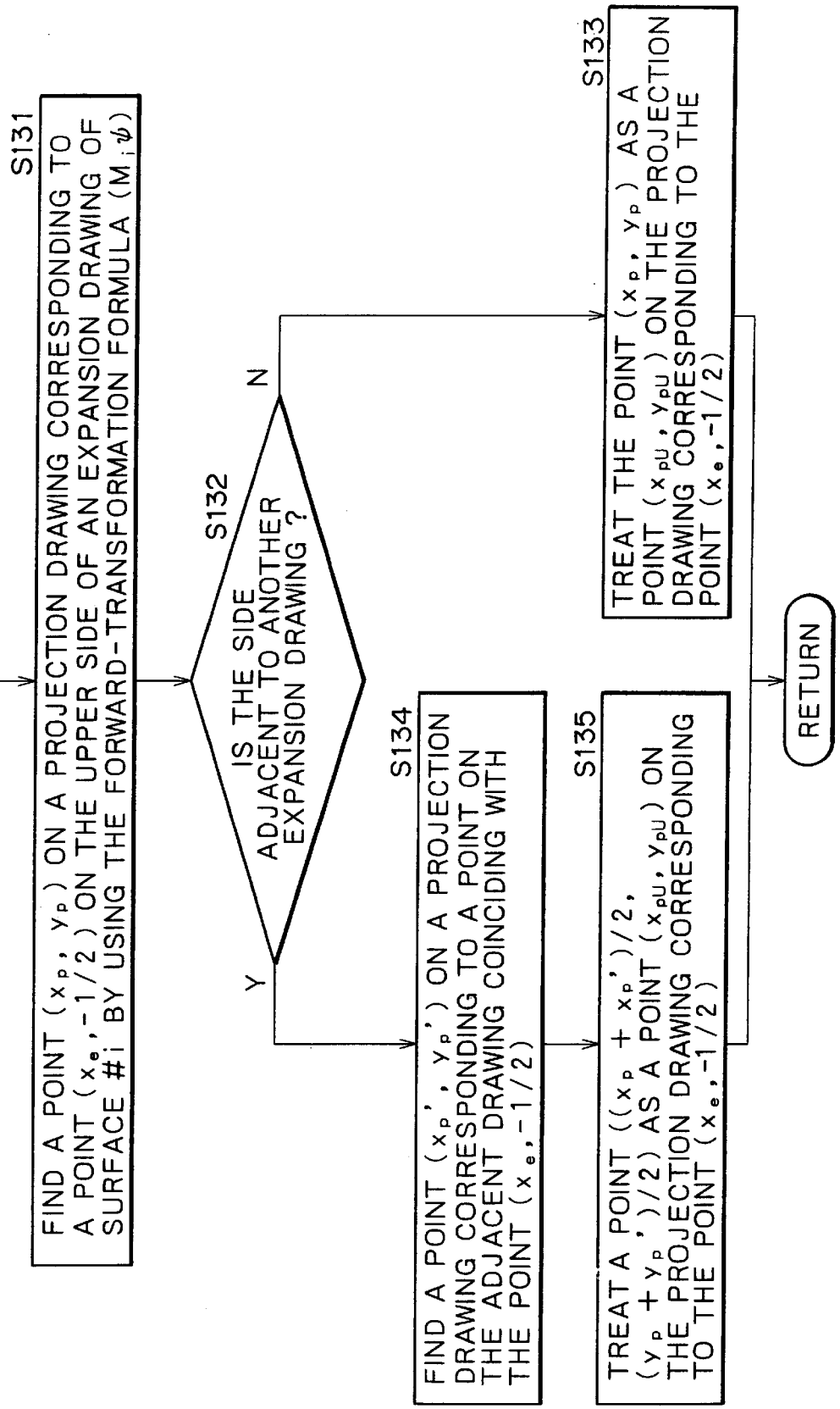
FIG. 42 shows a flowchart used as a reference in a description of details of processing carried out at a step S103 of the flowchart shown in FIG. 37.

Next, the pieces of processing carried out at the steps S103 and S104 of the flowchart shown in FIG. 37 are further explained in detail by referring to flowcharts shown in FIG. 42 and 43 respectively.

At the steps S131 to S135 of the flowchart shown in FIG. 42, the first transformation unit 42 finds a point ($x_{pU}$, $y_{pU}$) located on the projection drawing and supposed to correspond to a point ($x_e$, $-1/2$) on the upper side of the square shape forming the expansion drawing of surface #i used as the surface of interest in the same way as the processing carried out at the steps S111 to S115 of the flowchart shown in FIG. 38. By the same token, at the steps S141 to S145 of the flowchart shown in FIG. 43, the first transformation unit 42 finds a point ($x_{pD}$, $y_{pD}$) located on the projection drawing and supposed to correspond to a point ($x_e$, 1/2) on the lower side of the square shape forming the expansion drawing of surface #i used as the surface of interest in the same way as the processing carried out at the steps S111 to S115 of the flowchart shown in FIG. 38.

As explained earlier by referring to the flowchart shown in FIG. 37, at the steps S101 to S104 of the flowchart, a new inter-drawing relation between points on sides of the square shape of the expansion drawing and points on the projection drawing is found. Then, at the next step S105, the relation-correcting unit 43 finds points ($x_p$, $y_p$) located on the projection drawing and supposed to correspond to points ($x_e$, $y_e$) in the square shape of the expansion drawing. Each pair comprising a point ($x_p$, $y_p$) and a point ($x_e$, $y_e$) is supplied to the new-relation storage unit 44 as a new inter-drawing relation, which is found as follows.

Since the homogeneous transformation (or the projective transformation) is a linear transformation, the perspective transformation transforms a straight line for example into a straight line as well. Thus, as shown in FIGS. 44A and 44B, since a point ($x_e$, $y_e$) on the expansion drawing of surface #1 is a cross point of a line connecting a point ($x_e$, $-1/2$) to a point ($x_e$, 1/2) and a line connecting a point ($-1/2$, $y_e$) to a point (1/2, $y_e$), a cross point of a line connecting a point ($x_{pU}$, $y_{pU}$) found at the step S103 to a point ($x_{pD}$, $y_{pD}$) found at the step S104 and a line connecting a point ($x_{pL}$, $y_{pL}$) found at the step S101 to a point ($x_{pR}$, $y_{pR}$) found at the step S102 is found as the point ($x_p$, $y_p$) located on the projection drawing and supposed to correspond to the point ($x_e$, $y_e$)

At the step S105, as described above, the relation-correcting unit 43 designates a cross point of a line connecting a point ($x_{pU}$, $y_{pU}$) to a point ($x_{pD}$, $y_{pD}$) and a line connecting a point ($x_{pL}$, $y_{pL}$) to a point ($x_{pR}$, $y_{pR}$) as the point ($x_p$, $y_p$) located on the projection drawing and supposed to correspond to the point ($x_e$, $y_e$).

Later on, as described earlier in the explanation of the step S106 of the flowchart shown in FIG. 37, the second transformation unit 45 transforms the projection drawing into an expansion drawing on the basis of the new inter-drawing relation between the projection and expansion drawings, which has been described before. As a result, a continuous pattern drawn on the projection drawing like one shown in FIG. 45A, which shows the same projection drawing as FIG. 31A, is transformed into also a continuous pattern drawn on the expansion drawing as shown in FIG. 45B.

It should be noted that, as described earlier, 2D-paint processing can be applied to an expansion drawing, which is obtained by carrying out the processing explained before. The second transformation unit 45 is capable of transforming an expansion drawing completing 2D-paint processing into a projection drawing on the basis of a new inter-drawing relation stored in the new-relation storage unit 44. In this way, it is possible to easily edit a 2-dimensional picture displaying a 3-dimensional object.

As described above, first of all, a transformation formula $M\psi$ is found. The transformation formula $M\psi$ prescribes an inter-drawing relation between a projection drawing of a surface composing a 3-dimensional object displayed on a 2-dimensional picture and an expansion drawing of the surface. Then, the inter-drawing relation prescribed by the transformation formula $M\psi$ is corrected to give a new inter-drawing relation, which is used as a basis for transforming the projection drawing into an expansion drawing and transforming an expansion drawing into a projection drawing. By using the new inter-drawing relation as a basis of transformation, it is possible to avoid a problem of a resulting unnatural picture caused by a discontinuous pattern on an expansion drawing obtained as a result of transformation of a projection drawing including the same but continuous pattern.

In addition, since the user specifies characteristic points, an unnatural area on a projection drawing is never subjected to transformation into an expansion drawing. It should be noted, however, that characteristic points identifying an area on a projection drawing to be subjected to transformation into an expansion drawing do not have to be specified by the user. For example, characteristic points can be detected automatically by extraction of an edge or the like.

In the embodiments described above, in order to make the explanation simple, each pair of a point on an expansion drawing and a point located on a projection drawing and supposed to correspond to the point on an expansion drawing is stored as a new inter-drawing relation. It should be noted, however, that each pair of a point only on the upper side of a square shape serving as an expansion drawing and a point located on a projection drawing and supposed to correspond to the point on the upper side can also be stored as a new inter-drawing relation. In this case, each point inside the square shape can be found during a transformation of the projection drawing into the expansion drawing or a transformation of the expansion drawing into the projection drawing by taking advantage of the fact that the homogeneous transformation described above is a linear transformation.

In addition, in the embodiments described above, an inter-drawing relation between a projection drawing and an expansion drawing is corrected to a new inter-drawing relation setting a point on a side common to a first surface on the expansion drawing and a second surface located on the expansion drawing and adjacent to the first surface to correspond to a point on the projection drawing at average coordinates equal to averages of coordinates of a first point obtained on the projection drawing as a result of a transformation of the point on the common side based on a forward-transformation formula for the first surface and coordinates of a second point obtained on the projection drawing as a result of a transformation of the point on the common side based on a forward-transformation formula for the second surface. It should be noted, however, that instead of setting a point on a side common to a first surface on the expansion drawing and a second surface located on the expansion drawing and adjacent to the first surface to correspond to a point on the projection drawing at average coordinates equal to averages of coordinates of such a first point and coordinates of such a second point, the new inter-drawing relation can also be established to set a point on the common side to correspond to typically either such a first point or such a second point. That is to say, the present invention does not particularly put a restriction as to which point on the projection drawing a point on a side common to a first surface on the expansion drawing and a second surface located on the expansion drawing and adjacent to the first surface should correspond to.

In the embodiments described above, a sequence of pieces of processing is carried out sequentially one piece after another by the processing circuit 1 by execution of a program. It is worth noting, however, that the sequence of pieces of processing can also be carried out by dedicated hardware.

It should be noted that, instead of storing the program in the external storage unit 7 shown in FIG. 3 in advance, the program can also be temporarily or permanently stored or recorded in a removable recording medium such as a floppy disc, a CD-ROM (Compact Disc Read-Only Memory), an MO (Magnetic Optical) disc, a DVD (Digital Versatile Disc), a magnetic disc or a semiconductor memory. Such a removable recording medium is presented to the user as the so-called package software, which can be installed into the external storage unit 7.

In addition, instead of installing the program into the external storage unit 7 from a removable recording medium, the program can be downloaded for installation into the external storage unit 7 from a download site through a radio transmission by way of an artificial satellite for digital satellite broadcasting or through a wire transmission by way of a network such as a LAN (Local Network Area) or the Internet.

In this case of a downloaded program, when the version of the program is upgraded, the program with the upgraded version can be installed into the external storage unit 7 with ease.

In the embodiments, processing steps prescribing the program to be executed by the processing circuit 1 to perform various kinds of processing are not necessarily carried out sequentially one step after another along the time series in accordance with an order described by a flowchart. Instead, the processing steps may include pieces of processing, which are carried out individually or concurrently typically in the so-called parallel processing or the so-called object oriented processing.

In addition, the program can be executed by a single processing circuit or a plurality of processing circuits.

In accordance with the picture-processing apparatus provided by the present invention, the picture-processing method adopted in the apparatus and the recording medium for storing a computer program prescribing the method, a transformation formula prescribing an inter-drawing relation between a projection drawing of a surface of a 3-dimensional object displayed on a 2-dimensional picture and an expansion drawing of the surface is computed. Then, the inter-drawing relation prescribed by the transformation formula is corrected to produce a new inter-drawing relation as a result of correction. As a result, by transformation of the projection drawing into an expansion drawing and transformation of the expansion drawing into a projection drawing that are based on the new inter-drawing relation, the user can be provided with a natural expansion drawing. In addition, it is possible to implement processing such as 3-dimensional editing on a 2-dimensional picture with ease.

What is claimed is:

1. A picture-processing apparatus for generating an expansion drawing of a surface composing a 3-dimensional object displayed on a 2-dimensional picture by expansion of a projection drawing representing a result of projection of said surface on said 2-dimensional picture, said picture-processing apparatus comprising:

a computation means for computing a transformation formula prescribing an inter-drawing relation between a projection drawing of a surface composing said 3-dimensional object displayed on said 2-dimensional picture and an expansion drawing of said surface;

a correction means for correcting said inter-drawing relation prescribed by said transformation formula and outputting a new inter-drawing relation as a result of correction;

a projection-drawing-transforming means for transforming a projection drawing of each of a plurality of surfaces composing said 3-dimensional object into an expansion drawing of said surface; and a connection means for creating a joint drawing by joining expansion drawings of said surfaces in accordance with connection relations each associated with one of said surfaces.

2. A picture-processing apparatus according to claim 1 wherein said correction means is capable of correcting an inter-drawing relation so that each point on a side common to a first surface of an expansion drawing and a second surface adjacent to said first surface corresponds to the same point on a projection drawing.

3. A picture-processing apparatus according to claim 2 wherein said correction means is capable of correcting an inter-drawing relation so that a point on a side common to a first surface of an expansion drawing and a second surface adjacent to said first surface corresponds to a point located on a projection drawing and represented by an average value of a first point and a second point where said first point is a point located on said projection drawing and obtained as a result of transformation of said point on said common side based on a transformation formula for said first surface whereas said second point is a point located on said projection drawing and obtained as a result of transformation of said point on said common side based on a transformation formula for said second surface.

4. A picture-processing apparatus according to claim 1, said apparatus further provided with:

a processing means for processing a joint drawing; and an expansion-drawing-transforming means for transforming an expansion drawing of each of a plurality of surfaces composing a joint drawing completing processing carried out by said processing means into a projection drawing of said surface on the basis of said new inter-drawing relation.

5. A picture-processing apparatus according to claim 1 wherein said computation means is capable of computing a transformation formula for a surface of a 3-dimensional object from information on the shape of said surface and a characteristic point on a projection drawing of said surface.

6. A picture-processing apparatus according to claim 1 wherein said computation means is capable of computing a function M $\psi$ or the inverse function thereof as a transformation formula where notation $\psi$ denotes a function of mapping an expansion drawing onto a surface of said 3-dimensional object in a 3-dimensional space and notation M denotes a function of projecting said 3-dimensional object on a screen as said 2-dimensional picture.

7. A picture-processing method for carrying out picture processing to generate an expansion drawing of a surface composing a 3-dimensional object displayed on a 2-dimensional picture by expansion of a projection drawing representing a result of projection of said surface on said 2-dimensional picture, said picture-processing method comprising the steps of:

computing a transformation formula prescribing an inter-drawing relation between a projection drawing of a surface composing a 3-dimensional object displayed on said 2-dimensional picture and an expansion drawing of said surface;

correcting said inter-drawing relation prescribed by said transformation formula and outputting a new inter-drawing relation as a result of correction;

transforming a projection drawing of each of a plurality of surfaces composing a 3-dimensional object into an expansion drawing of said surface; and creating a joint drawing by joining expansion drawings of said surfaces in accordance with connection relations each associated with one of said surfaces.

8. A recording medium used for recording a program to be executed by a computer for carrying out picture processing to generate an expansion drawing of a surface composing a 3-dimensional object displayed on a 2-dimensional picture by expansion of a projection drawing representing a result of projection of said surface on said 2-dimensional picture, said program prescribing a method comprising the steps of:

computing a transformation formula prescribing an infer-drawing relation between a projection drawing of a surface composing a 3-dimensional object displayed on said 2-dimensional picture and an expansion drawing of said surface;

correcting said inter-drawing relation prescribed by said transformation formula and outputting a new inter-drawing relation as a result of correction;

transforming a projection drawing of each of a plurality of surfaces composing a 3-dimensional object into an expansion drawing of said surface; and creating a joint drawing by joining expansion drawings of said surfaces in accordance with connection relations each associated with one of said surfaces.

* * * * *